US010332176B2

(12) United States Patent
Gadre et al.

(10) Patent No.: US 10,332,176 B2
(45) Date of Patent: Jun. 25, 2019

(54) METHODS AND SYSTEMS FOR VIRTUAL FITTING ROOMS OR HYBRID STORES

(71) Applicant: eBay Inc., San Jose, CA (US)

(72) Inventors: Akshay Gadre, North Wales, PA (US); Kerri Breslin, Woodland Hills, CA (US)

(73) Assignee: eBay Inc., San Jose, CA (US)

( * ) Notice: Subject to any disclaimer, the term of this patent is extended or adjusted under 35 U.S.C. 154(b) by 672 days.

(21) Appl. No.: 14/472,125

(22) Filed: Aug. 28, 2014

(65) Prior Publication Data

US 2016/0063588 A1   Mar. 3, 2016

(51) Int. Cl.
| G06Q 30/00 | (2012.01) |
| G06Q 30/06 | (2012.01) |
| G06Q 10/08 | (2012.01) |
| G06F 16/9537 | (2019.01) |
| G06F 16/955 | (2019.01) |

(52) U.S. Cl.
CPC ..... *G06Q 30/0623* (2013.01); *G06F 16/9537* (2019.01); *G06F 16/9554* (2019.01); *G06Q 10/087* (2013.01); *G06Q 30/0643* (2013.01)

(58) Field of Classification Search
CPC .................................................... G06Q 30/00
See application file for complete search history.

(56) References Cited

U.S. PATENT DOCUMENTS

| 5,901,379 A | 5/1999 | Hirata |
| 5,930,769 A | 7/1999 | Rose |
| 5,937,081 A | 8/1999 | O'brill et al. |
| 6,546,309 B1 | 4/2003 | Gazzuolo |

(Continued)

FOREIGN PATENT DOCUMENTS

| WO | WO-2015200617 A1 | 12/2015 |
| WO | WO-2016019033 A2 | 2/2016 |

(Continued)

OTHER PUBLICATIONS

Kinect, "Kinect-Virtual Dressing Room", X-Tech Blob, dated Feb. 3, 2014. (Year: 2014).*

(Continued)

*Primary Examiner* — Mark A Fadok
(74) *Attorney, Agent, or Firm* — Schwegman Lundberg & Woessner, P.A.

(57) ABSTRACT

Disclosed are a system comprising a computer-readable storage medium storing at least one program, and a computer-implemented method for digital inventories. An application interface module receives a request message from a user device at a physical store location linked to an online marketplace. The request message indicates a request to determine availability of a target item at the physical store location. The user device is linked to a user. In response to the request message, a database management module accesses inventory data of the online marketplace. An inventory engine determines whether the target item is available at the physical store location. Based on a determination that the target item is not available at the target store, a graphics processing module generates a digital representation of the user and the target item for display within a user interface rendered on the user device.

20 Claims, 28 Drawing Sheets

(56) References Cited

U.S. PATENT DOCUMENTS

| | | | |
|---|---|---|---|
| 6,968,075 B1 | 11/2005 | Chang | |
| 7,062,454 B1 | 6/2006 | Giannini et al. | |
| 7,133,839 B2 | 11/2006 | Inoue et al. | |
| 7,194,327 B2 | 3/2007 | Lam | |
| 7,328,177 B1 | 2/2008 | Lin-Hendel | |
| 7,617,016 B2 | 11/2009 | Wannier et al. | |
| 8,256,664 B1 | 9/2012 | Balfanz et al. | |
| 8,401,914 B1* | 3/2013 | Kim | G06Q 30/06 705/26.1 |
| 8,437,871 B2 | 5/2013 | Ko | |
| 8,655,053 B1 | 2/2014 | Hansen | |
| 8,660,902 B2 | 2/2014 | Coulter | |
| 8,700,392 B1 | 4/2014 | Hart et al. | |
| 8,818,883 B2 | 8/2014 | Lawrence et al. | |
| 8,982,109 B2 | 3/2015 | Vilcovsky et al. | |
| 9,418,378 B2 | 8/2016 | Staicut et al. | |
| 9,607,419 B2 | 3/2017 | Kim et al. | |
| 9,799,064 B2* | 10/2017 | Ohnennus | G06Q 30/0627 |
| 9,898,742 B2 | 2/2018 | Higgins et al. | |
| 2002/0045959 A1 | 4/2002 | Van Overveld | |
| 2002/0178061 A1 | 11/2002 | Lam | |
| 2005/0086126 A1* | 4/2005 | Patterson | A63F 13/12 705/26.8 |
| 2005/0246278 A1 | 11/2005 | Gerber et al. | |
| 2005/0275638 A1 | 12/2005 | Kolmykov-Zotov et al. | |
| 2006/0184993 A1 | 8/2006 | Goldthwaite | |
| 2007/0198120 A1 | 8/2007 | Wannier et al. | |
| 2008/0004116 A1 | 1/2008 | Van Luchene et al. | |
| 2008/0262944 A1 | 10/2008 | Wu | |
| 2009/0018926 A1 | 1/2009 | Buehlman | |
| 2009/0019053 A1 | 1/2009 | Burgess et al. | |
| 2009/0115777 A1 | 5/2009 | Reyers Moreno | |
| 2009/0167719 A1 | 7/2009 | Woolley | |
| 2010/0030578 A1 | 2/2010 | Siddique et al. | |
| 2010/0034462 A1 | 2/2010 | Nevatia et al. | |
| 2010/0191770 A1 | 7/2010 | Cho et al. | |
| 2010/0217685 A1 | 8/2010 | Melcher et al. | |
| 2010/0245555 A1 | 9/2010 | Talluri et al. | |
| 2010/0269054 A1 | 10/2010 | Goldberg et al. | |
| 2010/0306082 A1 | 12/2010 | Wolper et al. | |
| 2011/0022965 A1 | 1/2011 | Lawrence et al. | |
| 2011/0246329 A1 | 10/2011 | Geisner et al. | |
| 2012/0022978 A1 | 1/2012 | Manea et al. | |
| 2012/0086783 A1 | 4/2012 | Sareen et al. | |
| 2012/0137259 A1 | 5/2012 | Campbell et al. | |
| 2012/0239513 A1 | 9/2012 | Oliver et al. | |
| 2012/0257035 A1 | 10/2012 | Larsen | |
| 2012/0264510 A1 | 10/2012 | Wigdor et al. | |
| 2012/0299912 A1 | 11/2012 | Kapur et al. | |
| 2013/0030915 A1* | 1/2013 | Statler | G06Q 30/02 705/14.54 |
| 2013/0110679 A1 | 5/2013 | Spadafora et al. | |
| 2013/0166407 A1 | 6/2013 | Sullaj | |
| 2013/0179288 A1 | 7/2013 | Moses et al. | |
| 2013/0185679 A1* | 7/2013 | Fretwell | G06F 3/017 715/862 |
| 2013/0215116 A1* | 8/2013 | Siddique | G06Q 30/0643 345/420 |
| 2013/0254066 A1 | 9/2013 | Amacker et al. | |
| 2013/0304578 A1* | 11/2013 | Kannan | G06Q 30/0261 705/14.54 |
| 2013/0315475 A1 | 11/2013 | Song et al. | |
| 2014/0035913 A1 | 2/2014 | Higgins et al. | |
| 2014/0040041 A1* | 2/2014 | Ohnennus | G06Q 30/0627 705/14.66 |
| 2014/0052567 A1* | 2/2014 | Bhardwaj | G06Q 30/0631 705/26.7 |
| 2014/0115059 A1* | 4/2014 | Van Wie | H04L 65/403 709/204 |
| 2014/0132635 A1 | 5/2014 | Murdoch et al. | |
| 2014/0168217 A1 | 6/2014 | Kim et al. | |
| 2014/0176565 A1* | 6/2014 | Adeyoola | G06T 19/006 345/473 |
| 2014/0180873 A1 | 6/2014 | Rijhwani | |
| 2014/0225978 A1 | 8/2014 | Saban et al. | |
| 2014/0279192 A1 | 9/2014 | Selby | |
| 2014/0285522 A1 | 9/2014 | Kim et al. | |
| 2014/0330670 A1 | 11/2014 | Ainsworth, III et al. | |
| 2014/0358738 A1* | 12/2014 | Ohnennus | G06Q 30/0643 705/27.2 |
| 2014/0368499 A1* | 12/2014 | Kaur | G06T 19/20 345/420 |
| 2015/0058083 A1 | 2/2015 | Herrera | |
| 2015/0154453 A1 | 6/2015 | Wilf | |
| 2015/0154691 A1 | 6/2015 | Curry et al. | |
| 2015/0279098 A1 | 10/2015 | Kim et al. | |
| 2015/0324103 A1 | 11/2015 | Tepmongkol et al. | |
| 2015/0379623 A1 | 12/2015 | Gadre et al. | |
| 2016/0035061 A1 | 2/2016 | Gadre et al. | |
| 2016/0042402 A1 | 2/2016 | Gadre et al. | |
| 2016/0063613 A1 | 3/2016 | Zhao et al. | |
| 2016/0071321 A1 | 3/2016 | Nishiyama et al. | |
| 2016/0088284 A1 | 3/2016 | Sareen et al. | |
| 2016/0110595 A1 | 4/2016 | Wang et al. | |
| 2018/0137515 A1 | 5/2018 | Higgins et al. | |

FOREIGN PATENT DOCUMENTS

| | | |
|---|---|---|
| WO | WO-2016019033 A3 | 2/2016 |
| WO | WO-2016022937 A1 | 2/2016 |

OTHER PUBLICATIONS

"3D Scanning Services—Konica Minolta 3D Scanning Labs", [Online]. Retrieved from the Internet: <URL: http://sensing.konicaminolta.us/search-by-services/3d-scanning-services/>, (Accessed Feb. 15, 2013), 2 pgs.

"A Brief Overview of Gesture Recognition", This page is maintained by Charles Cohen and sponsored by Cybernet Systems Corporation [Online]. Retrieved from the Internet: <URL: http://homepages.inf.ed.ac.uk/rbf/CVonline/LOCAL_COPIES/COHEN/gesture_o>, (Accessed Feb. 14, 2013), 17 pgs.

"About Fits.me—Virtual Fitting Room", [Online]. Retrieved from the Internet: <URL: http://fits.me/about/about-fits-me/>, (Accessed May 27, 2014), 5 pgs.

"U.S. Appl. No. 13/679,498, Final Office Action dated Jun. 18, 2015", 37 pgs.

"U.S. Appl. No. 13/679,498, Non Final Office Action dated Jan. 30, 2015", 31 pgs.

"U.S. Appl. No. 13/679,498, Response filed Apr. 30, 2015 to Non Final Office Action dated Jan. 30, 2015", 16 pgs.

"U.S. Appl. No. 13/725,209, Final Office Action dated Apr. 8, 2015", 10 pgs.

"U.S. Appl. No. 13/725,209, Final Office Action dated May 8, 2014", 7 pgs.

"U.S. Appl. No. 13/725,209, Non Final Office Action dated Jan. 17, 2014", 8 pgs.

"U.S. Appl. No. 13/725,209, Non Final Office Action dated Oct. 20, 2014", 8 pgs.

"U.S. Appl. No. 13/725,209, Response filed Mar. 20, 2015 to Non Final Office Action dated Oct. 20, 2015", 23 pgs.

"U.S. Appl. No. 13/725,209, Response filed Apr. 17, 2014 to Non Final Office Action dated Jan. 17, 2014", 15 pgs.

"U.S. Appl. No. 13/725,209, Response filed Sep. 8, 2014 to Final Office Action dated May 8, 2014", 10 pgs.

"U.S. Appl. No. 14/474,116, Preliminary Amendment filed Dec. 1, 2014", 7 pgs.

"Fitnect", Fitnect Interactive, [Online]. Retrieved from the Internet: <URL: http://www.fitnect.hu/>, (Accessed May 27, 2014), 2 pgs.

"Gesture Design Blog: Gestural Intent", [Online]. Retrieved from the Internet: <URL: http://gesturedesignblog.com/?page_id=63>, (Mar. 15, 2010), 4 pgs.

"Gesture recognition—Wikipedia, the free encyclopedia", [Online]. Retrieved from the Internet: <URL: http://en.wikipedia.org/wiki/Gesture_recognition>, (Accessed Feb. 15, 2013), 6 pgs.

"Gesture Technology—Virtual Dressing rooms!! Punitatanna's Blog", [Online]. Retrieved from the Internet: <URL: http://punitatanna.

(56) References Cited

OTHER PUBLICATIONS wordpress.com/2010/08/31/gesture-technology-virtual-dressing-rooms/>, (Aug. 31, 2010), 5 pgs.

"Gestures control true 3D display", [Online]. Retrieved from the Internet: <URL: Info collage around internet: Gestures control true 3D display>, (Dec. 29, 2004), 2 pgs.

"GestureTek", GestureTeck Inc. is Purchased Back by Co-Founder Vincent John Vincent, [Online]. Retrieved from the Internet: <URL: http://www.gesturetek.com/>, (Accessed Feb. 15, 2013), 1 pg.

"Get Your Converse Shoes on Virtually Using Augmented Reality", © 2012 DigitalAnalog—An Online Publication for Creativity + Code., [Online]. Retrieved from the Internet: <URL: http://digitalanalog.in/2011/03/14/get-your-converse-shoes-on-virtually-using-augmented-reality/>, (Mar. 14, 2011), 7 pgs.

"HowStuffWorks: Electronics", [Online]. Retrieved from the Internet: <URL: http://electronics.howstuffworks.com/>, (Accessed Feb. 14, 2013), 2 pgs.

"Kinect—Wikipedia, the free encyclopedia", (Accessed Feb. 15, 2013), 16 pgs.

"Kinect Body Scanning—Body Scanning Reinvented", [Online]. Retrieved from the Internet: <URL: http://www.styku.com/business/benefits/bodyscanning/>, (Accessed Feb. 15, 2013), 2 pgs.

"kinect_calibration/technical—ROS Wiki", [Online]. Retrieved from the Internet: <URL: http://www.ros.org/wiki/kinect_calibration/technical>, (Accessed Feb. 15, 2013), 8 pgs.

"Metail: translating cutting edge research into commercial success", [Online]. Retrieved from the Internet: <URL: http://www.eng.cam.ac.uk/news/stories/2012/Me_tail/>, (Mar. 15, 2012), 5 pgs.

"My Style Rules—The way you were meant to dress", [Online]. Retrieved from the Internet: <URL: http://mystylerules.com/>, (Accessed Feb. 15, 2013), 1 pg.

"Online clothes-shopping: is an avatar the answer?", The Guardian, [Online]. Retrieved from the Internet: <URL: http://www.theguardian.com/fashion/shortcuts/2012/feb/29/online-clothes-shopping-avatar>, (Accessed May 27, 2014), 4 pgs.

"SketchUp—How to Information | eHow.com", [Online]. Retrieved from the Internet: <URL: http://www.ehow.com/sketchup/>, (Accessed Feb. 15, 2013), 27 pgs.

"Skyrim Kinect—YouTube", [Online]. Retrieved from the Internet: <URL: http://www.youtube.com/watch?v=Z83wzJwrBK0>, (Accessed Feb. 14, 2012), 2 pgs.

"The Future of Shopping Is Here", Copyright © 2012 Simply Zesty, [Online]. Retrieved from the Internet: <URL: http://www.sirnplyzesty.corn/advertising-and-marketing/the-future-of-shopping-is-here-video/>, (Jun. 12, 2012), 9 pgs.

"Top 10 Best Kinect Hacks", [Online]. Retrieved from the Internet: <URL: http://www.kinecthacks.com/top-10-best-kinect-hacks>, (Accessed Feb. 15, 2013), 6 pgs.

"Trying on Shoes Made Easy at the Adidas Shop in Paris", ©2012 Sugar Inc.—Insanely Addictive™, [Online]. Retrieved from the Internet: <URL: http://www.geeksugar.com/Trying-Shoes-Made-Easy-Adidas-Shop-Paris-159420>, (Mar. 6, 2007), 5 pgs.

"Virtual Dressing Room", Wikipedia, the free encyclopedia, [Online]. Retrieved from the Internet: <URL: http://en.wikipedia.org/wiki/Virtual_dressing_room>, (Accessed May 27, 2014), 6 pgs.

Baudel, Thomas, et al., "CHARADE: Remote Control of Objects using Free-Hand Gestures", [Online]. Retrieved from the Internet: <URL: http://thomas.baudel.name/Morphologie/cacm.html>, (Accessed Feb. 15, 2013), 9 pgs.

Billinghurst, Mark, et al., "Chapter 14: Gesture Based Interaction", [Online]. Retrieved from the Internet: <URL: http://www.billbuxton.com/input14.Gesture.pdf >, (Aug. 24, 2011), 35 pgs.

Cordier, Frederic, et al., "Made-to-Measure Technologies for Online Clothing Store", [Online]. Retrieved from the Internet: <URL: http://www.miralab.ch/repository/papers/25.pdf>, (Accessed Feb. 15, 2013), 12 pgs.

Crawford, Stephanie, "HowStuffWorks: How Microsoft Kinect Works", [Online]. Retrieved from the Internet: <URL: http://electronics.howstuffworks.com/microsoft-kinect.htm>, (Accessed Feb. 14, 2013), 2 pgs.

Daly, Erica, "This is the Year of the Virtual Fit Assistant | Techli", [Online]. Retrieved from the Internet: <URL: http://techli.com/2011/11/year-of-virtual-fit-assistant/>, (Nov. 16, 2011), 3 pgs.

Higgins, Krystal, "Designing Kinect-Based Experiences", [Online]. Retrieved from the Internet: <URL: http://www.kryshiggins.com/thoughts-on-designing-kinect-based-experiences/>, (Apr. 4, 2011), 12 pgs.

Hunter, Seth, et al., "WordPlay: A Table-Top Interface for Collaborative Branstorming and Decision Making", Proceedings of IEEE Tabletops and Interactive Surfaces, 2008, [Online]. Retrieved from the Internet: <URL: http://fluid.media.mit.edu/sites/default/files/WordPlayFinalIEEE_AffiliationIncluded.pdf>, (2008), 4 pgs.

Julian, Horsey, "Augmented Reality App Allows You to Try Clothes Before You Buy in a Virtual Dressing Room (video)", [Online]. Retrieved from the Internet: <http://www.geeky-gadgets.com/augmented-reality-app-allows-you-to-try-clothes-before-you-buy-in-a-virtual-dressing-room>, (Sep. 29, 2010).

Kimbrel, Heather, "How to Create a Virtual Model of My Body Measurements | eHow.com", [Online]. Retrieved from the Internet: <URL: http://www.ehow.com/how_6817795_create-virtual-model-body-measurements.html>, (Accessed Feb. 15, 2013), 3 pgs.

Li, Rong, et al., "Research of Interactive 3D Virtual Fitting Room on Web Environment", ISCID Proceedings of the 2011 Fourth International Symposium on Computational Intelligence and Design—vol. 01, [Online]. Retrieved from the Internet: <URL: http://ieeexplore.ieee.org/xpl/articleDetails.jsp?reload=true&arnumber=6079627&contentType= Conference+Publications>, (2011), 32-35.

MacCormick, John, "How does the Kinect work?", [Online]. Retrieved from the Internet: <URL: http://users.dickinson.edu/~jmac/selected-talks/kinect.pdf>, (Accessed Feb. 15, 2013), 52 pgs.

Newitz, Annalee, "10 physical gestures that have been patented", (Jun. 6, 2011), 5 pgs.

Nickinson, Phil, "Front-facing cameras mean hand-free gesture commands for Android", [Online]. Retrieved from the Internet: <URL: http://www.androidcentral.com/front-facing-cameras-mean-hands-free-gesture-co . . . >, (Accessed Feb. 14, 2013), 6 pgs.

Pierrepont, Nathalie, "Amongst Promises of a Perfect Fit, What Fits and What Doesn't?", Business of Fashion, [Online]. Retrieved from the Internet: <URL: http://www.businessoffashion.com/2012/12/fashion-2-0-amongst-promises-of-a-perfect-fit-what-fits-and-what-doesn't.html>, (Dec. 19, 2012), 5 pgs.

Saldanha, Carlos, et al., "System and Method for Displaying Selected Garments on a Computer-Simulated Mannequin", [Online]. Retrieved from the Internet: <URL: http://www.faqs.org/patents/app/20100302275>, (Dec. 2, 2010), 10 pgs.

Slawski, Bill, "Would You Give A Search Engine a 3D Model of Your Body?—SEO by the Sea", [Online]. Retrieved from the Internet: <URL: http://www.seobythesea.com/2009/01/would-you-give-a-search-engine-a-3d-model-of-your-body/>, (Jan. 16, 2009), 11 pgs.

Sterling, Bruce, "Beyond the Beyond—Augmented Reality: Kinect fitting-room for TopShop, Moscow", [Online]. Retrieved from the Internet: <URL: http://www.wired.com/beyond_the_beyond/2011/05/augmented-reality-kinect-fitting-room-for-topshop-moscow/>, (May 10, 2011), 2 pgs.

Stevens, Tim, "Apple patent application opens the door to free-form acoustic gesture commands", [Online]. Retrieved from the Internet: <URL: http://www.engadget.com/2011/02/21/apple-patent-application-opens-the-door-to . . . >, (Feb. 21, 2011), 3 pgs.

Woolley, Richard, "Gesture Commands Performed in Proximity but Without Make Physical Contact with a Touchpad", [Online]. Retrieved from the Internet: <URL: http://www.faqs.org/patents/app/20090167719>, (Jul. 2, 2009), 4 pgs.

Wulfhart, Neil, "The Future of Shopping: An Avatar Lets You Find the Perfect Fit", The Slate Group, [Online]. Retrieved from the Internet: <URL: http://www.slate.com/blogs/future_tense/2012/07/19/me_ality_body_scanner_creates_an_avatar_to_make_clothes_shopping_a_breeze_.html>, (Jul. 19, 2012), 3 pgs.

"U.S. Appl. No. 13/725,209, Non Final Office Action dated Oct. 6, 2015", 12 pgs.

"International Application Serial No. PCT/US2015/037663, International Search Report dated Sep. 14, 2015", 2 pgs.

(56) References Cited

OTHER PUBLICATIONS

"International Application Serial No. PCT/US2015/037663, Written Opinion dated Sep. 14, 2015", 8 pgs.
"International Application Serial No. PCT/US2015/044249, International Search Report dated Oct. 23, 2015", 2 pgs.
"International Application Serial No. PCT/US2015/044249, Written Opinion dated Oct. 23, 2015", 5 pgs.
"U.S. Appl. No. 13/679,498, Final Office Action dated Nov. 4, 2016", 37 pgs.
"U.S. Appl. No. 13/679,498, Response filed Sep. 30, 2016 to Non Final Office Action dated Jun. 30, 2016", 15 pgs.
"U.S. Appl. No. 13/725,209, Non Final Office Action dated Sep. 9, 2016", 11 pgs.
"U.S. Appl. No. 14/315,230, Non-Final Office Action dated Dec. 30, 2016", 23 pgs.
"U.S. Appl. No. 14/450,177, Non Final Office Action dated Aug. 9, 2016", 14 pgs.
"International Application Serial No. PCT/US2015/037663, International Preliminary Report on Patentability dated Jan. 5, 2017", 10 pgs.
"U.S. Appl. No. 13/679,498, Non Final Office Action dated Sep. 4, 2015", 30 pgs.
"U.S. Appl. No. 13/679,498, Response filed Aug. 18, 2015 to Non Final Office Action dated Jun. 18, 2015", 12 pgs.
"U.S. Appl. No. 13/725,209, Response filed Jul. 8, 2015 to Final Office Action dated Apr. 18, 2015", 19 pgs.
"U.S. Appl. No. 13/679,498, Examiner Interview Summary dated May 2, 2016", 3 pgs.
"U.S. Appl. No. 13/679,498, Non Final Office Action dated Jun. 30, 2016", 38 pgs.
"U.S. Appl. No. 13/679,498, Response filed May 23, 2016 to Final Office Action dated Jan. 22, 2016", 14 pgs.
"U.S. Appl. No. 13/725,209, Response filed May 26, 2016 to Final Office Action dated Feb. 26, 2016", 10 pgs.
"International Application Serial No. PCT/US2015/042683, International Search Report dated Mar. 29, 2016", 2 pgs.
"International Application Serial No. PCT/US2015/042683, Written Opinion dated Mar. 29, 2016", 5 pgs.
"U.S. Appl. No. 13/679,498, Final Office Action dated Jan. 22, 2016", 38 pgs.
"U.S. Appl. No. 13/679,498, Response filed Dec. 4, 2015 to Non Final Office Action dated Sep. 4, 2015", 13 pgs.
"U.S. Appl. No. 13/725,209 Final Office Action dated Feb. 26, 2016", 12 pgs.
"U.S. Appl. No. 13/725,209, Response filed Jan. 6, 2016 to Non Final Office Action dated Oct. 6, 2015", 17 pgs.
Rosenfeld, Azriel, "Picture Processing by Computer", Academic Press, (1969), 28 pgs.
"U.S. Appl. No. 13/679,498, Examiner Interview Summary dated Aug. 21, 2017", 3 pgs.
"U.S. Appl. No. 14/450,177, Non Final Office Action dated Aug. 25, 2017", 11 pgs.
"U.S. Appl. No. 13/679,498, Non Final Office Action dated May 15, 2017", 40 pgs.
"U.S. Appl. No. 13/679,498, Response filed Apr. 4, 2017 to Final Office Action dated Nov. 4, 2016", 13 pgs.
"U.S. Appl. No. 14/315,230, Response filed May 30, 2017 to Non-Final Office Action dated Dec. 30, 2016", 14 pgs.
"U.S. Appl. No. 14/450,177, Final Office Action dated Mar. 3, 2017", 11 pgs.
"U.S. Appl. No. 14/450,177, Response filed Feb. 9, 2017 to Non Final Office Action dated Aug. 9, 2016", 14 pgs.
"U.S. Appl. No. 14/450,177, Response filed Aug. 3, 2017 to Final Office Action dated Mar. 3, 2017", 12 pgs.
"International Application Serial No. PCT/US2015/042683, International Preliminary Report on Patentability dated Feb. 16, 2017", 7 pgs.
"International Application Serial No. PCT/US2015/044249, International Preliminary Report on Patentability dated Feb. 16, 2017", 7 pgs.

Response to Non-Final Office Action filed on Aug. 31, 2017 for U.S. Appl. No. 13/679,498, dated May 15, 2017, 12 pages.
Final Office Action received for U.S. Appl. No. 14/315,230, dated Sep. 14, 2017, 23 pages.
Notice of Allowance received for U.S. Appl. No. 13/679,498, dated Oct. 5, 2017, 12 pages.
Non-Final Office Action received for U.S. Appl. No. 14/454,619, dated Jan. 3, 2018, 20 pages.
Corrected Notice of Allowance received for U.S. Appl. No. 13/679,498, dated Jan. 8, 2018, 12 pages.
Preliminary Amendment for U.S. Appl. No. 15/868,167, filed Jan. 18, 2018, 9 pages.
"U.S. Appl. No. 14/315,230, Response filed Feb. 12, 2018 to Final Office Action dated Sep. 14, 2017", 13 pgs.
Applicant Initiated Interview Summary received for U.S. Appl. No. 14/450,177, dated Jun. 29, 2018, 3 pages.
Final Office Action received for U.S. Appl. No. 14/450,177, dated Apr. 2, 2018, 12 pages.
Response to Non-Final Office Action filed on Feb. 26, 2018, for U.S. Appl. No. 14/450,177, dated Aug. 25, 2017, 13 pages.
Response to Non-Final Office Action filed on Jun. 4, 2018, for U.S. Appl. No. 14/454,619, dated Jan. 3, 2018, 17 pages.
Applicant Initiated Interview Summary received for U.S. Appl. No. 14/474,116, dated Feb. 1, 2018, 3 pages.
Applicant Initiated Interview Summary received for U.S. Appl. No. 14/474,116, dated Sep. 19, 2017, 3 pages.
Applicant Initiated Interview Summary Received for U.S. Appl. No. 14/474,116 dated Apr. 27, 2018, 3 pages.
Final Office Action received for U.S. Appl. No. 14/474,116, dated Jul. 20, 2017, 12 pages.
Non-Final Office Action received for U.S. Appl. No. 14/474,116, dated Mar. 28, 2018, 12 pages.
Non-Final Office Action received for U.S. Appl. No. 14/474,116, dated Jan. 25, 2017, 18 pages.
Non-Final Office Action received for U.S. Appl. No. 14/474,116, dated Nov. 1, 2017, 12 pages.
Response to Final Office Action filed on Sep. 28, 2017, for U.S. Appl. No. 14/474,116, dated Jul. 20, 2017, 11 pages.
Response to Non-Final Office Action filed on Apr. 25, 2017, for U.S. Appl. No. 14/474,116, dated Jan. 25, 2017, 10 pages.
Response to Non-Final Office Action filed on Feb. 1, 2018, for U.S. Appl. No. 14/474,116, dated Nov. 1, 2017, 11 pages.
Response to Non-Final Office Action filed on Jun. 27, 2018, for U.S. Appl. No. 14/474,116 , dated Mar. 28, 2018, 27 pages.
Dmuldoonlla "Using a Clinometer to Measure Height", http://www.instructables.com/id/Using-a-clinometer-to-measure-height/, Apr. 23, 2013, 12 pages.
"U.S. Appl. No. 14/315,230, Non Final Office Action dated Sep. 18, 2018", 30 pgs.
"U.S. Appl. No. 14/450,177, Response filed Oct. 1, 2018 to Final Office Action dated Apr. 2, 2018", 13 pgs.
"Augmented Reality Virtual Fitting Room", Retrieved from the Internet URL: https: www.youtube.com watch?v=F-3qC4q8toU, (Feb. 12, 2012), 2 pages.
"Online Fitting Room Shopping Augmented Reality", Retrieved from the Internet URL: https: www.youtube.comwatch?v=OHAyOtluqtY, (Apr. 29, 2011), 2 pages.
"Applicant-Initiated Interview Summary received for U.S. Appl. No. 14/474,116, dated Aug. 14, 2018", (Aug. 14, 2018), 3 pages.
"Final Office Action received for U.S. Appl. No. 14/474,116, dated Jul. 27, 2018", (Jul. 27, 2018), 11 pages.
"Response to Final Office Action filed on Sep. 28, 2018, for U.S. Appl. No. 14/474,116, dated Jul. 27, 2018", (Sep. 28, 2018), 15 pages.
"U.S. Appl. No. 14/450,177, Non Final Office Action dated Oct. 19, 2018", 13 pgs.
"U.S. Appl. No. 14/454,619, Final Office Action dated Nov. 2, 2018", 25 pgs.
Andrew, "Robust High-Resolution Cloth Using Parallelism, History-Based Collisions and Accurate Friction", IEEE Transactions on Visualization and Computer Graphics, vol. 15, No. 2, 2009, (Mar.-Apr. 2009), pp. 339-350.

(56) References Cited

OTHER PUBLICATIONS

Response to Non-Final Office Action filed Dec. 18, 2018, for U.S. Appl. No. 14/315,230, dated Sep. 18, 2018, 17 pages.
Applicant Initiated Interview Summary received for U.S. Appl. No. 14/474,116, dated Feb. 1, 2019, 3 pages.
Non-Final Office Action received for U.S. Appl. No. 14/474,116, dated Jan. 3, 2019, 7 pages.
Response to Final Office Action filed Jan. 29, 2019, for U.S. Appl. No. 14/454,619, dated Nov. 2, 2018, 18 pages.
Response to Non-Final Office Action filed Jan. 31, 2019, for U.S. Appl. No. 14/474,116, dated Jan. 3, 2019, 21 pages.
Non-Final Office Action received for U.S. Appl. No. 15/868,167 dated Mar. 21, 2019, 28 pages.
Notice of Allowance received for U.S. Appl. No. 14/474,116, dated Mar. 22, 2019, 7 pages.
Response to Non-Final Office Action filed Apr. 1, 2019 for U.S. Appl. No. 14/450,177, dated Oct. 19, 2018, 13 pages.
Final Office Action received for U.S. Appl. No. 14/450,177, dated Apr. 15, 2019, 14 pages.
Non-Final Office Action received for U.S. Appl. No. 14/454,619 dated Apr. 15, 2019, 31 pages.
Final Office Action received for U.S. Appl. No. 14/315,230, dated Apr. 16, 2019, 30 pages.
Applicant Initiated Interview Summary received for U.S. Appl. No. 15/868,167, dated Apr. 18, 2019, 4 pages.

* cited by examiner

FIG. 8

METHODS AND SYSTEMS FOR VIRTUAL FITTING ROOMS OR HYBRID STORES

TECHNICAL FIELD

Example embodiments of the present application relate generally to processing data and, more particularly in one embodiment, to a system and method for facilitating digital inventories.

BACKGROUND

Vendors may have marketplaces that are online marketplaces or real-world marketplaces (e.g., a brick-and-mortar store location). Online marketplaces may include websites or mobile applications where users may buy or sell goods or services (referred to collectively as "items") from a provider of the online marketplace or other users of the online marketplace. The online marketplace may present the items to the users in a published listing. Vendors that have real-world marketplaces may also have online marketplace counterparts. Accordingly, buyers may have an option to shop for items from a vendor through the vendor's online marketplaces and/or the real-world marketplaces.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

FIG. 8 is an interface diagram illustrating an example user interface of a product page with multiple display elements delivered to a user device of a digital inventory system, according to an example embodiment.

DETAILED DESCRIPTION

Figure 1:
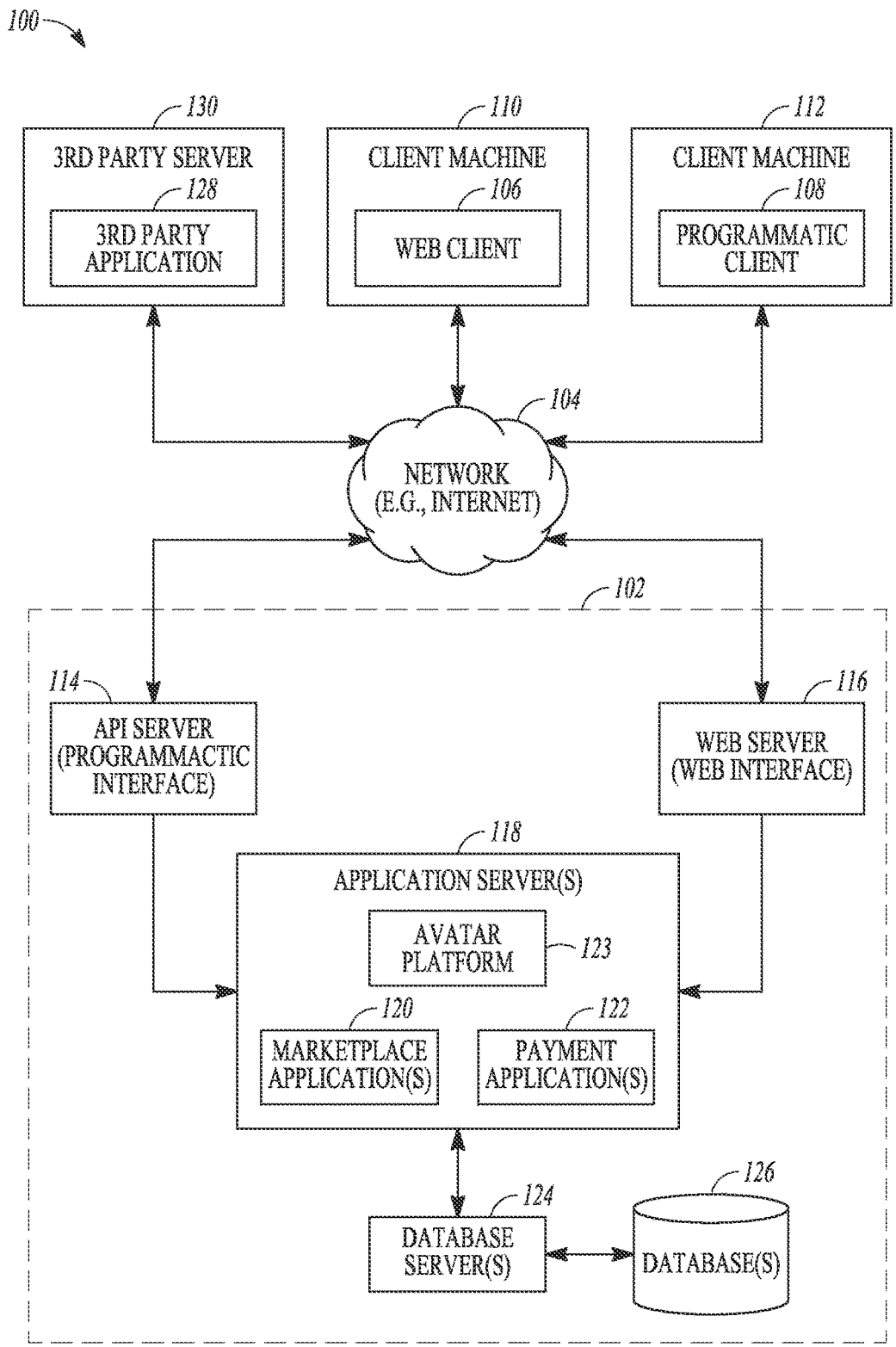
FIG. 1 is a network diagram depicting a client-server system, within which one example embodiment may be deployed.

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present disclosure, components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope and spirit of the concepts disclosed herein. Embodiments may also be tangibly embodied as a set of computer instructions stored on a computer readable medium, such as a memory device.

Example methods and systems for providing a digital inventory system and methods, which are embodied on electronic devices, are described. In the following description, for purposes of explanation, numerous specific details are set forth in order to provide a thorough understanding of example embodiments. It will be evident, however, to one skilled in the art that the present inventive subject matter may be practiced without these specific details.

One concern for vendors is implementing e-commerce marketplaces in conjunction with online counterparts. It may be desirable to present an online marketplace having look and feel that is coherent with the physical stores of the vendor. Moreover, there is a challenge of presenting the online marketplace and the physical stores as an integrated shopping experience, rather than alternative shopping venues. As such, there is a challenge to manage, communicate, and present the large amount of inventory data of a vender to the user. For example, an online marketplace application may include data for a large number of items, each item having one or more variations. A physical store may, however, be able to carry only a fraction of the items in inventory. This makes it a challenge for users to make purchasing decisions in a physical store. Accordingly, there is a need to process and analyze the data of online marketplace applications in order to operate online marketplace applications in an integrated way with the physical store locations.

Additionally, another concern for e-commerce sellers is how to provide a shopping experience that is similar to shopping at a brick and mortar store. Shopping in a physical retail store evokes an emotional response: seeing the clothing, touching the items, hearing the store music, and seeing how one looks in the apparel. The look and feel of the physical stores may play a positive role in the shopper's experience. There can also be a social aspect to shopping at a physical store. Groups of people may shop together, thereby facilitating recommendations of outfits, feedback on how items look on their friends, and any number of social interactions.

In contrast, online marketplaces may attempt to demonstrate how an item looks by showing an image of the item on a professional model. It may be difficult for a user to envision how the item will look on the user instead. Moreover, online marketplaces may not effectively facilitate social interactions between users. That is, e-commerce shopping may provide a more solitary experience than shopping at a brick-and-mortar store. E-commerce shopping, therefore, may not include some of the fun, social aspects that may be enjoyed by shopping at brick-and-mortar stores.

One result of online marketplaces not being able to match these in-store experiences is that users may be discouraged from making purchases. The problem arises as to how to provide an e-commerce shopping experience that has some of the features of shopping at a brick-and-mortar store.

Example embodiments will be described, by way of example, in the context of items relating to clothing and accessories (e.g., watches, belts, jewelry, shoes, socks, purses, etc.). It will be appreciated, however, that items may be any suitable items, such as, but not limited to, makeup and other cosmetics, accessory items, food, pharmaceuticals, furniture, toys, tools, electronic devices, vehicles, media content, memorabilia, antiques, collectibles, tools, games, and equipment, to provide a few examples.

In an example embodiment, a digital inventory system may provide digital fitting rooms and, additionally or alternatively, digital services within a physical store. For example, the digital inventory system may use data records for generating digital representations of physical items of a registered user (e.g., a user having a corresponding user account of the digital inventory system). Each data record may include image data for rendering a visual depiction of the corresponding physical item. Furthermore, the data record may include data (e.g., tags and metadata) describing attributes of the item. The digital inventory system may keep data records of any type of item, which may include items a user owns (e.g., past purchases), items the user would like to own (e.g., wish list items), saved combinations of items (e.g., outfits), and the like. A user interface of the digital inventory system may be presented to the user as including a virtual environment containing the digital representations of items.

In an example aspect, online marketplaces may interface with the digital inventory system to access data, features, and/or services of the digital inventory system. These online marketplaces may be referred to as "registered online marketplaces" herein. In an example embodiment, a registered user may access a product webpage of a registered online marketplace. The registered online marketplace may transmit data or code for providing a user interface element selectable to evaluate the selected product relative to the digital inventory of the registered user. In response, the digital inventory system may process the data of the registered online marketplace (e.g., attribute data of the item record) and data of the registered user (e.g., attribute data of the items of the user account). The digital inventory system may transmit data to the user (e.g., directly to the client device of the user or indirectly via the registered online marketplace) to display an indication of a characteristic of compatibility.

In an example embodiment, a characteristic of compatibility may include a measure of the number of matching outfits that may be formed from the target clothing item and the clothing inventory of the target user and/or the estimated cost per use of the target item. A measure of the number of matching outfits may be given, for example, as a number of matching outfits or as a percentage of items of the inventory that the target item is compatible with.

In another example embodiment, a digital avatar system provides data for displaying a digital avatar of the user. For example, a digital avatar may be generated, in part, based on measurement data of the user in order to provide a realistic look. Moreover, online marketplaces, such as websites or mobile applications, may support features that facilitate configuring a digital avatar to be shown as wearing the items of the online marketplace. As such, a user shopping on the online marketplace may select one or more products for displaying the selected product on a digital avatar of the user. The digital avatar may be generated based on the measurement data of the user and the size of the selected product. In this way, the user may see a digital representation of the user wearing the product so that the user can evaluate how the product looks on the user.

Additionally or alternatively, the data for generating the digital avatars may be shared between users, for example, by using a social network. In one aspect, a user may dress the digital avatar of a friend. Moreover, the user may share the "dressed up" digital avatar of the friend with the friend as a way to recommend an item, such as a shirt, a pair of jeans, a hat, or the like. Additionally or alternatively, a user may share his or her own digital avatar configured with one or more selected products in order to obtain comments from friends and/or contacts.

By allowing users to share digital avatar data with other users, a digital avatar system may facilitate "e-stylist" services. For example, a user ("customer") may hire a professional e-stylist who has access to the digital avatar data of the customer. The e-stylist may send to the customer one or more versions of the user's digital avatar. Each version may correspond to a different look, such as a different outfit. The professional e-stylist may receive compensation for products purchased based on the c-stylist's recommendations. It will be appreciated that friends of the user may serve as e-stylists, with or without compensation. Moreover, online marketplaces may provide paid or free e-stylist services to recommend targeted products to the customers.

FIG. 1 is a network diagram depicting a client-server system 100, within which one example embodiment may be deployed. A networked system 102, in the example form of a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112. Herein, the client machine 110 may be referred to as a "client device" "user device" in various applications.

An Application Program Interface (API) server 114 and a web server 116 are coupled to, and provide programmatic and web interfaces respectively to, one or more application servers 118. The application servers 118 host one or more marketplace applications 120, payment applications 122, and an avatar platform 123. The application servers 118 are, in turn, shown to be coupled to one or more database servers 124 that facilitate access to one or more databases 126.

The marketplace application(s) 120 may provide a number of marketplace functions and services to users that access the networked system 102. The payment application(s) 122 may likewise provide a number of payment services and functions to users. The payment application(s) 122 may allow users to accumulate value (e.g., in a commercial currency, such as the U.S. dollar, or a proprietary currency, such as "points") in accounts, and then later to redeem the accumulated value for items that are made available via the marketplace application(s) 120.

Further, while the system 100 shown in FIG. 1 employs a client-server architecture, the present inventive subject matter is of course not limited to such an architecture, and could equally well find application in a distributed, or peer-to-peer, architecture system, for example. The various marketplace and payment applications 120, 122 could also be implemented as standalone software programs, which do not necessarily have networking capabilities.

In addition, while the various marketplace and payment applications 120, 122 have been described above as having separate functionalities, in alternative embodiments these functionalities may be performed by any one or more of the various marketplace and payment applications 120, 122.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TURBOLISTER™ application developed by EBAY INC.™, of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Example Mobile Device

Figure 2:
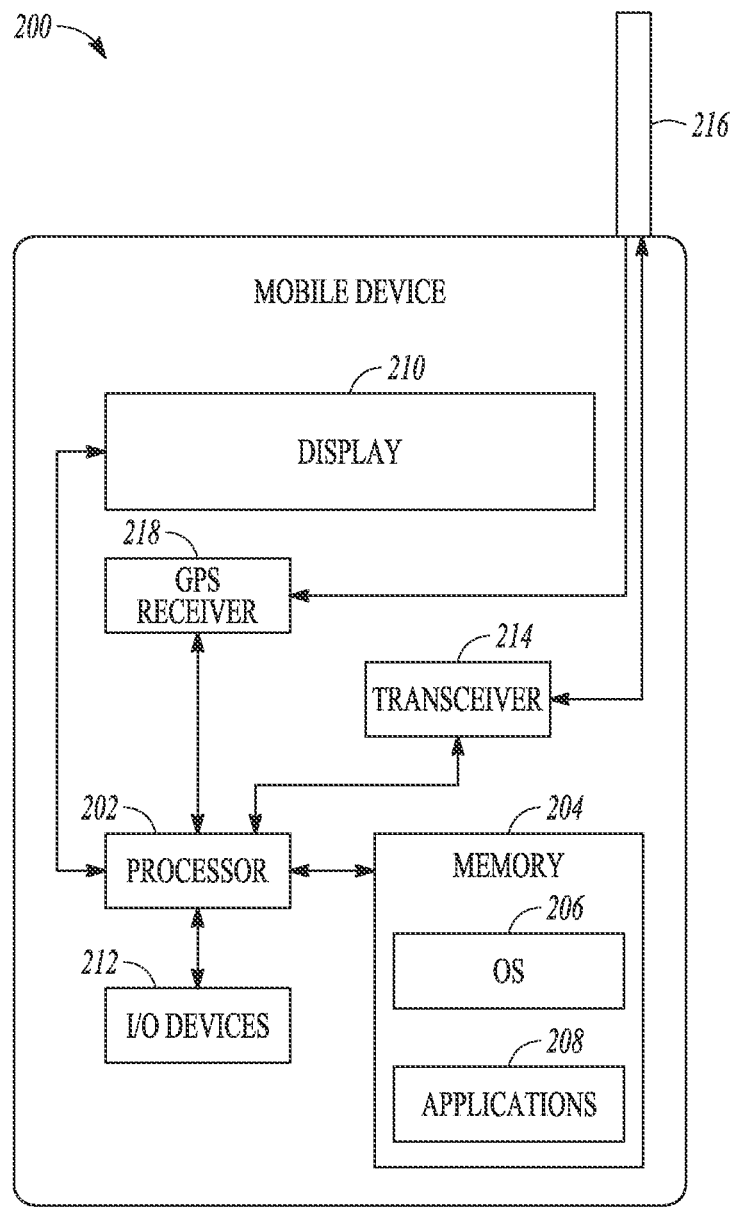
FIG. 2 is a block diagram illustrating a mobile device, according to an example embodiment.

FIG. 2 is a block diagram illustrating a mobile device 200, according to an example embodiment. The mobile device 200 may include a processor 202. The processor 202 may be any of a variety of different types of commercially available processors suitable for mobile devices (for example, an XScale architecture microprocessor, a Microprocessor without Interlocked Pipeline Stages (MIPS) architecture processor, or another type of processor). A memory 204, such as a random access memory (RAM), a Flash memory, or other type of memory, is typically accessible to the processor 202. The memory 204 may be adapted to store an operating system (OS) 206, as well as application programs 208, such as a mobile location-enabled application that may provide Location Based Services (LBSs) to a user. The processor 202 may be coupled, either directly or via appropriate intermediary hardware, to a display 210 and to one or more input/output (I/O) devices 212, such as a keypad, a touch panel sensor, a microphone, and the like. Similarly, in some embodiments, the processor 202 may be coupled to a transceiver 214 that interfaces with an antenna 216. The transceiver 214 may be configured to both transmit and receive cellular network signals, wireless data signals, or other types of signals via the antenna 216, depending on the nature of the mobile device 200. Further, in some configurations, a GPS receiver 218 may also make use of the antenna 216 to receive GPS signals.

Example Digital Inventory and/or Avatar Systems

Figure 3:
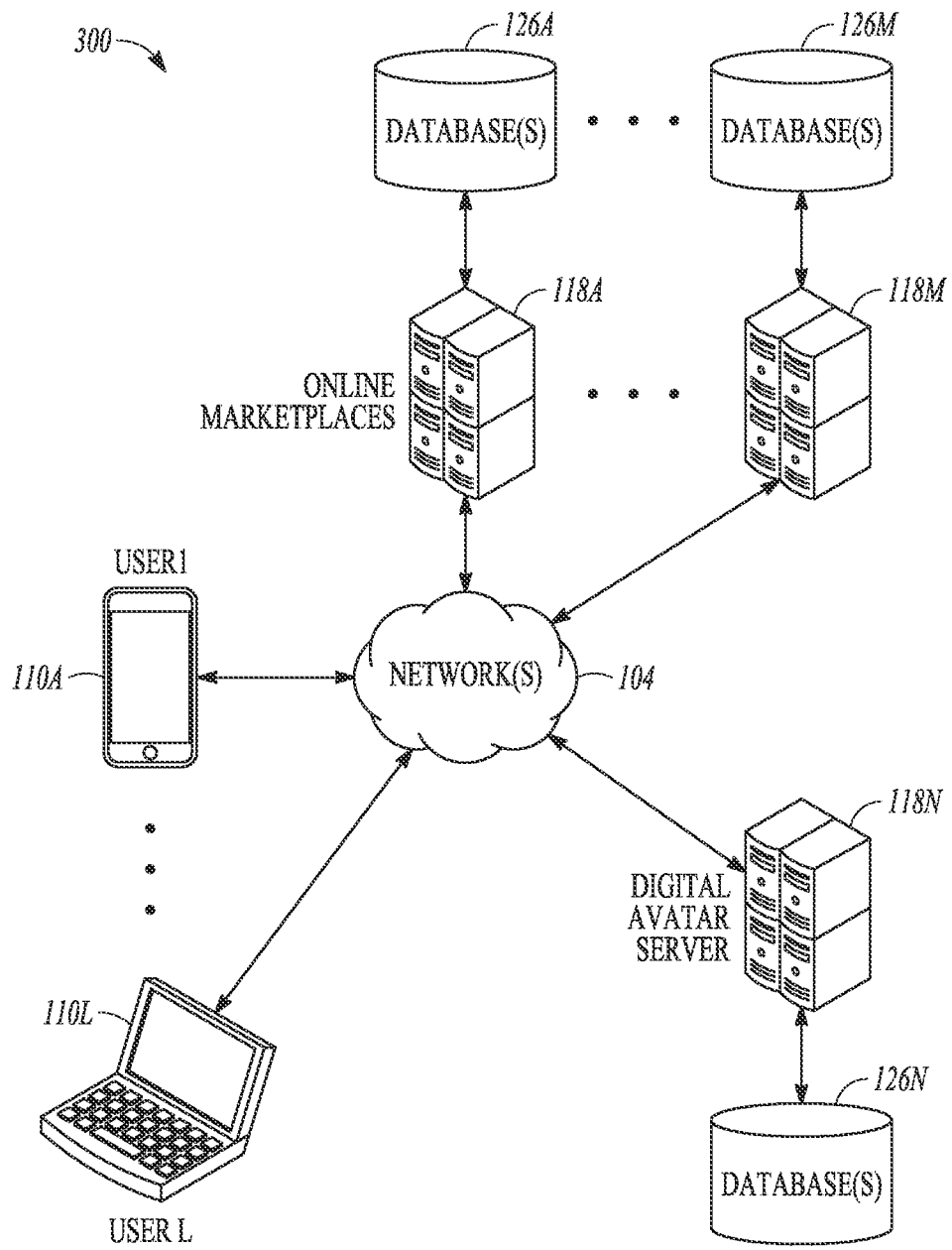
FIG. 3 is a network diagram depicting an example embodiment of a digital avatar network including multiple devices forming at least a portion of the client-server system of FIG. 1.

FIG. 3 is a network diagram depicting an example embodiment of a digital avatar network 300 including multiple devices forming at least a portion of the client-server system 100 of FIG. 1. The digital avatar network 300 may include one or more client devices (or "user devices") 110A-L, one or more online marketplace servers 118A-M, and one or more databases 126A-M. The digital avatar server 118N may embody a digital inventory system, a digital avatar system, or both.

In the illustrated embodiment, the one or more user devices 110A-110L are interconnected to one or more online marketplace servers 118A-118M via the network 104 for communicating online marketplace resources and/or data (e.g., data or code related to a webpage or software application of the online marketplace). The databases 126A-M may store data of the respective online marketplaces and/or marketplace accounts of the users of the devices 110A-L. Additionally, the digital avatar server 118N may be interconnected to the user devices 110A-L and the online marketplace servers 118A-M via the network 104 for providing digital inventory and/or digital avatar services for the users and/or the online marketplaces.

One concern with e-commerce shopping is that each online marketplace may have separate databases storing respective item records. As such, the online marketplaces may not have access to each other's databases. Moreover, each online marketplace may store item records using different formats and different standards. As such, the data between the online marketplaces may not be compatible. This may be an issue for consumers trying to evaluate an item of an online marketplace with the items that the user owns because the inventory items may have been purchased through different online marketplaces. Accordingly there is a need for a device that can manage data between the online marketplaces.

In an example embodiment, as will be described in greater detail below, the digital avatar server 118N may interface with the online marketplace servers 118A-M through the network 104. Accordingly, the online marketplace servers 118A-N may register with the digital avatar server 118N as vendor clients, which may include, e.g., communicatively coupling to the digital avatar server 118N and receiving access to services of the digital avatar server 118N. Furthermore, the user devices 110A-L may also register with the digital avatar server 118N as user clients. The digital avatar server 118N may store product records and user accounts in a consistent way so that the item data of the online marketplaces may be compared.

For example, in operation, the user devices 110A-L may render user interfaces of online marketplaces to browse and purchase items. The user interfaces may be rendered based on data provided by the online marketplace servers 118A-M. Each of the online marketplace servers 118A-M may correspond to different vendors (e.g., retailers). In one example embodiment, the online marketplaces may correspond to clothing retailers. However, it will be appreciated that in alternative embodiments, other types of marketplaces are contemplated. For example, example marketplaces may include any marketplace selling items that may be placed on the user's person (e.g., makeup and other cosmetics), items that the user may be placed in or on the item (e.g., a car, furniture, and the like), or any physical or digital product (e.g., media content, memorabilia, antiques, collectibles, tools, games, equipment, etc.).

As will be described in greater detail below, user interfaces may display a digital representation of the digital inventory of a user. For example, the users of the user devices 110A-L may create respective user accounts for storing data related to items of a digital inventory. For example, the user device 110A may connect to the digital avatar server 118N via a dedicated website, via a marketplace website, or an application executing on the user device 110A. Once connected, the user device 110A may transmit data to the digital avatar server 118N for creating or modifying a user account. The user account may include data for cataloguing items of the user and for generating a digital representation of the items, which will be described in greater detail later in connection with FIG. 6.

Additionally or alternatively, user interfaces may display a digital avatar of a user for showing the digital avatar with a selected item. For example, the users of the user devices 110A-L may create respective user accounts for storing data related to digital avatars. For example, the user device 110A may connect to the digital avatar server 118N via a dedicated website, via a marketplace website, or an application executing on the user device 110A. Once connected, the user device 110A may transmit data to the digital avatar server 118N for creating or modifying a user account. The user account may include data for generating a digital avatar of the user, which will be described in greater detail later in connection with FIG. 6.

On the vendor side, the respective online marketplace servers 118A-M may create vendor accounts. An example of a data structure of a vendor account will be described in greater detail later in connection with FIG. 6. With a vendor account, an online marketplace server (e.g., one of the servers 118A-M) may provide the digital avatar server 118N data for creating a product record. The product record may be used in conjunction with data of a selected user account for generating a digital avatar in the selected product.

In an example embodiment, each of the online marketplace servers 118A-M may access the digital avatar server 118N to access the user accounts stored in the database 126N. In this way, for example, the digital avatar server 118N may provide avatar data as a service. Moreover, in some embodiments, the digital avatar network 300 may define interfaces and protocols for providing avatar services such that a user account may be used by the plurality of online marketplace servers 118A-M. As such, an avatar may be generated as wearing items from two or more online marketplaces. In another embodiment, users of the user devices 110A-L may share avatar data with other users, as will be described in greater detail.

Figure 4:
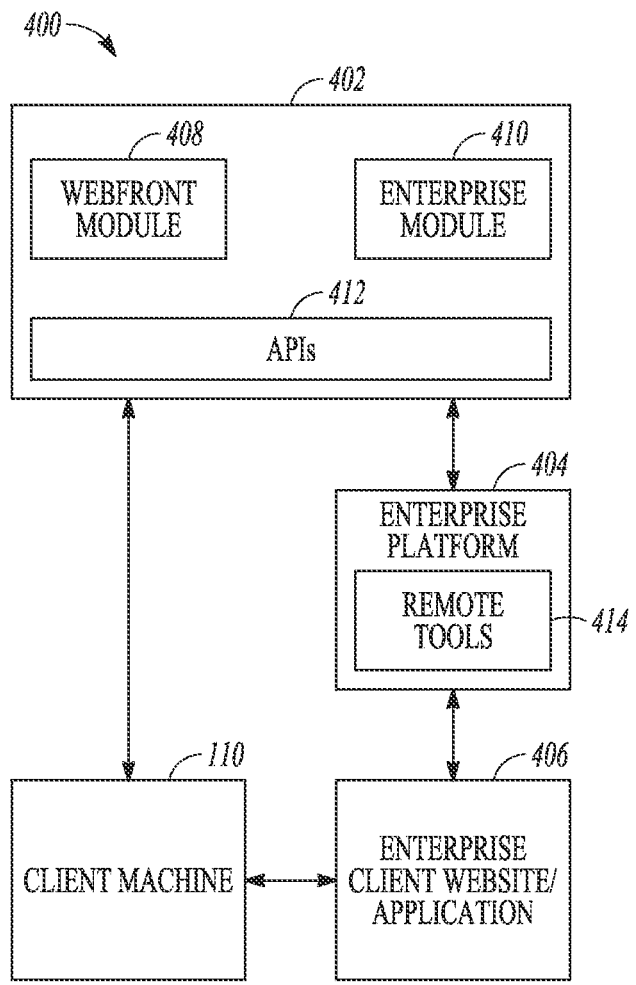
FIG. 4 is a block diagram depicting an example embodiment of a system including multiple applications and components included by at least a portion of the client-server system of FIG. 1.

FIG. 4 is a block diagram depicting an example embodiment of a system 400 including multiple components included by at least a portion of the client-server system 100 of FIG. 1. The block diagram of FIG. 4 may correspond to an application view of the client-server system 100 of FIG. 1. The system 400 includes an avatar platform 402, an enterprise platform 404, an enterprise client website/application ("enterprise client") 406, and the client machine 110 of FIG. 1. The avatar platform 402 may include a web front module 408, an enterprise module 410, and one or more APIs 412 for interacting with the enterprise platform 404 and/or the client machine 110. The enterprise platform 404 may include remote tools 414. The avatar platform 402 may correspond to the digital avatar server 118N of FIG. 3. The enterprise platform 404 and the enterprise client 406 may correspond to one or more of the online marketplace servers 118A-M of FIG. 3. In alternative embodiments, the components of FIG. 4 may be included by alternative components of FIG. 1.

The enterprise module 410 of the avatar platform 402 may facilitate integrating information for customization with the enterprise platform 404 and the remote tools 414. For example, the enterprise module 410 may provide configuration and rules-based options that provide vendors the capability to decide which digital avatar feature to make available to users of their sites. For example, a vendor may provide a template of a product record. The template may designate that a front view image of the digital avatar should be provided in order for the product to comply with the digital avatar services. The enterprise module 410 may provide options for users to "share" their avatar data with others for pair-shopping (e.g., a feature called "take your avatar friend"). The enterprise module 410 may also provide options for users to go virtual shopping with avatars of family members, friends, contacts, or other users. As stated above, a user may share avatar data with other users so the users can "take you out" shopping on partner websites.

The web front module 408 may provide a customer-facing user interface module for capturing the customer attributes. In an example embodiment, a user may upload photos in certain poses (so that measurements can be digitized in a standard manner). Dress attributes for a user may be captured based on, for example, 2-3 photos that user uploaded. As will be described in detail below, using the photos, as well as the height and/or weight of the user, the avatar platform 402 may identify dress measurements (e.g., six or more measurements) that a tailor may use. Accordingly, in one example embodiment, the avatar platform 402 may serve as an "e-tailor" system for automated custom dress measurements and fittings. It will be appreciated that the avatar platform 402 may digitally determine measurements of the user based on uploaded user photos using mathematical algorithms or third party APIs.

The web front module 408 may provide a user interface prompting users to input specified attributes—such as, but not limited to, age, favorite color, style choices, etc. The web front module 408 may prompt users to input other optional features like family, area of residence, etc. The avatar platform 402 may save this information in a user account (also referred to herein as "user record"). Users may update or edit the user account via the web front module 408 in an example embodiment.

The APIs 412 may make user account data available to third-party applications and/or services. For example, within applications of the avatar platform 402, as well as external applications (e.g., third-party online vendors), APIs 412 may integrate products, webpages, applications, services, and the like with digital avatar data. For example, the remote tools 414 may facilitate creating or modifying product records that support digital avatar services. The data to create or modify product records may be sent to the digital avatar platform 402 through a vendor-facing portion of the APIs 412. Accordingly, the avatar platform 402 may facilitate integration with third party systems, such as Mobile/Tablet apps, Business-to-Consumer (B2C), web service calls, etc., and may facilitate licensing avatar data and/or services.

As stated above, the enterprise platform 404 and remote tools 414 may provide the administrator a way to set up an online marketplace for the system 400. For example, the administrator may indicate that an item is avatar enabled, whereas other items may not be. The remote tools 414 may prompt the vendor user to enter attributes for the item. The avatar platform 402 may provide a preview of the item on a default avatar profile after which the administrator may confirm and save the settings. The remote tools 414 may also provide the administrator with the ability to apply the same settings to multiple items using a template of attributes.

Figure 5:
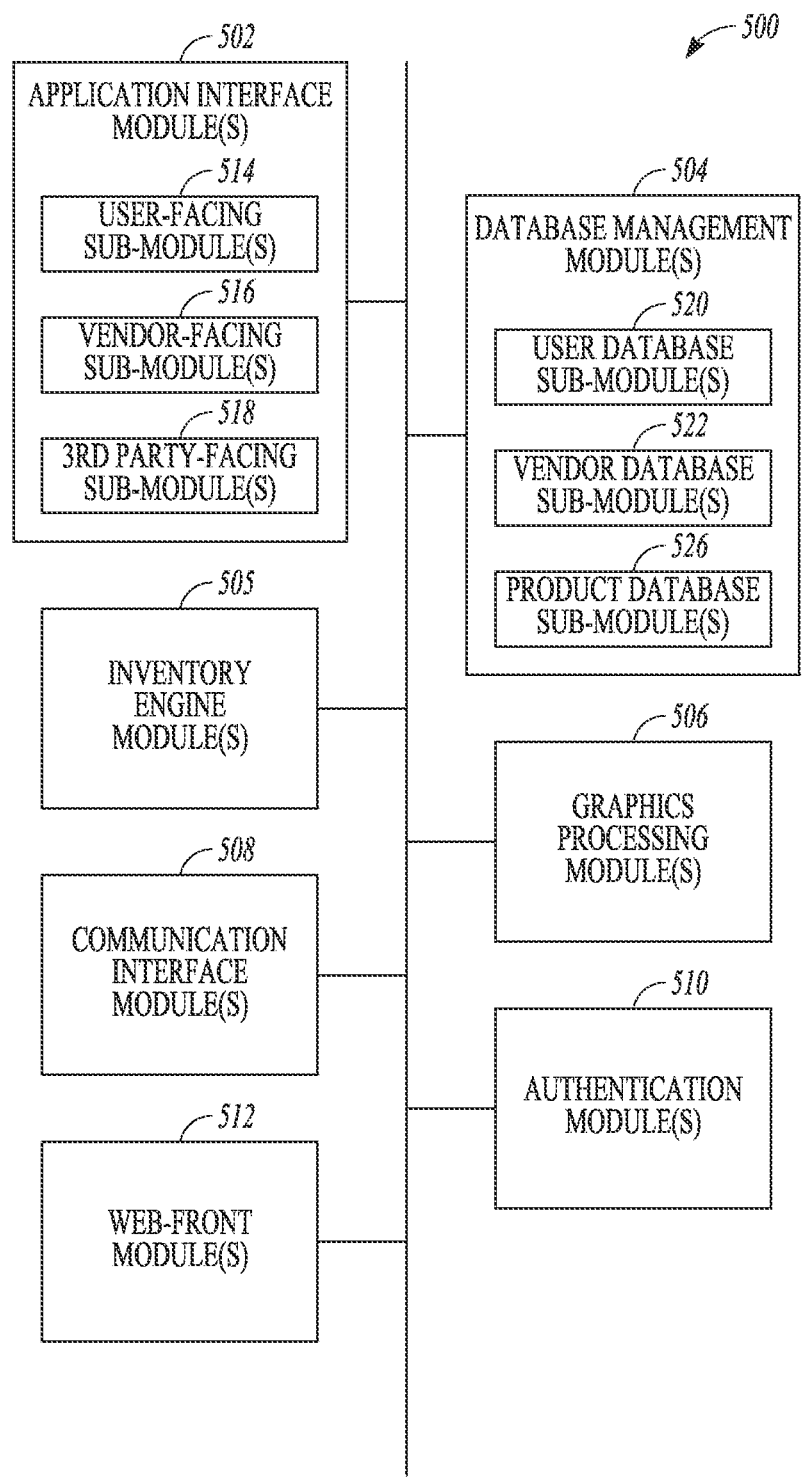
FIG. 5 is a block diagram illustrating an example embodiment of a digital inventory system including multiple modules forming at least a portion of the client-server system of FIG. 1.

FIG. 5 is a block diagram illustrating an example embodiment of a digital inventory system 500 including multiple modules forming at least a portion of the client-server system of FIG. 1. The modules 502-512 of the illustrated digital inventory system 500 include an application interface module(s) 502, a database management module(s) 504, an inventory engine module(s) 505, a graphics processing module(s) 506, a communication interface module(s) 508, an authentication module(s) 510, and a web-front module(s) 512. The application interface module(s) 502 includes a user-facing sub-module(s) 514, a vendor-facing sub-module(s) 516, and a third-party facing sub-module(s) 518, which may correspond to APIs 412. The database management module(s) 504 may include a user database sub-module(s) 520, a vendor database sub-module(s) 522, and a product database sub-module(s) 526.

In some embodiments, the components of the digital inventory system 500 can be included in the avatar platform 123 of FIG. 1. However, it will be appreciated that in alternative embodiments, one or more components of the digital inventory system 500 described below can be included, additionally or alternatively, in other devices, such as one or more of the applications 120, 122, the servers 114, 116, 118, 130, the network 104, and/or the client machines 110, 112 of FIG. 1.

The modules 502-512 of the digital inventory system 500 may be hosted on dedicated or shared server machines (not shown) that are communicatively coupled to enable communications between server machines. Each of the modules 502-512 are communicatively coupled (e.g., via appropriate interfaces) to each other and to various data sources, so as to allow information to be passed between the modules 502-512 of the digital inventory system 500 or so as to allow the modules 502-512 to share and access common data. The various modules of the digital inventory system 500 may furthermore access one or more databases 126 via the database server(s) 124.

The digital inventory system 500 may facilitate generating and displaying digital inventory data and/or digital avatar data corresponding to a digital representation of a user with a product. The digital inventory system 500 may receive user data for generating or updating user accounts containing inventory data, measurement data, and/or image data of the user. Likewise, the digital inventory system 500 may receive vendor data for generating or updating vendor accounts, which may include one or more product records. For example, each product record may include one or more variations of image data to provide model data for sizes of the product on various sizes of avatars (e.g., a size-small shirt on a size-15 avatar, a size-medium shirt on a size-15 avatar, a size-medium shirt on a size-15.5 avatar, etc.).

To this end, the digital inventory system 500 is shown to include the application interface module(s) 502, the database management module(s) 504, the inventory engine module(s) 505, the graphics processing module(s) 506, the communication interface module(s) 508, the authentication module(s) 510, and the web-front module(s) 512, which may serve to provide digital avatars.

The application interface module(s) 502 may be a hardware-implemented module(s) which may be configured to communicate data with client devices. From the perspective of the digital inventory system 500, client devices may include user devices, such as client machine 110 of FIG. 1, and/or vendor devices, such as application server(s) 118 of FIG. 1. For example, the digital inventory system 500 may support digital inventory and digital avatar services for both user devices and vendor devices. The application interface module(s) 502 may include the user-facing sub-module(s) 514 and the vendor-facing sub-module(s) 516 for interfacing with user devices and vendor devices, respectively. For example, the user-facing sub-module(s) 514 of the application interface module(s) 502 may receive, from a user device at a physical store location of an online marketplace, a request message to determine availability of a target item at the physical store location.

Additionally or alternatively, the digital inventory system 500 may communicate with third party devices for providing or receiving data or services. Third party devices may include vendors that provide data storage or processing, such as image processing or social networking services. Another example of a third-party device may be e-stylists who utilize data and services of the digital inventory system 500 for making recommendations to, and/or purchases on the behalf of, other users. It will be appreciated that an e-stylist may provide free or paid services. For example, a professional e-stylist may receive a commission from either the user or vendors for purchases. As another example, an e-stylist may be a friend or contact of the user and may provide recommendations as a free social activity. Accordingly, the application interface module(s) 502 may include the third-party-facing sub-module(s) 518 for interfacing with third-party devices and facilitating third-party services.

In operation, the application interface module(s) 502 may receive an evaluate request message from a client device of a vendor. For example, the vendor-facing sub-module(s) 516 may receive a request message to evaluate a target item of an online marketplace in comparison with an inventory of a target user. The evaluate request message may include identification data of the target item and the target user. As will be described later, in one example embodiment, the request message may be sent to the application interface module(s) 502 in response to the client selecting a control element of a user interface of an online marketplace.

Additionally or alternatively, the application interface module(s) 502 may receive an avatar request message that corresponds to a request to render a digital representation of a target user combined with a target product. For example, the target user may correspond to the requesting user or a contact who provided access privileges to the contact's avatar data. An example of a digital representation of a target user combined with the target product includes the digital avatar of the target user being displayed as wearing the target product, which may be an article of clothing or a fashion accessory.

The vendor-facing sub-module(s) 516 of the application interface module(s) 502 may facilitate interfacing the digital inventory system 500 with a vendor application, such as the online marketplace servers 118A-M of FIG. 3. The vendor-facing sub-module(s) 516 may receive data from a vendor application as input and may provide data to a vendor application as output. Moreover, the vendor-facing sub-module(s) 516 may facilitate transcoding messages from one format to another format for supporting multiple interface definitions.

In one aspect, the vendor-facing sub-module(s) 516 may receive vendor data and/or product data from an online marketplace client device for generating vendor accounts and product records. For example, a vendor application may register an account with the digital avatar server 118N (FIG. 3) by providing the vendor-facing sub-module(s) 516 account data. Moreover, the vendor application may create one or more product records. The product records may include image data and attribute data suitable for a digital inventory. Furthermore, the product records may, additionally or alternatively, be suitable for providing at least a portion of a digital avatar, as well as defining one or more attributes. Example embodiments of a vendor account and a product record will be described later in greater detail in connection with FIG. 6.

As stated, the third-party-facing sub-module(s) 518 of the application interface module(s) 502 may facilitate interfacing the digital inventory system 500 with third party devices. The third-party-facing sub-module(s) 518 may receive data from third-party applications as inputs and transmit data to the third party applications as output. Examples of third-party applications may include server and/or client applications that may facilitate generating avatar data, linking data between users, providing data storage, and the like.

The database management module(s) 504 may be a hardware-implemented module which may maintain account and record data, such as user accounts, vendor accounts, and/or product accounts, for facilitating digital inventory and/or digital avatar services. Accordingly, in the illustrated embodiment, the database management module(s) 504 includes sub-modules 520, 522, 526, for managing respective user account, vendor account, and product record databases. The database management module(s) 504 may interface with one or more data storage devices, such as the database(s) 126 of FIG. 1, to read or write data.

In one example embodiment, the database management module(s) 504 may be configured to provide access to item records (also referred to as "product records") and user accounts. The user accounts may include respective inventory items. The item records and the inventory items may each include respective attribute data. Attribute data may facilitate comparisons of an item of an online marketplace with items of an inventory.

In operation, the database management module(s) 504 may update the data storage devices based on data received by the application interface module(s) 502. For example, the user-facing sub-module(s) 514 may provide data to the user database sub-module(s) 520 as an input for creating, updating, or linking user accounts. Likewise, the vendor-facing sub-module(s) 516 may provide data to the vendor database sub-module(s) 522 as an input for creating or updating vendor accounts and/or product records.

Moreover, the database management module(s) 504 may facilitate providing model data for rendering digital avatars by accessing data stored in the user and product databases. For example, in response to an avatar request message, the database management module(s) 504 may select a first user account (or "user record") from a user database stored on the data storage devices. The selection may be based on a user identifier associated with, or included by, the avatar request message. The user account may include measurement data and image data of the corresponding user (collectively forming at least a portion of the user's "avatar data"). Furthermore, the database management module(s) 504 may select a product record from a second database based on the product identifier. The product record may include one or more images for generating, with the user's avatar data, model data of the digital avatar.

Additionally or alternatively, the database management module(s) 504 may facilitate sharing avatar data between users. For example, the application interface module(s) 502 may receive a share request message for requesting that data of a first user account be shared with a second user. For example, the share request message may include a first identifier indicative of a first user record and a second identifier indicative of a second user record.

The database management module(s) 504 may, in turn, provide or write linking data to the second user account. The linking data may facilitate access to the user record of the first user for the second user. In one embodiment, the database management module(s) 504 may access, based on the second identifier, the second user record from the first database. The database management module(s) 504 may also write linking data to the second user record. The linking data, as stated, may provide access privileges to the first user record for the second user. Consequently, a friend or contact of a user may gain access privileges to the user's avatar data.

The inventory engine module(s) 505 may be a hardware-implemented module which may facilitate digital inventories. For example, the inventory engine module(s) 505 may receive data from the application interface module(s) 502 as input. The input data may correspond to data for item records, as will be discussed in greater detail in connection with FIG. 6. Furthermore, the input data may correspond to control or request messages, such as a request to analyze a digital inventory of a target (e.g., selected) user. In another example, the inventory engine module(s) 505 may determine, based on inventory data of the user, whether a target item is available at a physical store location The inventory engine module(s) 505 may provide data to the application interface module(s) 502 as output. For example, output data may correspond to a characteristic of compatibility. In an example embodiment, for example, the inventory engine module(s) 505 may provide a user device (e.g., client machine 110 of FIG. 1) data including a measure of the number of outfits that may be formed from the target clothing item and the clothing inventory of the target user, the estimated cost per use of the target item, and recommendation for alternative items (with a corresponding measure of matching outfits and/or cost per use). The inventory engine module(s) 505 may provide the output data in response to receiving a request message from the application interface module(s) 502.

In operation, the inventory engine module(s) 505 may access, using the database management module(s) 504, an item record corresponding to a target item indicated by an evaluate request message. Furthermore, the inventory engine module(s) 505 may access, using the database management module(s) 504, a user account corresponding to the target user indicated by the evaluate request message. In particular, the inventory engine module(s) 505 may access attributes of the item record and attributes of the inventory items of the user account. In one embodiment, the target item and the inventory items of the user account may correspond to clothing items.

Based on the attributes, the inventory engine module(s) 505 may analyze the inventory items of the first user account to determine a compatibility characteristic of the target item relative to the inventory of the target user. The compatibility characteristic may include a measure of the number of outfits that can be formed by the target item and one or more of the inventory items of the user account. Additionally or alternatively, the application interface module(s) 502 may provide data indicative of the compatibility characteristic for display on the client device.

The inventory engine module(s) 505 may analyze the inventory items by applying a compatibility rule to the attributes of the item record and the attributes of the inventory items of the user account. The compatibility results may determine whether two items are compatible with each other. Compatibility may be based on one or more of color, clothing type (shirt, pants, shorts, skirt, dress, suit, jacket, socks, etc.), level of formalness (formal, business causal, causal, sportswear, etc.), style type (trendy, preppy, funky, punk, street, classy, avant-garde, sporty, etc.), and the like.

After applying the compatibility rule, the inventory engine module(s) 505 may apply an outfit rule to the results to determine a number of outfit combinations. The outfit rule may specify which other types of clothing items can be combined with the target item to form an outfit. As such, the inventory engine module(s) 505 may generate combinations of the compatible inventory items with the target item to form outfits. The inventory engine module(s) 505 may count the number of possible outfits.

The compatibility characteristic may be based on the number of possible outfits formed from compatible inventory items. For example, the compatibility characteristic may include the number of possible outfits, the percentage of the compatible inventory items, and the like. Additionally, the number of possible outfits formed from compatible inventory items may be used to determine a cost per wear or use of the target item.

The inventory engine module(s) 505 may determine a cost per wear or use of the target item based on a variety of factors. For example, the inventory engine module(s) 505 may determine a cost per use by determining a frequency of the use of the target item. For example, a frequency may be determined based on the preferences of the user matching the attributes of the target item. Preferences may include a preferred color, clothing type, level of formalness, or the style type. The number of potential uses of the target item may be determined for a duration (e.g., two years) of use of the target item based on the frequency. Accordingly, a cost per use of the target item may be determined based at least on a cost of the target item divided by the number of uses.

In an example embodiment, the inventory engine module(s) 505 may automatically repeat the analysis using a variation of the target item to determine second compatibility characteristic. For example, the second analysis may be performed to provide an alternative recommendation to the user. The application interface module(s) 502 may provide data indicative of the second compatibility characteristic for display on the client device.

The graphics processing module(s) 506 may be a hardware-implemented module which may be configured to process image data. For example, the graphics processing module(s) 506 may facilitate determining measurement data of users and/or generating model data for displaying a digital avatar. For example, in one embodiment, the user-facing sub-module(s) 514 may receive one or more images of the users and provide the images to the graphics processing module(s) 506 for processing. In turn, the graphics processing module(s) 506 may determine, with or without user intervention, measurement data of the user based on the one or more images. For example, in one embodiment, the graphics processing module(s) 506 identifies a plurality of points ("POIs") in the images of the user. Based on a reference measurement, such as the user's height, the graphics processing module(s) 506 may determine one or more measurements of the users from the distances between the identified POIs.

As stated, the graphics processing module(s) 506 may also determine or generate model data of the target user and the target product for displaying the digital avatar. For example, the graphics processing module(s) 506 may determine the model data based on the selected user account and the selected product account. The selected user account may provide measurement data of the user, which may be used to select image data of the product record. Furthermore, the selected user account may include image data of the user, such as an image of the user's head and neck. The model data may be based on combining the image data of the selected user accounts and the data of the product record.

The communication interface module(s) 508 may be a hardware-implemented module which may facilitate the flow of the information, data, and/or signals between the modules 502-512. In addition, the communication module(s) 508 can be configured to support communication of the digital inventory system 500 between the servers and client machines of FIG. 1. For instance, the communication interface module(s) 508 may be configured to provide a response message including the model data to display the digital avatar on a user device.

The authentication module(s) 510 may be a hardware-implemented module which may facilitate authentication of data provided from user devices and vendor devices. For example, the authentication module(s) 510 may receive an authentication request message for authenticating a client device. Based on the authentication request message, the authentication module(s) 510 may determine whether the client device passes authentication. The database management module(s) 504 may provide access to a user database in accordance with a determination that the client device passes authentication.

The web-front module(s) 512 may be a hardware-implemented module which may provide data for displaying web resources on client devices. For example, the digital inventory system 500 may provide a webpage for users and vendors to log in and create accounts and update the account information. The web-front module(s) 512 may provide user interfaces for users to provide measurement data and manage a personal closet and for vendors to create and manage product records.

Example Data Structures

Figure 6:
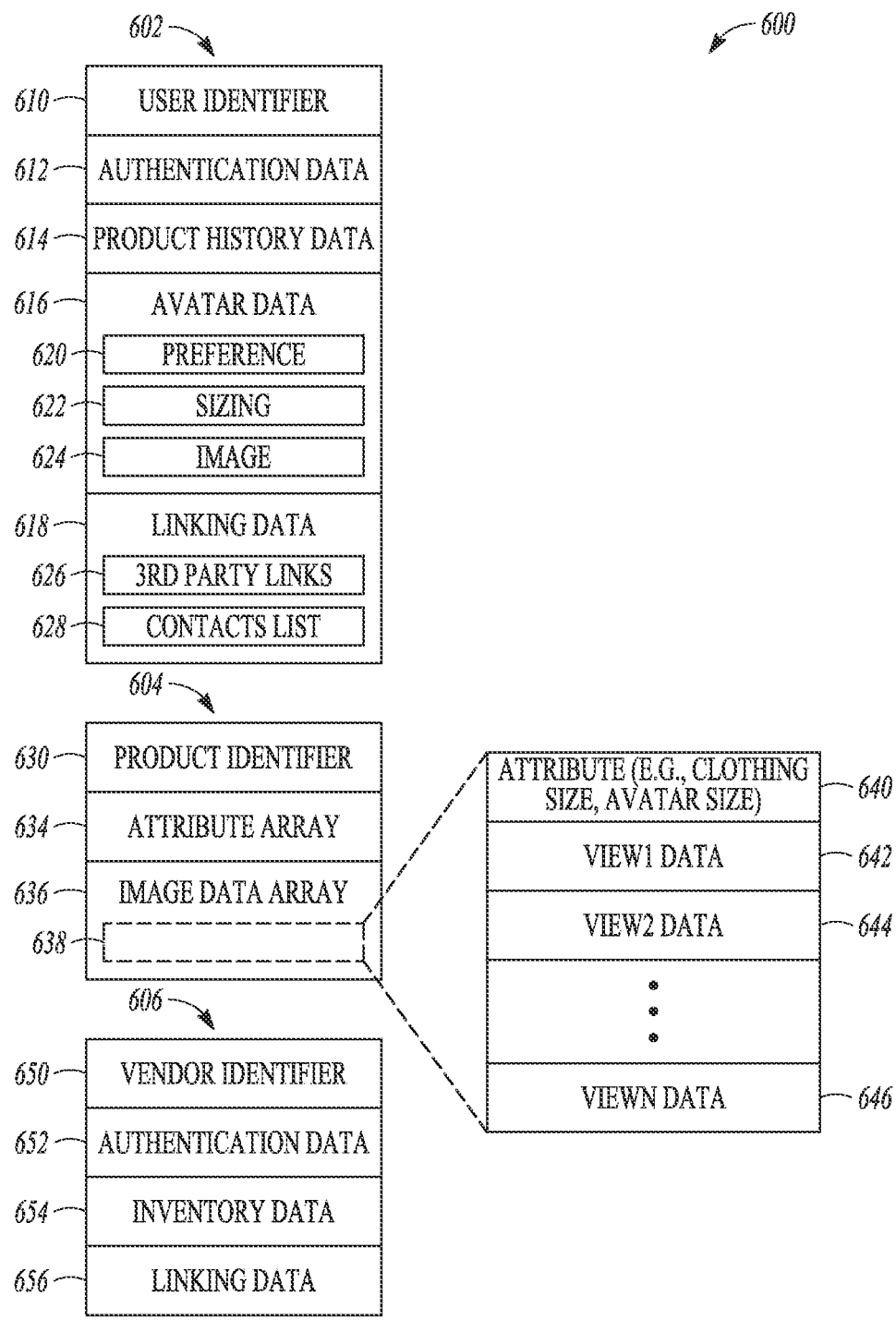
FIG. 6 is a block diagram illustrating example data structures for a digital avatar system, in accordance with an example embodiment.

FIG. 6 is a block diagram 600 illustrating example data structures 602, 604, 606 for a digital inventory system 500, in accordance with an example embodiment. The data structure 602 may correspond to a data structure of a user account. The data structure 602 may include a user identifier data field 610, an authentication data field 612, a product history data field 614, an avatar data field 616, and a linking data field 618. The avatar data field 616 may include a preferences data field 620, a sizing data field 622, and image data field 624. The linking data field 618 may include a third-party links data field 626 and a contacts list data field 628. The data structure 604 may correspond to a data structure of a product record. The data structure 604 may include a product identifier data field 630, an attributes array 634, and an image data array 636. The element 638 of the image data array 636 may include attributes data field 640, and one or more of view data fields 642-646. The data structure 606 may correspond to a vendor account, which may include a vendor identifier data field 650, an authentication data field 652, an inventory data field 654, and a linking data field 656.

In connection with the user account, the user identifier data field 610 may correspond to data usable to identify a user. For example, each user may have a unique username or code to identify the corresponding user account. In this way, the username or code may be matched to the data field 610 to determine whether or not the data structure 602 corresponds to a particular user. Moreover, the authentication data field 612 may include data for verifying and validating the user. In one embodiment, the authentication data field 612 may correspond to data for determining whether or not user login data (e.g., a password) matches an expected login data.

The product history data field 614 may include data usable to identify one or more products that the user has purchased or owns. Purchase history may be tracked by online marketplace applications. Products that the owner currently owns may be provided by the user. Furthermore, in some embodiments, the product history data field 614 may also be used to identify one or more products of a wish list or gift list. The product history data field 614 may serve to provide an inventory of products that may be used to configure the user's digital avatar and/or to use to generate recommendations to the user.

The avatar data field 616 may include data that is descriptive of the user. The preferences data field 620 may include attributes. Example attributes may include the user's height, weight, skin color (which may be indicated by a user selection of a color from a palette), age, gender, and the like descriptors. Moreover, the preferences data field 620 may include data corresponding to one or more user preferences, such as whether or not the user prefers certain types of clothing (e.g., shirts, pants, skirts, casual clothing, formal closing, funky clothing, patterns, solids, colors, accessories, or the like). As will be described in greater detail later in connection with FIG. 19, preferences input data may be provided by the user when initializing a digital inventory.

The sizing data field 622 may include measurements of the user. Example measurements may include measurements of (1) the base of the neck to a "shoulder point" (e.g., where the shoulder meets the arm), (2) the shoulder point to an elbow, (3) the elbow to the knuckle of the middle finger, (4) the top of the head to the chin, (5) the base of the neck to the elbow, (6) the width of the chest, (7) the width of the waist, and (8) elbow to the knuckle the middle finger. It will be appreciated that in alternative embodiments more or fewer measurements may be included. For example, alternative measurements may include measurements related to (1) the top of the belt to just above the sole of the shoe (e.g., the pant length) and (2) the bottom of the crotch to the top of the sole of the shoe (e.g., the pant inseam). The sizing data field 622 may alternatively or additionally include clothing sizes of the user (e.g., as determined from the measurements of the user).

The image data field 624 of the avatar data field 616 may correspond to data indicative of one or more images of the user. As will be described later in greater detail, the user may upload one or more photos of the user in poses in accordance with template poses. For example, the digital inventory system 500 may prompt the user to upload, for example, three photos in which the user is positioned in different poses. From these three photos, the digital inventory system 500 may determine the sizing data field 622 as described above. Moreover, one or more of the images may be used for the model data to generate a digital avatar. In particular, images of the user's face and neck, for example, may be superimposed on "template" bodies wearing the selected products in order to generate a digital avatar.

As stated, the measurement data may be determined in an automatic or semi-automatic way by the digital inventory system 500. In the alternative embodiments, the measurement data may be provided by a third party application via a third-party facing sub-module(s) 518 of the application interface module(s) 502.

The linking data field 618 of the data structure 602 may include data usable to identify one or more users of the digital inventory system 500. For instance, the third-party links data field 626 may include data indicative of third-party users or systems that may access the user account data structure 602. For example, third party links data field 626 may include identifiers of stylists who may access the product history data field 614 and/or the avatar data field 616 in order to generate recommendations or make purchases for the user. In alternative embodiments, the third party links data field 626 may include data indicative of social networks that may access data of the data structure 602. Additionally or alternatively, the third party links data field 626 may include one or more users linked to the user associated to the data structure 602 for facilitating transferring data between users.

The data structure 604 may correspond to a product record (or "item record") for facilitating a digital inventory or digital avatar. The product identifier data field 630 may correspond to data usable to identify a product. For example, each product of a vendor may have a unique product name or code to identify the corresponding product record. In this way, the product name or code may be matched to the data field 630 to determine whether or not the data structure 604 corresponds to a particular product. The attributes array 634 may correspond to one or more attributes of the corresponding product. Example attributes may include one or more of material type, sale descriptors, country of origin descriptors, color descriptors, style descriptors, color, clothing type, and the like. In one example embodiment, attributes may be given as a pair of attribute name and attribute value. For instance, example attributes included in the data structure 604 may correspond to the pair (Sale, 30%), wherein the string "Sale" may represent the name of the attribute (e.g., a sale-type attribute) and the value 30% represents the value of the attribute (e.g., the product is on sale at a 30% discount).

The image data array 636 may correspond to one or more data structures that include data for generating model data of a digital avatar. For example, the element 638 of the image data array 636 may include data for rendering a digital avatar of a selected user wearing a selected product. In the illustrated embodiment, the example element 638 may include the attributes data field 640 and one or more view data fields 642-646. The attributes data field 640 may include data that is indicative of attributes or properties shared by the view data field 642-646. Example of attributes or properties of the attributes data field 640 include size data of the product, sized data of the digital avatar wearing the product, product variation (e.g., color), and the like. Different elements of the image data array may correspond to different variations of the product model.

The one or more view data fields 642-646 may include data for rendering one or more versions of a digital avatar wearing the corresponding product. For example, the view1 data field 642 may correspond to a front facing view of the avatar rendered product, view2 data field 644 may correspond to a side facing view of the avatar rendered product, and so on.

In connection with the vendor account of the data structure 606, the vendor identifier data field 650 may correspond to data usable to identify a vendor. For example, each vendor may have a unique vendor name or code to identify the corresponding vendor account. In this way, the vendor name or code may be matched to the data field 650 to determine whether or not the data structure 606 corresponds to a particular vendor. Moreover, the authentication data field 652 may include data for verifying and validating the vendor. In one embodiment, the authentication data field 652 may correspond to data for determining whether or not vendor login data (e.g., a vendor name and password pair) matches the expected login data.

The inventory data field 654 may correspond to data indicative of the product records associated with the corresponding vendor. For example, the inventory data field 654 may be an array of product records (such as the data structures 604), or pointers to product records. Product records may be searchable by physical store locations. That is, an inventory for respective physical store locations may be determinable from the inventory data field 654.

The linking data field 656 may correspond to data indicative of users and/or third parties linked to the corresponding vendor. For example, users may connect to the vendor account via a social network or through the vendor's or the digital avatar system's website. Third parties may connect to the vendor account through the vendor's or the digital avatar system's website in order to provide or receive digital avatar services.

Digital Fitting Rooms

Figure 7:
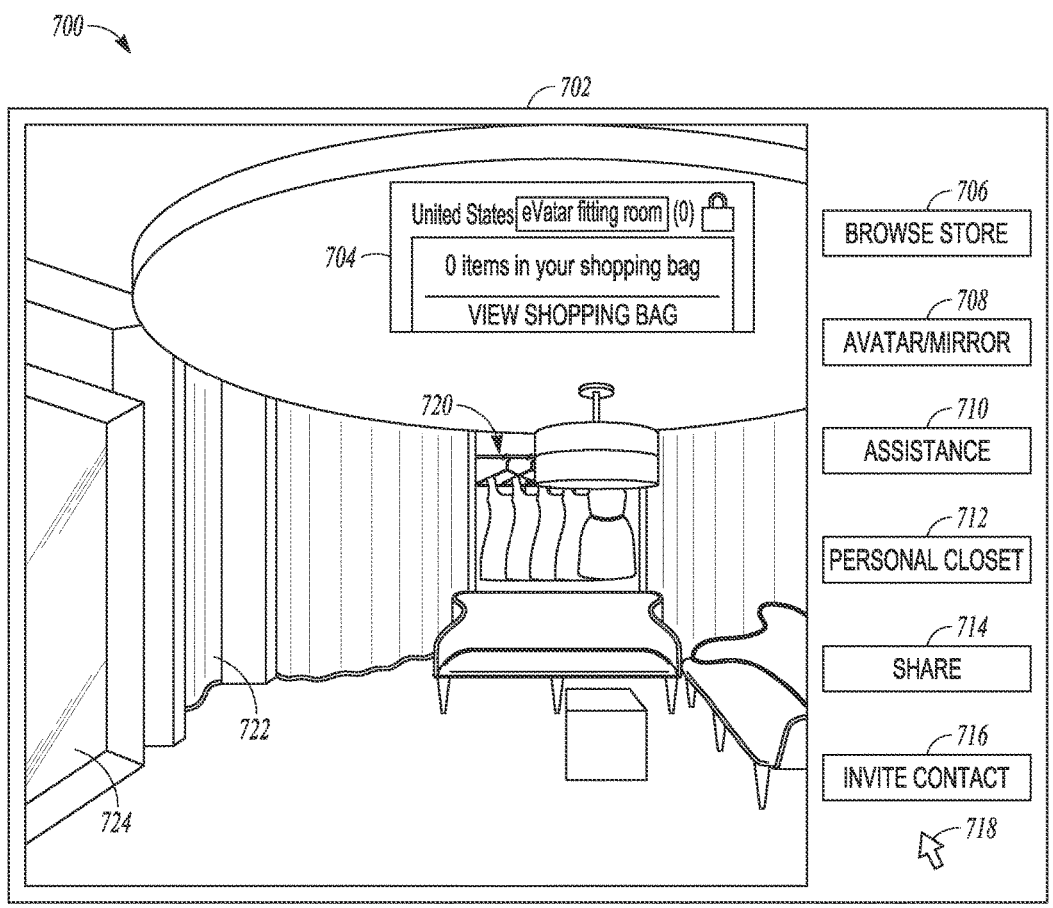
FIG. 7 is an interface diagram illustrating an example user interface of a digital fitting room with multiple display elements delivered to a user device of a digital inventory system, according to an example embodiment.

FIG. 7 is an interface diagram illustrating an example user interface 700 of a digital fitting room with multiple display elements delivered to a user device of a digital inventory system, according to an example embodiment. In the illustrated example embodiment of FIG. 7, the user interface 700 corresponds to a graphical user interface of a digital fitting room of an online marketplace. As such, the user interface 700 includes a frame 702, which may include user interface elements 704-716, 720-724 and a pointer 718 to interact with the user interface 700.

The interface element 704 of the frame 702 may display graphical indications of the status of the current session. For example, the interface element 704 may display the number of items in the user's shopping bag and/or the control element for navigating to a user interface for showing the items in the user's shopping bag. Furthermore, the interface element 704 may display location information. In an example embodiment, the location information may correspond to the physical location of the user. Additionally or alternatively, the location information may correspond to a location of a physical store that the digital fitting room is modeling.

The interface elements 706-716 of the frame 702 may be user selectable for requesting that the digital inventory system 500 perform an action. For example, the user may select the interface element 706 for navigating to another user interface (not shown) of the online marketplace's website or application for browsing, searching, or viewing items of the online marketplace. The user may select the interface element 708 to request that the user interface 700 display a digital representation of the user with one or more selected items. The digital representation of the user may correspond to an avatar and/or a "virtual mirror." Aspects of the digital representation will be described in greater detail in connection with FIG. 9.

The interface element 710 may be user selectable for requesting assistance for evaluating an item of the online marketplace. For example, in an example embodiment, the user may select the interface element 710 and in response the digital inventory system 500 may evaluate a selected item of the online marketplace with inventory items of the user (such as a digital closet). The digital inventory system 500 may generate an evaluation result that includes one or more of a number of outfits that the selected item completes with the inventory items of the user, a percentage/number of inventory items that the selected item matches, a cost per use of the selected item, or the like compatibility characteristics.

In an example embodiment, the interface element 710 may be configured to create a communication channel between the user and another user, such as, but not limited to, a customer service representative or e-stylist. For example, a video frame (not shown) may be displayed within the frame 702 to create a video communication link between the user and an e-stylist for receiving feedback, recommendations, or the like comments to provide assistance to the user.

In another example, selection of the interface element 710 may create a communication link between the user and a salesperson to receive in-store assistance. For instance, the user may use the user interface 700 in a physical store of the online marketplace. The assistance may facilitate requests by the user ("requesting user") for retrieving a target item, receiving sales price information, receiving availability information, and the like. In particular, the requesting user may select the interface element 710 in a changing room to request a target item in a particular size or color. In response, the digital inventory system 500 may transmit a message to a client machine 110 linked to the online marketplace and that is located at the physical store location. The message may include identifiers of the requesting user and the target item. In an example embodiment, the message may also include a location identifier of the requesting user so that a salesperson may retrieve and bring the target item to the requesting user.

The interface element 712 may be selectable for linking to inventory items of the user or for navigating to another user interface that displays items of the user, as will be described in greater detail in connection with FIG. 15. As stated, the inventory items may correspond to a digital closet of the user. As such, the user may select one or more items from the digital closet to be included in the digital representation of the user and the target item of the online market place.

The interface elements 714, 716 may facilitate networking between the user and one or more contacts of the user. For example, the interface element 714 may be selectable for sharing an item or a plurality of items with another user. Moreover, the interface element 716 may be selectable for inviting a contact to the fitting room.

The interface elements 706-716 may correspond to discrete graphical elements, such as the interface buttons shown in FIG. 7. However, the user interface 700 need not implement the interface elements 706-716 as interface buttons. The interface elements 706-716 may correspond to any suitable user interface element for receiving user input (via an input device or through gesture-based inputs). In one example embodiment, the interface elements 706-716 may not correspond to visible, discrete elements, but rather the user interface 700 may detect inputs (e.g., gestures-based inputs applied via a touch screen), each corresponding to the respective actions of the interface elements 706-716.

Within the frame 702, the user interface 700 may display a digital representation of a fitting room that may include items selected by the user. The fitting room may be presented as a virtual, interactive environment containing virtual representations of items. For example, interface elements 720 may display items selected by the user from the online marketplace. The interface element 722 may be selected by the user to exit the digital fitting room and return to browsing the online marketplace. The interface element 724 may be selected by the user to create a digital representation of the user with items selected from the interface element 720.

In some embodiments, the user interface 700 may present the digital fitting room as a two-dimensional environment. In other embodiments, the digital fitting room may be presented as a three-dimensional virtual or digital environment, for example, rendered on a two-dimensional display. The three-dimensional environment may be a three-dimensional digital representation of an actual digital fitting room of the online marketplace. Alternatively, the digital fitting room may be a digital representation that is not created based on the real world. For instance, the digital fitting room may be a three-dimensional representation of a fitting room sized to fit the selected user's items.

Figure 8:
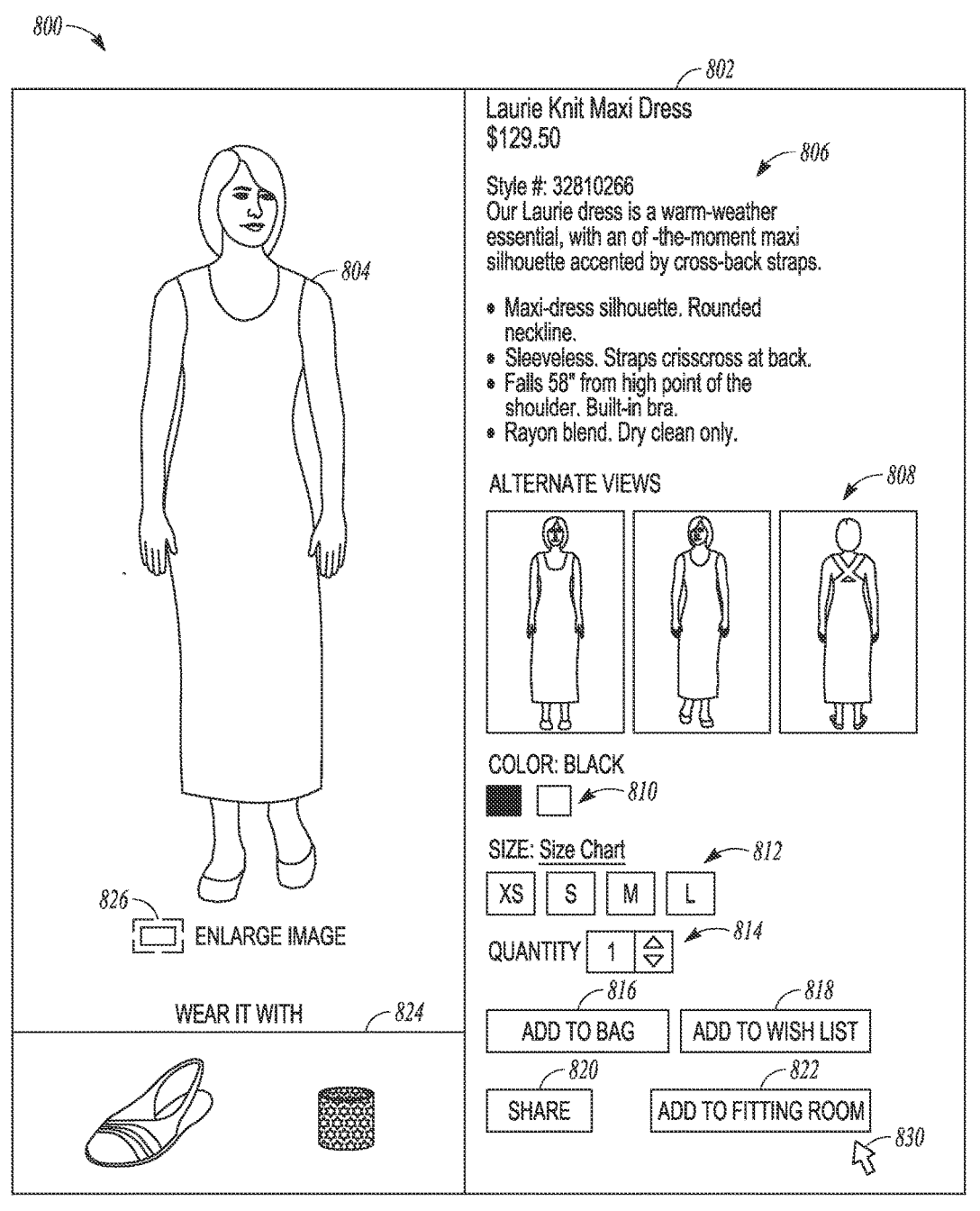

FIG. 8 is an interface diagram illustrating an example user interface 800 of a product page with multiple elements delivered to a user device of a digital inventory system 500, according to an example embodiment. The product page of the user interface 800 may correspond to a web page enabled to interface with a digital fitting room, such as represented by user interface 700 of FIG. 7. The user interface 800 may include a frame 802 that includes an image display 804, a text display 806, control elements 808-822, a sub-frame 824, and a control element 826. The user interface 800 may also include a pointer 830 for interacting with the elements of the user interface 800.

The image display 804 may present an image to the user of an item, which may be enlarged by selecting the control element 826 with the pointer 830. The text display 806 may provide to the user product information, such as a description of the product. The control elements 808 may be selected with the pointer 830 to change the view of the image display 804. The control element 810 may be selected with the pointer 830 to change the color of the product and/or to change the color of the image display 804. The control elements 812 may be selected with the pointer 830 to indicate a selected size of the product. The control element 814 may be selected with the pointer 830 to indicate a quantity of the product to add to a checkout list. The control element 816 may be selected with the pointer 830 to add the product in the quantity specified by the control element 814 to a checkout list for purchase. The control element 818 may be selected with the pointer 830 to add the product in the quantity specified by the control element 814 to a wish list. The control element 820 may be selected with the pointer 830 to share the product page with another person.

The control element 822 may be selected with the pointer 830 to add the product to a digital fitting room associated with the user. For example, in response to the user selecting the control element 822, the user interface 800 may provide to the application interface module(s) 502 a request message to add the selected item to a digital fitting room linked to the user. In an example embodiment, the request message may include indicators of the user and/or the selected item. In response to the application interface module(s) 502 receiving the indication, the inventory engine module(s) 505 may add the selected item to the digital fitting room. To this end, the inventory engine module(s) 505 may access an item record linked to the selected item. As stated, the item record may correspond to the data structure 604 and may be included by the inventory data field 654 of FIG. 6. Accordingly, the user interface 800 may facilitate interfacing with the inventory engine module(s) 505 of FIG. 5 to add items to the digital fitting room.

The sub-frame 824 may display one or more recommended items (not shown). For instance, the inventory engine module(s) 505 may select items displayed in the sub-frame 824 based on a determination that the items of the sub-frame 824 match the item of the image display 804. The selection of the items of the sub-frame 824 may be based on attributes of the item. In some example embodiments, the selection of the items of the sub-frame 824 may be based further on tracking information of the user's digital closet. For example, in response to the user signing into the online marketplace, the inventory engine module(s) 505 may provide the online marketplace tracking information suitable for identifying items that not only coordinate with the product but also match inventory items linked to the user (e.g., in relation to a digital closet). In particular, the items of the sub-frame 824 may be recommended if they complete a number of outfits above a threshold or if the cost per use is below a certain threshold relative to the cost of the item (e.g., the cost per use is determined to be 5% of the purchase price).

Figure 9:
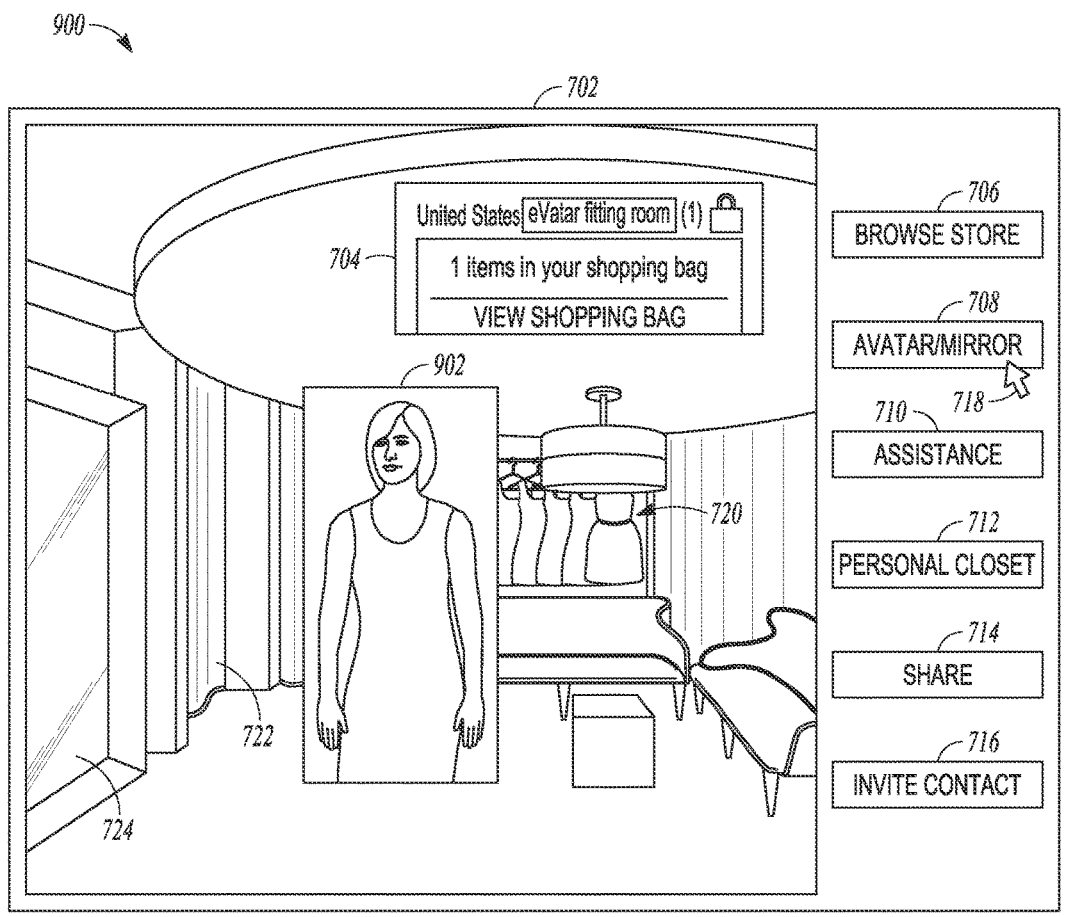
FIG. 9 is an interface diagram illustrating an example user interface of a digital fitting room with multiple display elements delivered to a user device of a digital inventory system, according to an example embodiment.

FIG. 9 is an interface diagram illustrating an example user interface 900 of a digital fitting room with multiple display elements delivered to a user device of a digital inventory system, according to an example embodiment. In an example aspect, the user interface 900 may correspond to the user interface 800 of FIG. 8 configured in response to a user selection of the interface element 708 of FIG. 7. Accordingly, elements common to the user interfaces 700 and 900 of FIGS. 7 and 9 share common reference indicia, and only differences between the interfaces are described herein for the sake of brevity.

The frame 702 may include the interface element 902 for displaying a digital representation of the user wearing a selected item displayed with the interface element 720. The digital representation of the user may correspond to a digital avatar generated by the graphics processing module(s) 506. For example, the graphics processing module(s) 506 may access sizing and image data of the user. As stated, the user account may correspond to the data structure 602 of FIG. 6. Moreover, the graphics processing module(s) 506 may access the image data of an item record linked to the selected item. For example, the item record may correspond to the data structure 604 of FIG. 6. As stated, the data structure 604 includes attributes array 634 and the image data array 636. Moreover, the item record may be stored in the inventory data field 654 of the data structure 606. Accordingly, based on the sizing and image data of the user and the selected item, the graphics processing module(s) 506 may generate model data for generating the digital representation of the user. The application interface module(s) 502 may provide the modeling data to be displayed on the user device.

Additionally or alternatively, the digital representation may correspond to an image of the selected item superimposed on video images of the user, for example, in a "virtual mirror" application. The video images may be captured by an imaging device on the user device or on an in-store device linked to the online marketplace. As such, the user interface 900 may be used outside and/or inside a physical store location of the online marketplace. As such, the user interface 900 may provide the user an efficient way to evaluate items of the online marketplace without having to physically retrieve such items.

The user interfaces 700, 800, 900 may be presented to a user on the display of a client device (e.g., client machine 110). In one embodiment, the digital inventory system 500 may provide the client device data for rendering the user interfaces 700, 800, 900. In particular, the user interfaces 700, 800, 900 may be rendered on the display 210 of the mobile device 200 of FIG. 2. Although FIGS. 7-9 were described in context of user interfaces 700, 800, 900 displayed on a mobile device, such as a mobile phone, it will be appreciated that the user interfaces 700, 800, 900 may be displayed on other types of devices such as a desktop computer, a laptop computer, any mobile computing device, or any suitable display device connected to the network 104. The user interfaces 700, 800, 900 may be displayed on a client machine 110 of the user or of the vendor, such as an in-store display device. Furthermore, the user interfaces 700, 800, 900 may correspond to a webpage or a software application executing on the client device.

Figure 10:
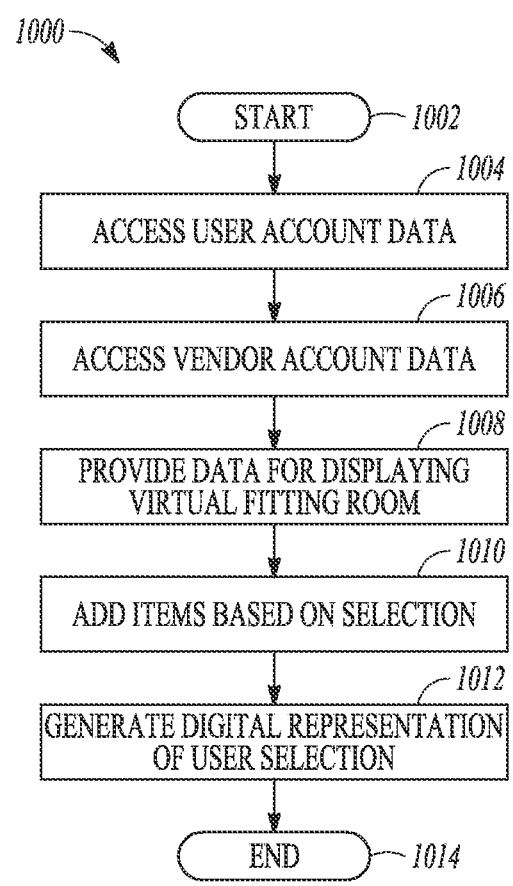
FIG. 10 is a flowchart illustrating an example method of generating data to provide a digital fitting room, in accordance with an example embodiment.

FIG. 10 is a flowchart illustrating an example method 1000 of generating data to provide a digital fitting room, in accordance with an example embodiment. By way of example, the digital fitting room will be described in context of clothing. It will be appreciated, however, that the digital fitting room may include items other than clothing items, such as accessories (e.g., jewelry), shoes, wearable electronics, equipment (e.g., work or sports equipment), and the like items.

In this example, the method 1000 may include operations such as accessing user account data (block 1004), accessing vendor account data (block 1006), providing data for displaying a virtual fitting room (block 1008), adding items based on a user selection (block 1010), and generating a digital representation (block 1012). The example method 1000 will be described below, by way of explanation, as being performed by certain modules. It will be appreciated, however, that the operations of the example method 1000 may be performed in any suitable order by any number of the modules shown in FIG. 5.

The method 1000 starts at block 1002 and proceeds to blocks 1004, 1006 for accessing user account data and vendor account data, respectively. For example, the database management module(s) 504 may access the data structure 602, which may correspond to the user account linked to the user. Furthermore, the database management module(s) 504 may access the data structure 606, which may correspond to the vendor account linked to the online marketplace.

In an example embodiment, operation of the blocks 1004, 1006 be performed in response to the application interface module(s) 502 receiving login request messages. For example, the user may log into the digital inventory system 500 via a website or application of the online marketplace or via a web-front interface of the digital inventory system 500. Logging the user in to the digital inventory system 500 may facilitate linking the user to the data structure 602.

Additionally or alternatively, the vendor of the online marketplace may log into the digital inventory system 500 via the vendor facing sub-module(s) 516 of the application interface module(s) 502. Logging in the vendor to the digital inventory system 500 may facilitate linking the vendor to the data structures 604, 606.

At block 1008, the method 1000 may include providing data for displaying a virtual fitting room. For example, the graphics processing module(s) 506 may generate graphics data for the user interface 700 of FIG. 700. In particular, the application interface module(s) 502 may use the user facing sub-module(s) 514 to communicate the graphics data to the client machine 110 linked to the user. The client machine 110 may, in turn, render at least part of the user interface 700 based on the graphics data. For instance, the frame 702 may display an interactive image representing a fitting room.

As previously stated, the graphics data may correspond to a digital representation of the fitting room. In an aspect of an example embodiment, the digital inventory system 500 may generate the graphics data based on the identity of an online marketplace that is logged in. For example, after an online marketplace has logged in, the digital inventory system 500 may access the vendor account linked to the online marketplace in order to determine virtual features of the digital fitting room. The virtual features of the digital representation of the fitting room may be used to present a fitting room that is distinctive to the online marketplace. In one example, the virtual features may include a color scheme, ornamental graphical elements (mirrors, seating, carpeting, art objects, curtains, wallpaper or paint, etc.), lighting effects, music, a salesperson avatar, branding and logos, or the like, as well as organization (e.g., placement) of the graphical elements and/or interface elements 706-716, 720-724.

Additionally or alternatively, the virtual features may model features of real-world fitting rooms of the online marketplace. Moreover, in an example embodiment, the digital inventory system 500 may be capable of presenting a plurality of versions of a digital fitting room for an online marketplace. For example, the online marketplace may provide data for digital representations of fitting rooms that model the fitting room of one or more actual store locations. An example embodiment, the user may select the store location that will serve as the model of the digital fitting room. Additionally or alternatively, the particular digital representation of the digital fitting room may be selected automatically based on the location of the user. For example, in response to a determination that the user is located in or near Los Angeles, Calif., the digital inventory system 500 may provide data for a digital representation modeling the fitting room of the Beverly Hills, Calif. store location of the vendor.

At block 1010, the method 1000 may include adding items based on a user selection. The user selection may correspond to the user selecting interface control element 822 of FIG. 8. Accordingly, the inventory engine 505 may add the selected item to a list of items to be included in the digital fitting room. At block 1012, the method 1000 may include generating a digital representation of the user selection. For example, the graphics processing module(s) 506 may provide data for displaying a digital graphical representation of the user-selected item to the interface element 720. At block 1014, the method 1000 may end.

Hybrid Virtual Store and Physical Store

Figure 11:
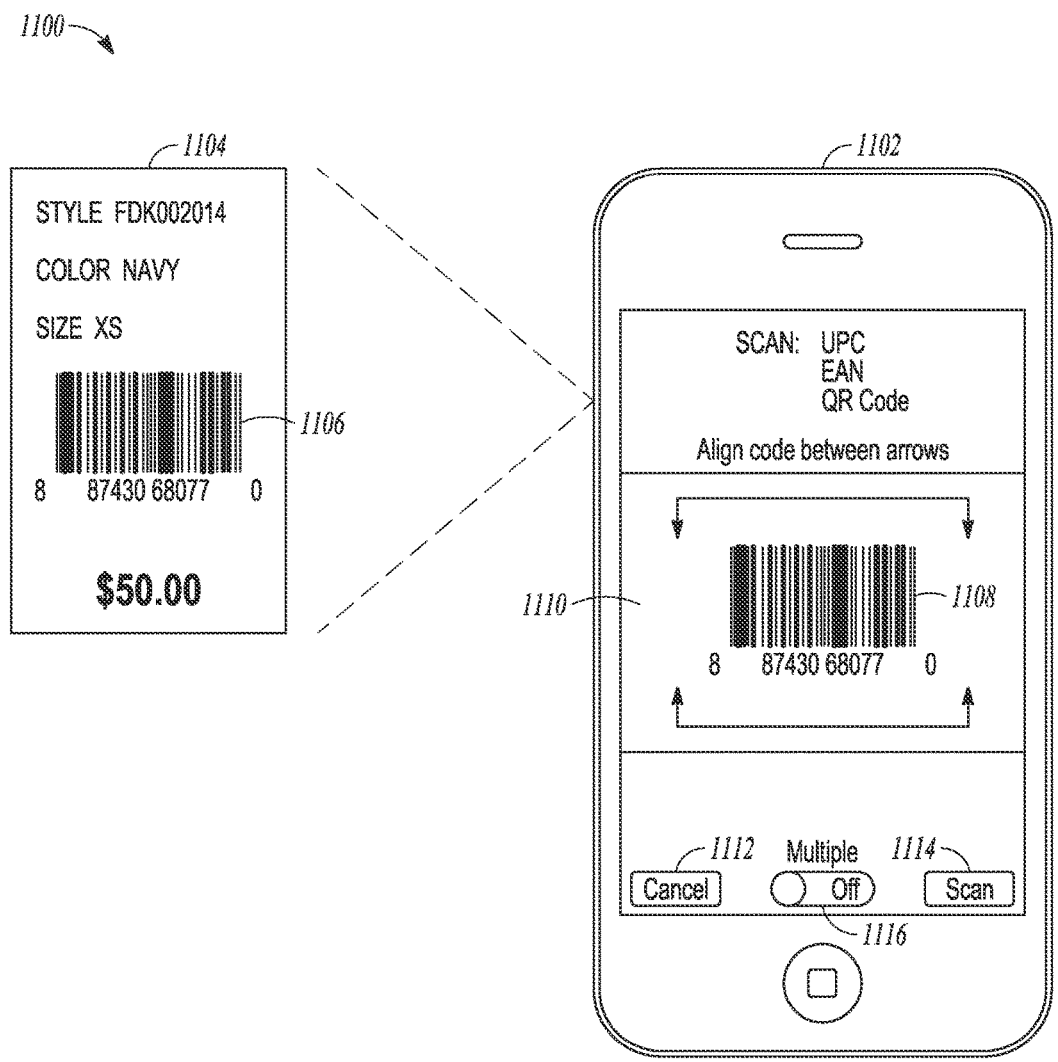
FIGS. 11-13 are schematic diagrams depicting example embodiments of interactions of multiple components for integrating virtual and physical shopping, according to example embodiments.
Figure 12:
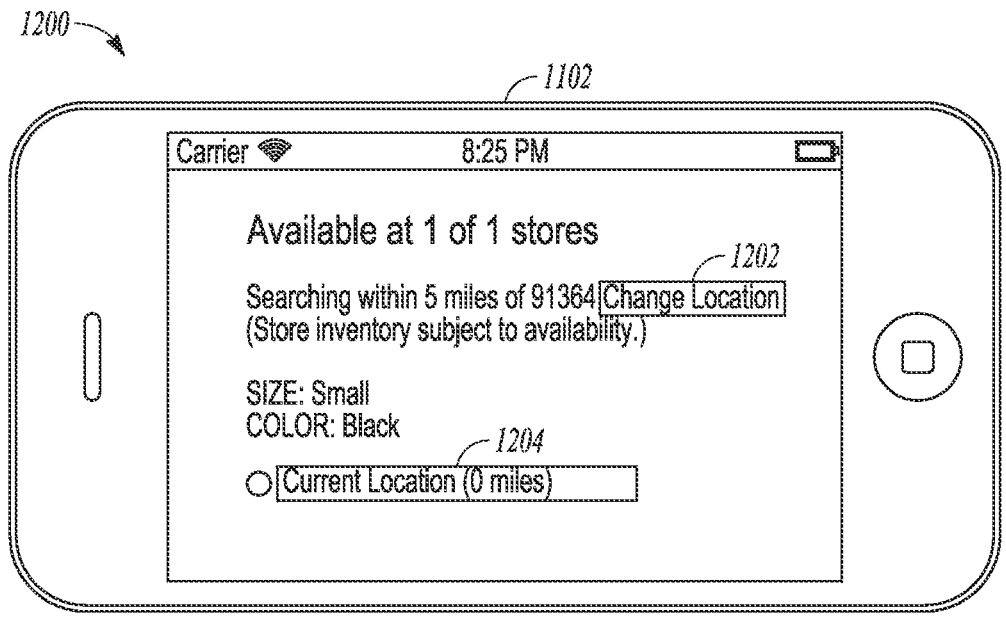
Figure 13:
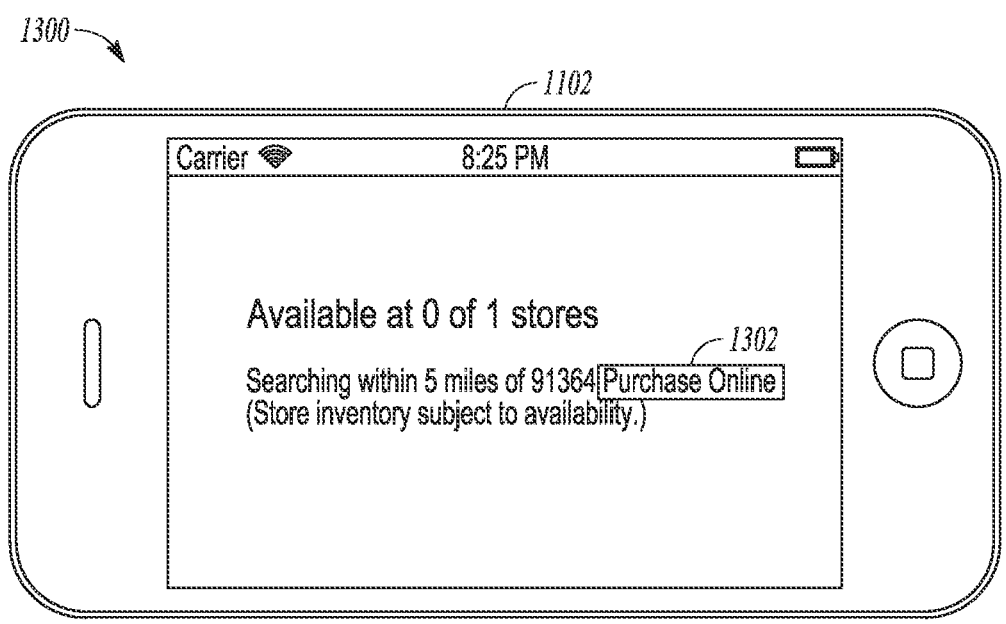

The digital inventory system 500 may facilitate using online marketplaces in conjunction with physical stores. For example, a user in a physical store may connect a user device to the digital inventory system 500 to check for availability of an item. For instance, the user device may scan a label associated with an item to check for availability of the item. The digital inventory system 500 may access inventory data and return search results to the user device. The search results, which may be displayed by the user device, may include the in-store inventory level at the user's location, as well as additional size/color availability. If the item is available at the current location, the user can try the item in person. If item is not available at the current location, digital inventory system 500 may facilitate presenting a digital representation of the item and the user, as well as options to order the item online and ship to the user's home. Examples will be described in greater detail below FIGS. 11-13 are schematic diagrams depicting example embodiments of interactions of components for integrating virtual and physical stores, according to example embodiments. Elements common to FIGS. 11-13 share common reference indicia, and only differences between the figures are described herein for the sake of brevity.

FIG. 11 is schematic diagram depicting an example embodiment of an interaction 1100 of a user device 1102 and a label 1104 displaying an identifier 1106. The user device 1102 may correspond to the client machine 110 of FIG. 1. The label 1104 may correspond to a physical label displayed in association with items at a physical store location. For example, label 1104 may be a "hang tag" (a tag connected to an item) or price tag connected to a physical item. The label 1104, however, need not be physically coupled to an item. For example, in an alternative embodiment, the label 1104 may be presented on a display screen of an electronic device located within the physical store location. For example, a display device of the store may display a digital catalog of items that are sold by the vendor. The identifier 1106 may be any graphical representation suitable for identifying a corresponding item. For example, the identifier 1106 may correspond to a Universal Product Code (UPC), a European Article Number (EAN-13) code, a Quick Response (QR) code identifications, or an alphanumeric string.

The user device 1102 may be configured to capture and display an image 1108 of the identifier 1106. For example, in operation, the user device 1102 may display a user interface 1110 presenting a target area to capture the image 1108 of the identifier 1106. Although not shown, in alternative embodiments, the user interface 1110 may include guides for positioning and/or orientating the image 1108 to facilitate identification of the identifier 1106.

Moreover, the user interface 1110 may include interface elements 1112, 1114, 1116. The interface element 1112 may correspond to a cancel button for exiting out of the user interface 1110. The interface element 1114 may correspond to a scan button that is selectable by the user for scanning the image 1108 in order to determine the identifier 1106 of the item. For example, the user device 1102 may provide the captured image 1108 to the digital inventory system 500 for processing.

In an alternative embodiment, the interface element 1114 for scanning may be omitted. For example, the user device 1102 may monitor the image 1108 in substantially real time. As used herein, substantially real-time includes initiating the monitoring of the image 1108 in response to the user device 1102 receiving the data of the image 1108. It will be understood that substantially real-time may include delays associated with communication and computational delays associated with receiving and processing the data of the image. The user device 1102 may automatically scan the image 1108 in response to detecting that the image 1108 is suitable for scanning. For example, the user device 1102 may detect that the image 1108 is within a predetermined portion of the user interface 1110, and that the image 1108 is in sufficient focus and a predetermined set of features have been detected that indicate that the image 1108 corresponds to a valid identifier. For instance, the user device 1102 may detect that the image 1108 includes a number of parallel lines in accordance with a barcode definition.

The interface element 1116 may correspond to a user selectable switch or button for scanning multiple labels 1104. For example, when the interface element 1116 is configured for multiple scanning, the user may scan multiple images in succession for batch processing. As such, the user device 1102 may scan a plurality of items without interruption.

The user device 1102 may transmit one or more scanned images to the digital inventory system 500 for processing. In response, the digital inventory system 500 may provide the user device 1102 a search result. For example, the user device 1102 may transmit the scanned images for determining physical store locations that have items in inventory that match the scanned identifiers, as will be described below.

FIG. 12 is schematic diagram depicting an example state 1200 of the user device 1102 displaying a search result that includes a physical store location. The search results may be provided by the digital inventory system 500. The user device 1102 displays a user interface that includes interface elements 1202, 1204. The interface element 1202 may be selected by the user to change the location parameter of the search. For example, the digital inventory system 500 may search within a radius of a specified location for physical store locations having items in inventory that match the identifier 1106. In an example embodiment, a default location may correspond to the current location of the user. The user may select the interface element 1202 to perform a new search for physical stores within a radius of a specified location. Locations may be indicated by ZIP code, city state information, or the like geographical indicators.

The interface element 1204 may be selected by the user to select a matching physical store location. As used herein, a matching physical store location is a physical store location having items in inventory that match the identifier 1106. In the illustrated embodiment of FIG. 12, the search result includes one matching location: the physical store location associated with current location of the user. It will be appreciated, however, that the interface element 1204 may correspond to a list of user-selectable items, each item corresponding to a physical store location that has an item in inventory that matches the identifier 1106.

FIG. 13 is a schematic diagram depicting an example state 1300 of the user device 1102 displaying an empty search result, for example, provided by the digital inventory system 500. For instance, as shown in FIG. 13, the user device 1102 displays an indication that, in accordance with the search parameters (e.g., 5 miles within the area code 91364), no physical store locations have an item in inventory matching the identifier 1106 of FIG. 11. Additionally, the user device 1102 displays an interface element 1302 that is user selectable for purchasing the item online (e.g., via an online marketplace). For example, in response to the user selection of the interface element 1302, the user device 1102 may display a product page (e.g., a webpage or application of the online marketplace) for viewing and/or purchasing the selected item.

The user interface 1110 may be presented to a user on the display of a client device (e.g., client machine 110). In one embodiment, the digital inventory system 500 may provide the client device data for rendering the user interface 1110. In particular, the user interface 1110 may be rendered on the display 210 of the user device 1102. Although FIGS. 11-13 were described in context of a user interface 1110 displayed on the user device 1102, such as a mobile phone, it will be appreciated that the user interface 1110 may be displayed on other types of devices such as a desktop computer, a laptop computer, any mobile computing device, or any suitable display device connected to the network 104. The user interface 1110 may be displayed on a client machine 110 of the user or of the vendor, such as an in-store display device. Furthermore, the user interface 1110 may correspond to a webpage or a software application executing on the client device.

Figure 14:
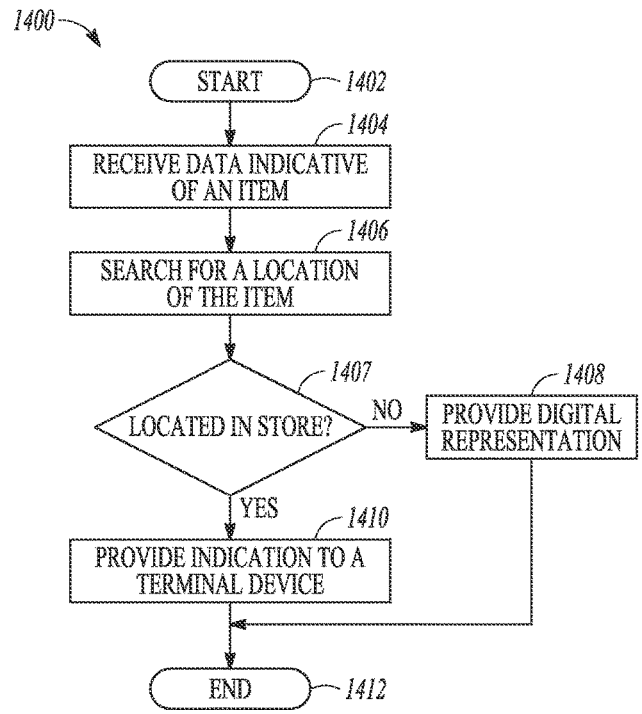
FIG. 14 is a flowchart illustrating an example method of generating data to facilitate hybrid shopping, in accordance with an example embodiment.

FIG. 14 is a flowchart illustrating an example method 1400 of generating data to facilitate hybrid stores, in accordance with an example embodiment. By way of example, the hybrid stores will be described in context of clothing stores. It will be appreciated, however, that the hybrid stores may include items other than clothing items, such as accessories (e.g., jewelry), shoes, wearable electronics, equipment (e.g., work or sports equipment), and the like items.

In one example embodiment, the method 1400 may correspond to a user requesting availability information of a target item while the user is in a physical store location of a vendor having a vendor account in the digital inventory system 500. For example, as discussed above in connection with FIGS. 11-13, the user device may display a user interface that facilitates interaction with the digital inventory system 500. Availability results may be returned to the user device to indicate whether or not the target item is located at the present store location or other store locations, as will be described in greater detail below.

In this example, the method 1400 may include operations such as receiving data indicative of an item (block 1404), searching for a location of the item (block 1406), determining whether the item is located in a store (block 1407), providing a digital representation (block 1408), providing an indication of a terminal device (block 1410). The example method 1400 will be described below, by way of explanation, as being performed by certain modules. It will be appreciated, however, that the operations of the example method 1400 can be performed in any suitable order by any number of the modules shown in FIG. 5.

The method 1400 starts at block 1402 and proceeds to block 1404 for receiving data indicative of an item of an online marketplace. For example, the application interface module(s) 502 may receive a request message to determine availability of a target item at physical store locations of an online marketplace. The request message may include identification data for providing the identity of the target item. Moreover, the application interface module(s) 502 may receive, in association with the request message, data for determining the identity of a user providing the request message. The user device may be linked to a user (e.g., by way of a data structure 602 that represents a user account).

Additionally or alternatively, the application interface module(s) 502 may receive, in association with the request message, data for determining search parameters for requested determination of availability of the target item. Examples of search parameters may include location data (city/state, zip code, localization data of the user device), distance data (e.g., a range from the location data), store type (standard retail, flagship retail, outlet retail, warehouse, low-volume inventory location, high volume inventory location, etc.), attributes of the target item (e.g., sale, condition, sizes, colors, etc.), and the like. In one example, the search parameters may be used if it is determined that the target item is not in the present store location (e.g., the store location in which the user is located) in order to determine other store locations that have the target item in inventory.

The request message may be received from a user device located at a physical store location of the online marketplace. To assist determining which store location corresponds to the present store location, the user device may provide the application interface module(s) 502 data capable of identifying the location of the user. Example of location data may include localization data provided by the user device, geographical coordinate data (e.g., global positioning system (GPS) data, longitude-latitude accordance, etc.), or the like. Accordingly, the inventory engine module(s) 505 may select one of the physical store locations based on the closest match to the user's location. The location data of the user device may facilitate the digital inventory system 500 to automatically determine the present store location without user intervention, thereby simplifying the process for the user.

In another example embodiment, the present store location may be determined based on communications between the user device and a communication device within the store locations. For example, the user device may establish a communication channel with a communication device in the present store location. In response, the communication device may present a store identifier that is transmitted to the digital inventory system 500 to indicate the identity of the present store location.

As discussed in connection with FIGS. 11-13, the user device may capture an image of a label identifying a target item and transmit image data to the digital inventory system 500. Accordingly, the request message may include image data of an identifier of a physical item corresponding to the target item. In response to the application interface module(s) 502 receiving the image data, the graphics processing module(s) 506 may process the image data to determine the identifier of the target item.

In an example embodiment, the identifier associated with the request message may correspond to an item that is different from the target item in some aspect, such as size or color. Accordingly, the variation data may be transmitted to the application interface module(s) 502 in order to identify the target item as the item of the identifier modified in accordance with the variation data. For example, a user may be in a physical fitting room and is trying on a pair of pants that is a size too small. To check for the availability of a pair of pants in a different size or color, the user may capture an image of the hang tag attached to the pants and specify the new size or color. Accordingly, the digital inventory system 500 may determine the identity of the target item as the pants in the new size or color. If the present store has the target item in inventory, the user may request that the target item be brought to the fitting room of the user without the user having to leave the fitting room. If the present store does not have the target item in inventory, the user may request the digital representation of the user wearing the target item.

At block 1406, the method 1400 may include searching for a location of the item. For example, a database management module(s) 504 may access, in response to the receiving of the request message, inventory data of the online marketplace. The inventory data may correspond to the inventory data field 654 of the data structure 606 of FIG. 6. The inventory engine module(s) 505 may interface with the database management module(s) 504 to search the inventory items of the present store location as well as the inventory items of store locations satisfying the search parameters.

At block 1407, the method 1400 may include determining whether the item is located in the present store location of the user. In accordance with a determination that the item is not located in the present store location, the method 1400 may continue to block 1408 for providing a digital representation. Alternatively, in accordance with a determination that the item is located in the present store location, the method 1400 may continue to block 1410 for providing an indication to a terminal device.

In connection with block 1408, the graphics processing module(s) 506 may generate a digital representation of the user and the target item. The digital representation may correspond to a digital avatar of the user wearing the target item. The digital avatar may be generated based on the avatar data field 616 of the data structure 602 (e.g., the user account linked to the user). Moreover, the digital avatar may include selected items of a digital closet linked to a user account of the user, as will be discussed in greater detail in connection with FIG. 15.

Additionally or alternatively, the digital representation may correspond to a digital image of the item superimposed onto video images of the user. The video images may be captured by a camera of the user device. For example, in a "virtual mirror" operation, the graphics processing module(s) 506 may superimpose the target item onto video images of the user in substantially real time.

Selection of the mode of the digital representation in terms of a digital avatar or digital mirror may be determined based on input received by the interface element 708 of FIG. 7. The application interface module(s) 502 may provide graphical data for display of the digital representation within a user interface rendered on the user device.

Additionally or alternatively, if the digital inventory system 500 determines that the target item is not located at the present store, the application interface module(s) 502 may provide data for displaying search results to display the state 1300 of FIG. 13.

In connection with block 1410, the method 1400 may include providing an indication to a terminal device. For example, application interface module(s) 502 may provide the availability results to the user device, including a search results for the target item corresponding to the display of a user interface showing state 1200 of FIG. 12. Additionally or alternatively, the indication may be provided to a terminal device linked to the present physical store location of the online market place. For example, the indication may be provided to a device of a sales person so that the sales person may provide the physical target item to the user. At block 1412, the method 1400 may end.

Figure 15:
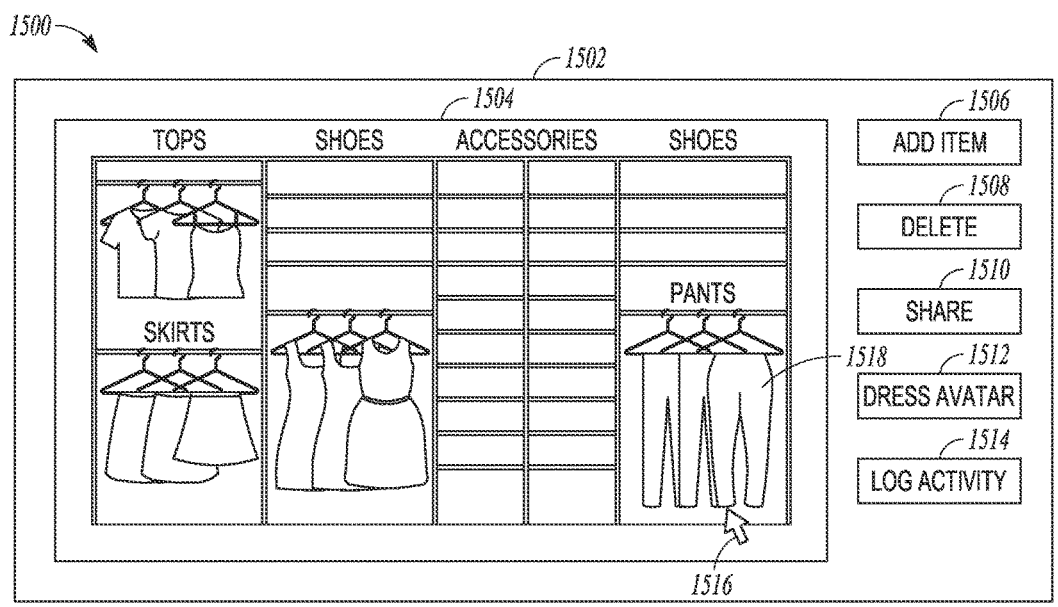
FIG. 15 is an interface diagram illustrating an example user interface of a digital closet application with multiple display elements delivered to a client device, according to example embodiments.

FIG. 15 is an interface diagram illustrating an example user interface of a digital closet application with multiple display elements delivered to a client device, according to example embodiments. In example aspects, the digital closet may be used by the user to evaluate a target item with respect to items that the user has included in the digital closet. The items of the digital closet may correspond to digital representations of items that the user owns. As such, the digital closet may be associated with an account corresponding to the data structure 602 of FIG. 6.

In one aspect, the digital closet may be used in conjunction with the digital fitting room described above in connection with FIGS. 7-10. For example, the digital closet may be used to select items that the user owns to be included with the digital representation of the user and the target item of the online marketplace. Furthermore, the digital closet may be used to provide an in-store evaluation (e.g., in terms of compatibility) of a target item and the user's digital closet.

The illustrated user interface 1500 of FIG. 15 includes a frame 1502 which may include a display element 1504 and control elements 1506-1514 that are selectable by a user input element, such as a pointer 1516. The display element 1504 may include digital representations of one or more items, such as an item 1518.

The digital closet of the display element 1504 may be organized according to one or more categories. For instance, the display element 1504 presents categories such as "Tops," "Skirts," "Shoes," "Dresses," "Accessories," "Shoes," and "Pants." Accordingly, items having an attribute matching "Tops" may be displayed in the area labeled "Tops," and so on. It will be appreciated that one or more categories may be omitted or added in an alternative embodiment. Further, the categories may be based on aspects different than the type of clothing. For example, categories may be related to a rating (e.g., favorites, five-star, four-star, three-star, two star, one star, and the like), style (e.g., formal wear, casual wear, professional wear, sportswear, party wear, and the like), days of the week, colors, sizes/fit, usage, and the like. Furthermore, the user may add user-defined categories to provide a flexible system for organizing the digital closet.

An item may be assigned a category automatically without user intervention and/or manually with user intervention. As previously stated, an attribute of the item may be used to match the item to a category. Accordingly, in response to an item being added to the digital closet, the inventory engine module(s) 505 may access the attribute data of the item and place the item automatically in the digital closet in accordance with a category that matches the attribute data.

Additionally or alternatively, the user may assign a category to an item. For instance, the user may select the item 1518 with the pointer 1516 and "drag-and-drop" the item to a different category, such as "Dresses." In an example embodiment, the inventory engine module(s) 505 may add, modify, or replace an attribute in accordance with changing the location (e.g., category) of the item so that the attributes of the item are coherent with its placement in the digital closet. The inventory engine module(s) 505 may prompt the user to confirm changes to the items attribute data.

The control elements 1506-1514 may correspond to a button selectable for initiating actions by the inventory engine module(s) 505. The control element 1506 may correspond to a button selectable for adding an item to the digital closet. In response to a selection of the control element 1506, the inventory engine module(s) 505 may automatically add un-displayed items of the purchase history data of the user. Additionally or alternatively, the inventory engine module(s) 505 may prompt the user for input of an item to add. For instance, an item may be added by the user uploading image data stored on the client device or stored on an online resource, such as an application server of a website (e.g., an online marketplace).

The control element 1508 may correspond to a button selectable for deleting one or more items of the digital closet. For example, the user may select one or more items displayed in the display element 1504 and then select the control element 1508. In response to the selection of the control element 1508, the inventory engine module(s) 505 may remove the selected items from the display element 1504.

The control element 1510 may correspond to a button selectable for sharing one or more items of the digital closet or sharing access to the digital closet with another user. For example, the user may select one or more items displayed in the display element 1504 and then select the control element 1510. In response to the user selection of the control element 1510, the inventory engine module(s) 505 may share the selected items from the display element 1504 with one or more selected users or to a social network. Additionally or alternatively, the control element 1510 may be selectable for sharing the digital closet with a selected user or to a selected social network. Accordingly, another user may access the shared digital closet and may provide comments or recommendations to the user.

The control element 1512 may correspond to a button selectable for generating a digital avatar of the user wearing one or more selected items from the digital closet. For example, the user may select one or more items displayed in the display element 1504 and then select the control element 1512. In response to the user selection of the control element 1512, the inventory engine module(s) 505 may facilitate generating a digital avatar of the user wearing the selected items. That is, in some embodiments, the inventory engine module(s) 505 may provide the graphics processing module(s) 506 data indicative of the user and the selected items that are compatible for generating a digital avatar. As previously described in connection with FIG. 6, items that are incompatible with the digital inventory system 500 may have a product record that is in accordance with the data structure 604

In some example embodiments, the inventory engine module(s) 505 may generate a digital representation of an outfit that includes items that are not avatar compatible—that is, the item record does not include data for generating a digital avatar. For instance, the inventory engine module(s) 505 may generate an ordered graphical representation of the selected items in a way that is representative of an outfit, although not actually using a digital avatar model of the user and the items based on measurement data. For example, images of the selected items may be placed next to each other in the same relationship that the items are typically worn, such as an image of a selected shirt being placed above, and in close proximity to, an image of a selected skirt.

The control element 1514 may be a button selectable for logging activity or usage of one or more selected items. In one example aspect, the user may select the control element 1514 to track outfits that the user has worn. Tracking information may be used for a number of purposes. For instance, tracking information may be used to calculate cost per use calculations. Furthermore, tracking information may be used to estimate a cost per use of an item of an online marketplace.

The estimate may be useful for helping the user determine whether or not the user should purchase an item. In one example, the inventory engine module(s) 505 may use the tracking information of an item to estimate the amount of wear on the item. In response to a determination that an estimate of wear on an item is above a threshold, the inventory engine module(s) 505 may provide a recommendation to the user to replace the worn item. In another aspect, the inventory engine module(s) 505 may use the tracking information of an item to identify patterns in which an item may be overused. For example, a particular shirt may be identified as being used often to form an outfit from a plurality of pants, skirts, shorts, or the like bottoms. Accordingly, the inventory engine module(s) 505 may recommend to the user to purchase another shirt as an alternative to the overused shirt. As another example, tracking information may be used to identify items to sell. In particular, tracking information may be used to determine that an item is not frequently used or has not been used for a period of time, and the inventory engine module(s) 505 may recommend to the user to sell the item.

Example User Interfaces of Digital Avatar Systems

FIGS. 16-22 are interface diagrams illustrating example user interfaces with multiple display elements delivered to a client device for managing user accounts, according to example embodiments. As illustrated in FIGS. 16-22, the user interfaces may be presented to a user on the display of a client device (e.g., client machine 110). In particular, the user interface 1600 may be rendered on the display 210 of the mobile device 200 of FIG. 2. The display 210 may correspond to a touch sensitive liquid crystal display (LCD) on which the user may select elements of the user interface by touching the display 210. Moreover, the user may utilize the I/O devices 212 of the mobile device 200 to navigate to a previous user interface. Although FIGS. 16-22 will be described in the context of user interfaces displayed on a mobile phone, it will be appreciated that the user interfaces may be displayed on other types of devices such as a desktop computer, laptop computer, or mobile computing device connected to the network 104.

Figures 16, 17:
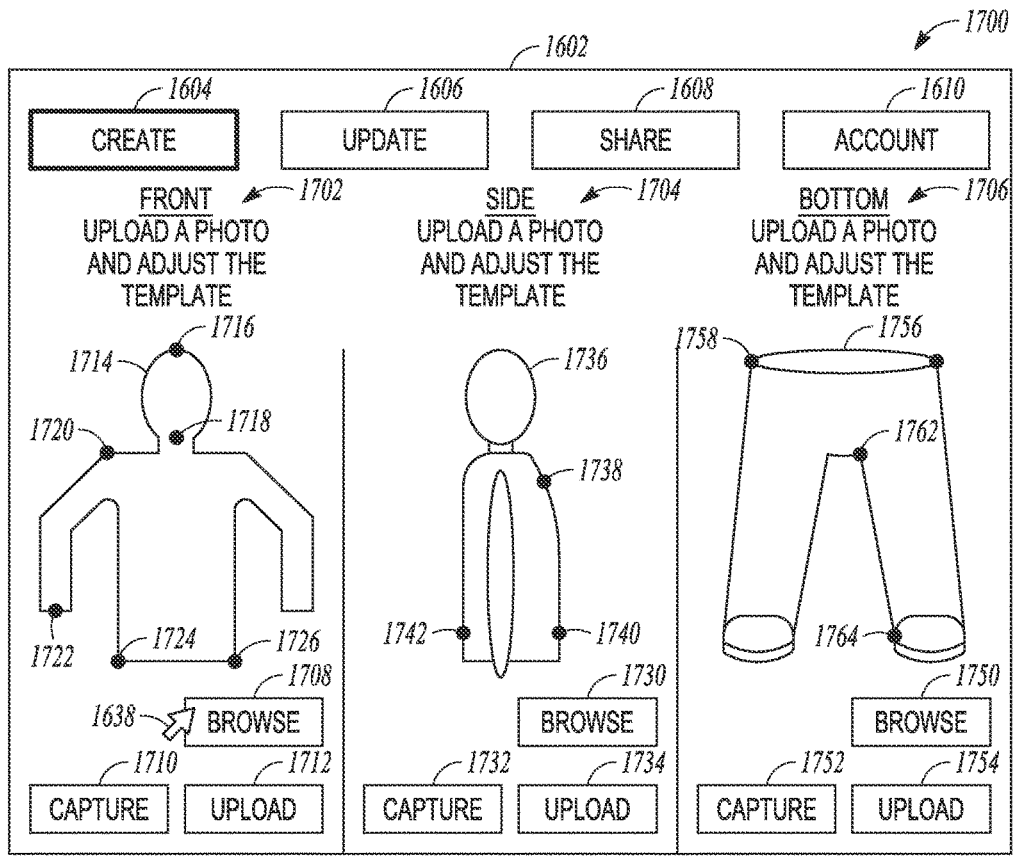
FIGS. 16-22 are interface diagrams illustrating example user interfaces with multiple display elements delivered to a client device for managing user accounts, according to example embodiments.

In the illustrated example embodiment of FIG. 16, the user interface 1600 corresponds to a graphical user interface of a webpage or software application executing on the client device that allows the user to initiate a process to create a user account, such as an account corresponding to the data structure 602 of FIG. 6. In one example embodiment, the user interface 1600 may correspond to the display of a webpage provided by the digital inventory system 500 of FIG. 5.

Figure 18:
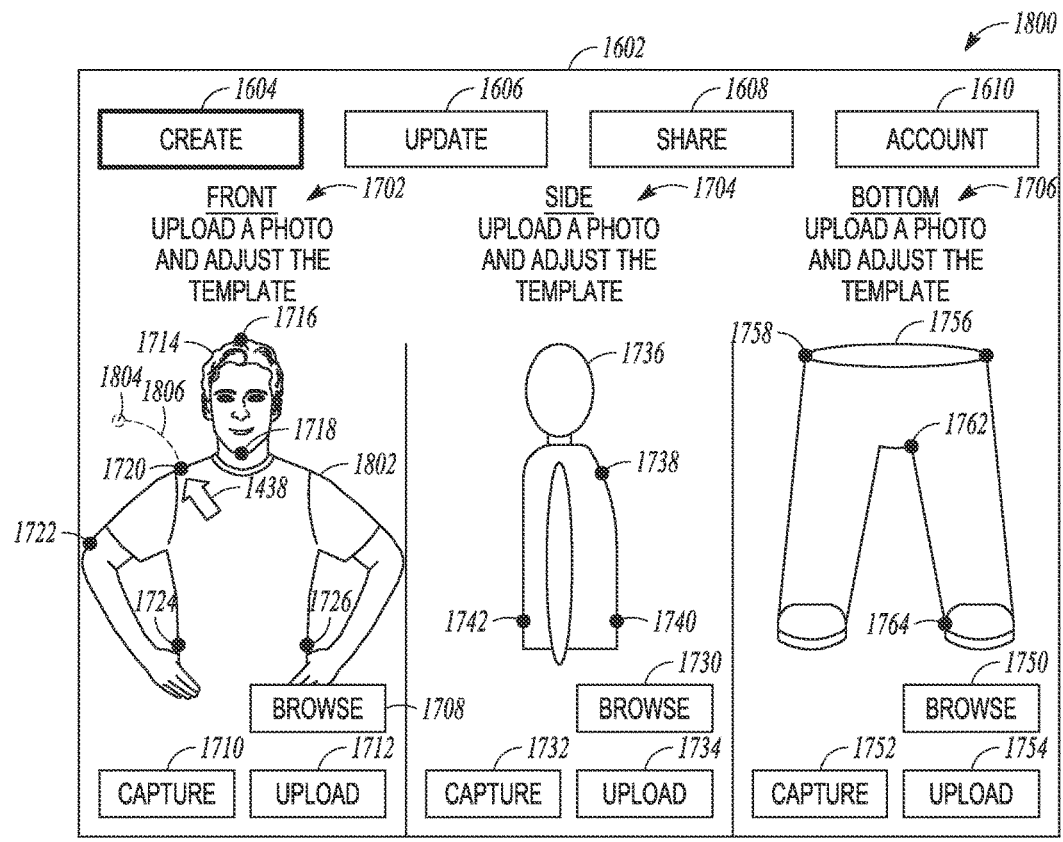
Figure 19:
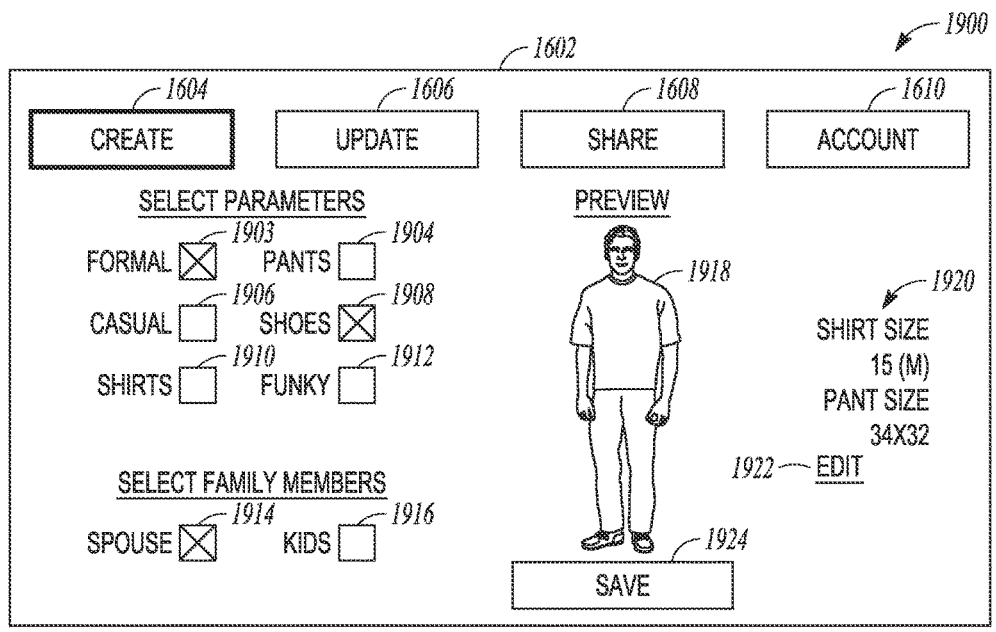

The user interface 1600 includes a frame 1602, which may include user interface elements 1604-1636, and a pointer 1638 to interact with the elements 1604-1636. The user interface elements 1604, 1606, 1608, 1610 may correspond to display elements or control elements associated with functions of a digital avatar website or application. For example, in the illustrated example, the elements 1604, 1606, 1608, 1610 indicate that the user interface 1600 is for creating a user account (e.g., element 1604), updating a user account (e.g., element 1606), sharing a user account (e.g., element 1608), and managing account information (e.g., element 1610). In operation, a graphical indication may indicate which one of the elements 1604-1610 is active. For example, the element 1604 of FIG. 16 is highlighted to indicate that the user interface 1600 corresponds to an interface for creating a user account. FIGS. 17, 18, and 19 show additional user interfaces that may be used in connection with creating a user account. User interfaces for updating a user account (e.g., in connection with element 1606) may be similar to the user interfaces 1600-1900. Moreover, user interfaces for the functions corresponding to elements 1608, 1610 will be described later in greater detail in connection with FIGS. 20 and 22. If the elements 1604-1610 correspond to control elements, then the user may select one of the elements 1604-1610 to switch to another function.

The elements 1612-1620 may receive user input that is indicative of personal information to configure the user's account. For example, in the illustrated embodiment, the user may input the user's name, an email address, a mailing address, a phone number, and a password in respective text boxes. In one example embodiment, one or more of the elements 1612-1620 may be designated as being required input (e.g., such as the user's name, email, address, and password; as indicated by an asterisks) or optional input (e.g., phone #; as indicated by the absence of an asterisks). In an alternative embodiment, more or less information may be provided and more or less information may be designated as required input (e.g., in one example embodiment, none of the elements 1612-1620 are designated as optional).

The elements 1622, 1624 may receive user input that is indicative of the user's gender. For example, in operation, the user may position the pointer 1638 over a selected one of the elements 1622, 1624 to select male or female. The control element 1626 may correspond to a control element for receiving user input that is indicative of the user's age. In the illustrated embodiment, the control element 1626 may correspond to a drop-down menu for selecting the range of ages. In alternative embodiments, the control element 1626 may instead correspond to a text box in which the user may provide user input that is indicative of the user's age or date of birth. The elements 1628, 1630 may receive user input that is indicative of the user's height. The element 1634 may receive user input that is indicative of the user's weight. The element 1636 may receive user input that is indicative of a request to accept the user input received by the elements 1612-1634 and to proceed to the next user interface.

Although the elements 1612-1636 are shown as corresponding to various types of user interface elements—such as, but not limited to, text boxes, drop-down menus, and/or buttons—it will be appreciated that in alternative embodiments the elements 1612-1636 may be any suitable type of user interface element for receiving the corresponding user input.

FIG. 17 illustrates an example user interface 1700 of a webpage or software application executing on a client device (e.g., client machine 110 of FIG. 1) which may facilitate providing user measurement data as part of the process of creating a user account, such as an account corresponding to the data structure 602 of FIG. 6. In one example embodiment, the user interface 1700 may correspond to a user interface provided by the digital inventory system 500 of FIG. 5 in response to a user selecting interface element 1636 of FIG. 16. Elements common to the interfaces 1600 and 1700 of FIGS. 16 and 17 share common reference indicia, and only differences between the interfaces are described herein for the sake of brevity.

In the illustrated embodiment of the user interface 1700, the frame 1602 may include elements 1604-1610 and sub-frames 1702, 1704, 1706. The sub-frame 1702 may include user interface elements 1708-1726. The sub-frame 1704 may include user interface elements 1730-1742. The sub-frame 1706 may include user interface elements 1750-1764.

The sub-frames 1702, 1704, 1706 may receive user inputs for determining measurements of the user and/or image data of the user. The user inputs may correspond to one or more images of the user, for example, posed in accordance with respective templates. For example, the sub-frame 1702 may prompt the user to provide a first image of the user facing the camera and posed as shown by template 1714. In an alternative embodiment, a template may include a full-body view. The sub-frame 1704 may prompt the user to provide a second photo of the user showing a side view of the user in accordance with template 1736. The sub-frame 1706 may prompt the user to provide a third photo of the user showing a waist-down view of the user in accordance with template 1756. To facilitate providing the images, the user interface 1700 may provide elements 1708, 1730, 1750 for browsing a file system for a file to be uploaded to the digital inventory system 500.

Additionally or alternatively, the user interface 1700 may provide elements 1710, 1732, 1752 for capturing a new image of the user in order to provide image data for the respective sub-frames 1702, 1704, 1706. For example, in response to the user selecting the capture element 1710, a camera may be activated for capturing images or a video of the user, and the images or video may be displayed in the sub-frame 1702 in substantially real time and with the template 1714 superimposed on the images or video. The user may then position the user's body to substantially match the template 1714, and an image from the images or video may be captured either automatically (e.g., detecting the user's pose matching the template 1714) or in response to a user input (e.g., by a voice command or by selecting the capture element 1710 a second time). As such, the user interface 1700 may provide integrated image capturing capabilities. The capture elements 1732, 1752 may be configured in a similar way.

In operation, once images have been provided to the sub-frames 1702, 1704, 1706, one or more points (POIs) may be placed on the images for determining measurements. For example, sub-frame 1702 includes POIs 1716-1726 to be positioned on the front-view image of the user. The template 1736 of the sub-frame 1704 includes POIs 1738-1742 to be positioned on the side view image of the user. The template 1756 of the sub-frame 1706 includes POIs 1758-1764 to be positioned on the bottom-view image of the user. The distances between POIs and a reference measurement (the user's height and/or weight) may be indicative of one or more measurements of the user that are suitable for generating a digital avatar model. Positioning of the POIs will be described in greater detail later in connection with FIG. 18.

Additionally or alternatively, the user interface 1700 may provide elements 1712, 1734, 1754 for uploading the images provided to the sub-frames 1702, 1704, 1706, respectively. For example, in operation, the user may select the upload element 1712 after a front-view image has been selected and the POIs 1716-1726 have been positioned. When the image is uploaded, the digital inventory system 500 may determine measurements based on the distances between POIs 1716-1726. The upload elements 1734, 1754 may be configured in a similar way.

FIG. 18 illustrates an example user interface 1800 of a webpage or software application executing on a client device (e.g., client machine 110 of FIG. 1) which may facilitate providing user measurement data as part of the process of creating a user account, such as an account corresponding to the data structure 602 of FIG. 6. The user interface 1800 may correspond to the user interface 1700 of FIG. 17 in response to the user uploading an image to the sub-frame 1702. Elements common to the interfaces 1600-1800 of FIGS. 16, 17, and 18 share common reference indicia, and only differences between the interfaces are described herein for the sake of brevity.

In the illustrated embodiment of the user interface 1800, the sub-frame 1702 may include an image 1802 of the user posed in accordance with the template 1714 of FIG. 17. As stated, the image 1802 may have been provided by the user by the user selecting the browse element 1708 or the capture element 1710. In operation, the user may select the POIs 1716-1726 for positioning the points on the image 1802 of the user. For example, the illustrated embodiment shows that the user has selected the point 1720 and has moved the point 1720 from an initial position 1804 along a path 1806 to a shoulder point of the image 1802. After the POIs 1716-1726 have been positioned, the user may select the upload element 1712 for providing to the digital inventory system 500 the image 1802 and the positions of the POIs 1716-1726 relative to the image 1802.

FIG. 19 illustrates an example user interface 1900 of a webpage or software application executing on a client device (e.g., client machine 110 of FIG. 1) which may facilitate saving user account data as part of the process of creating a user account, such as an account corresponding to the data structure 602 of FIG. 6. The user interface 1900 may correspond to a user interface provided by the digital inventory system 500 in response to the user completing uploading images to the sub-frames 1702, 1704, 1706 of FIG. 17. Elements common to the interfaces 1600 and 1900 of FIGS. 16 and 19 share common reference indicia, and only differences between the interfaces are described herein for the sake of brevity.

In the illustrated embodiment of the user interface 1900, the frame 1602 includes elements 1903-1924 for receiving user inputs that are indicative of user attributes and saving to the user account. For example, the elements 1903-1912 may receive user inputs that are indicative of one or more attributes to be applied to the user account. The attributes may correspond to preferences of the user. For example, in the illustrated embodiment, the user may select one or more categories indicating that the user prefers formal clothing (element 1903), pants (element 1904), casual clothing (element 1906), shoes (element 1908), shirts (element 1910), and/or funky clothing (element 1912).

Additionally or alternatively, the elements 1914, 1916 may receive user inputs that are indicative of relationships with other users. In the illustrated embodiment, for example, the element 1914 of the frame 1602 may receive user input for indicating that the user account and the user account of the user's spouse should be linked. Moreover, the element 1916 of the frame 1602 may receive user input for indicating that the user account and the user account of the user's children should be linked.

The frame 1602 may also display a preview of the digital avatar 1918 for confirmation and/or adjustment. As stated, the preview of the digital avatar 1918 may be generated by the digital inventory system 500 based on the distances between a plurality of points of one or more images of the user, as was described above in connection with FIGS. 16-17. Moreover, the frame 1602 may display a preview of the size information determined by the digital inventory system 500. For example, in the illustrated embodiment, the element 1920 displays the shirt size and pant size of the user as determined by the digital inventory system 500. The element 1922 may receive user input for editing the digital avatar 1918 or the size information element 1920. The element 1924 may receive user input for saving the avatar data to the user account.

Figure 20:
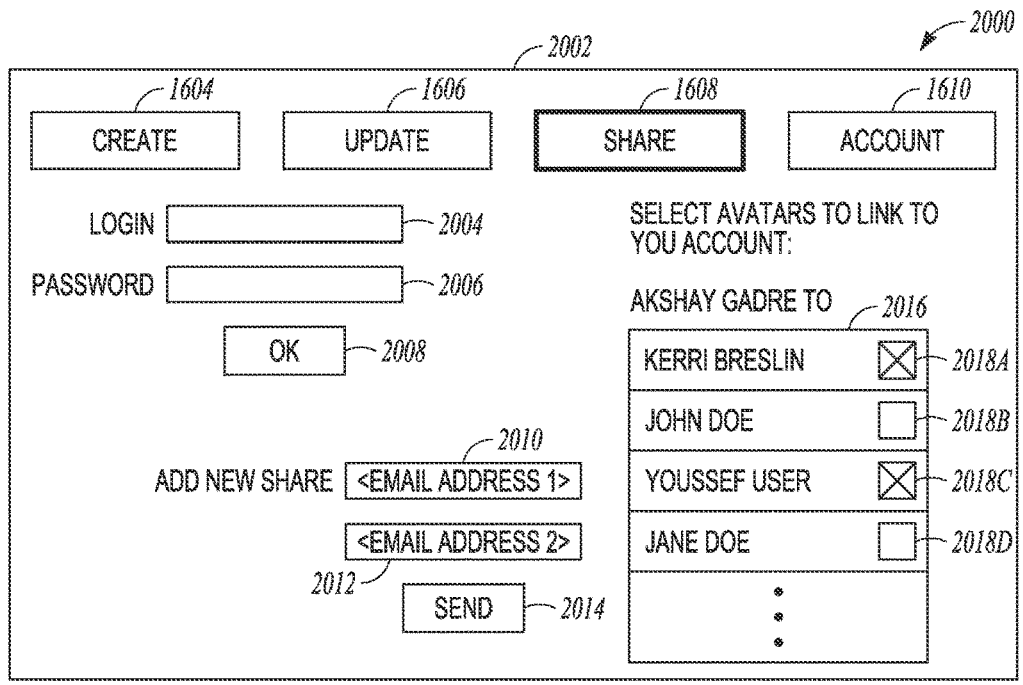

FIG. 20 illustrates an example user interface 2000 of a webpage or software application executing on a client device (e.g., client machine 110 of FIG. 1) which may facilitate sharing user accounts, such as accounts corresponding to the data structure 602 of FIG. 6. The user interface 2000 may include a frame 2002 having elements 1604-1610 and elements 2004-2016. Moreover, the element 2016 may correspond to a table comprising one or more rows formed by elements 2018A-D. Elements common to the interfaces 1600 and 2000 of FIGS. 16 and 20 share common reference indicia, and only differences between the interfaces are described herein for the sake of brevity.

The elements 2004, 2006 may receive user input that corresponds to login data for accessing a user account. For example, the user interface 2000 may receive user inputs indicative of a username and a password via the login element 2004 and the password element 2006, respectively. Selection of the element 2008 may cause the user interface 2000 to provide the login and password data to the digital inventory system 500 for authentication. If authentication is successful, the digital inventory system 500 may send user interface data to activate elements 2010-2016.

The elements 2010, 2012 may facilitate sharing user account data between users. For example the elements 2010, 2012 may receive user input indicative of one or more email addresses of other users. If the element 2014 receives user input that corresponds to a user selection of element 2014, the user interface 2000 may transmit the email address data to the digital inventory system 500 for linking the user account with the user accounts associated with the email addresses. In an example, linking the user account includes providing the users associated with the email addresses access to the user account. In another example, linking the user account includes sending the users associated with the email addresses a notification requesting permission for the user to access their user accounts.

The element 2016 of the frame 2002 may correspond to a table of one or more entries, each entry corresponding to a contact of the user. The contacts may correspond to contacts to whom the user has sent share requests via elements 2010, 2012, 2014 and/or contacts who have sent share requests to the user. Furthermore, the entries of the element 2016 may include respective user interface elements 2018A-D for receiving user input that is indicative of the user activating or deactivating the corresponding entry. Deactivating an entry of the element 2016 may correspond to disabling sharing with the corresponding contact (e.g., temporarily preventing access to user account data), and activating an entry of the element 2016 may correspond to enabling sharing with the corresponding contact (e.g., allowing access to user account data). In this way, the user may dynamically manage shared contacts.

Figure 21:
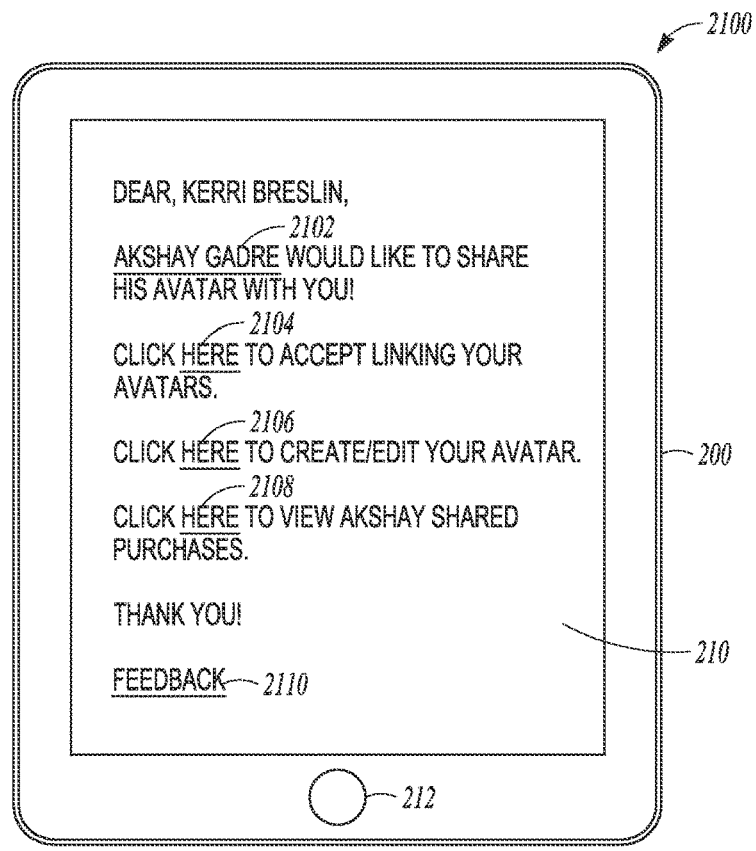

FIG. 21 illustrates an example user interface 2100 of a webpage or software application rendered on a client device (e.g., mobile device 200 of FIG. 2 or any client machine 110 of FIG. 1) which may display a share request for a user. The user interface 2100 may correspond to a notification sent to the mobile device 200 in response to another user transmitting a share request. The notification may include one or more selectable elements, such as hyperlinks 2102-2110, for facilitating responses to the notification. The hyperlink 2102 may correspond to a link to a profile page of the requesting user ("Akshay Gadre"). The hyperlink 2104 may correspond to a link for accepting the share request. The hyperlink 2106 may correspond to a link for creating or editing the user's account. The hyperlink 2108 may correspond to a link for viewing shared purchases of the share request recipient and the share request sender. The hyperlink 2110 may correspond to a link to provide feedback to the digital inventory system 500.

Figure 22:
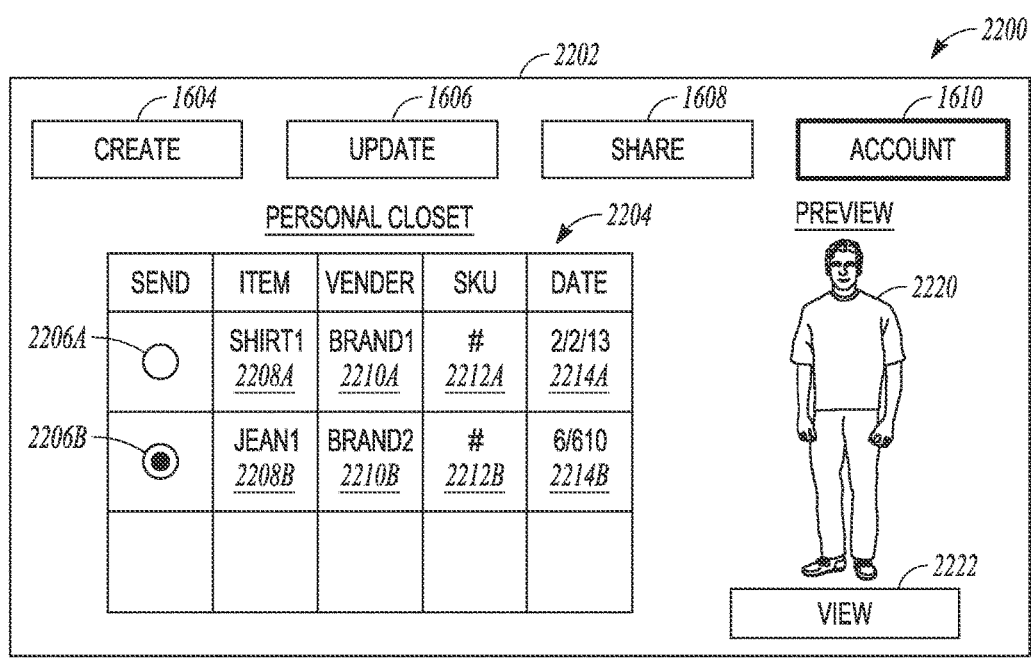

FIG. 22 illustrates an example user interface 2200 of a webpage or software application to be rendered on a client device (e.g., client machine 110 of FIG. 1) which may facilitate managing a user account, such as an account corresponding to the data structure 602 of FIG. 6. The user interface 2200 may include a frame 2202 having elements 1604-1610 and element 2204 corresponding to a table of one or more rows formed by elements 2206A-2214A, 2206B-2214B. The frame 2202 may further include display element 2220 and a control element 2222.

The element 2204 may correspond to a personal closet of the user. The personal closet may include products that the user has purchased using the digital inventory system 500 and/or products that have been entered into the digital inventory system 500. Each product may have a corresponding row. For example, the row including the elements 2206A-2214A may represent a first product corresponding to a shirt, and the row including the elements 2206B-2214B may represent a second product corresponding to a pair of jeans. The elements 2206A, 2206B may receive user input that is indicative of selecting the corresponding product. The elements 2208A, 2208B may display text that describes the corresponding product. The elements 2210A, 2210B may provide text that is indicative of the vendor of the corresponding product. The element 2212A, 2212B may provide text that is indicative of an identification number (e.g., stock keeping unit (SKU) number) of the corresponding product. The elements 2214A, 2214B may provide text that is indicative of the date on which the corresponding product was purchased or entered into the digital inventory system 500.

The display element 2220 of the frame 2202 may correspond to a preview of the digital avatar wearing the selected products from the table in element 2204 in accordance with the selection of the elements 2206A, 2206B and in response to the user selecting the control element 2222.

FIGS. 23-27 are interface diagrams illustrating example user interfaces with multiple display elements delivered to a client device for utilizing digital avatars, according to example embodiments. In particular, the user interfaces of FIGS. 23-27 may be provided by online marketplace servers, such as the marketplace application 120 of FIG. 1. The online marketplace servers may provide the user interfaces as part of the retailer's or vendor's website or application. Digital avatars may be displayed as part of the website or application to improve the user's shopping experience. Elements common to the user interfaces 2300-2700 of FIGS. 23-27 share common reference indicia, and only differences between the user interfaces are described herein for the sake of brevity.

Figure 23:
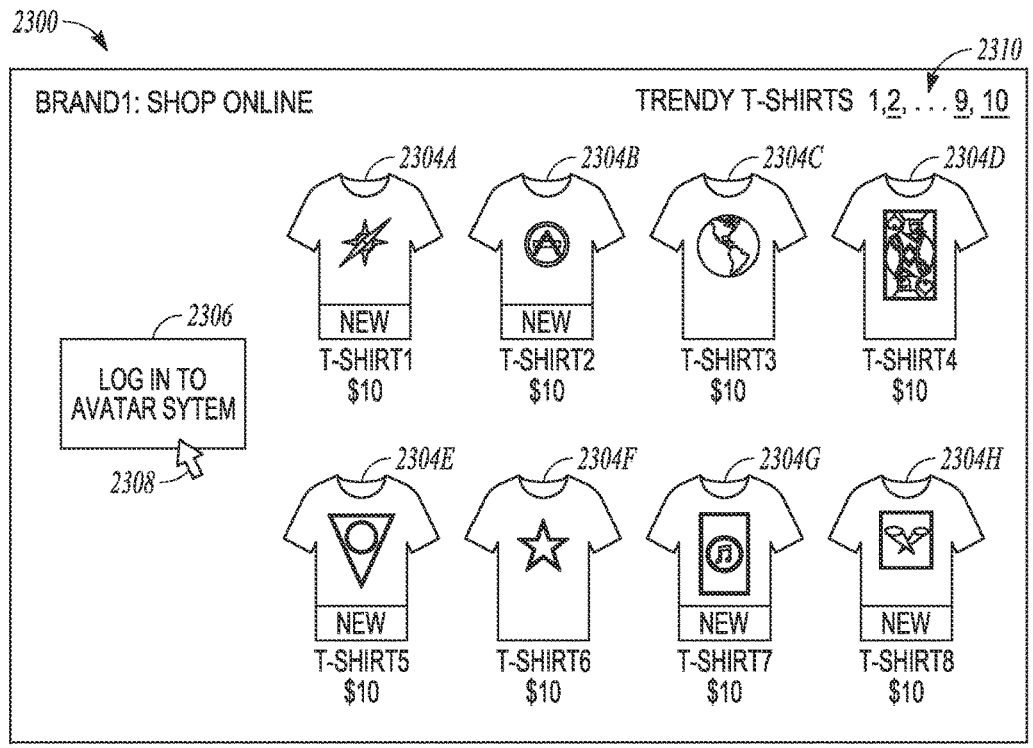
FIGS. 23-28 are interface diagrams illustrating example user interfaces with multiple display elements delivered to a client device for utilizing digital avatars, according to example embodiments.

FIG. 23 illustrates an example user interface 2300 of a webpage or software application of an online marketplace to be rendered on a client device (e.g., client machine 110 of FIG. 1). The user interface 2300 may include a frame having elements 2304A-2304H, 2306, 2308, 2310. The elements 2304A-2304H of the illustrated embodiment may correspond to various products (e.g., shirts) for purchase. The element 2306 may correspond to a button that is selectable for logging into the digital inventory system 500. The element 2308 may correspond to a pointer of an input device. The element 2310 may correspond to control elements used to navigate between a plurality of pages displaying products of the online marketplace.

Figure 24:
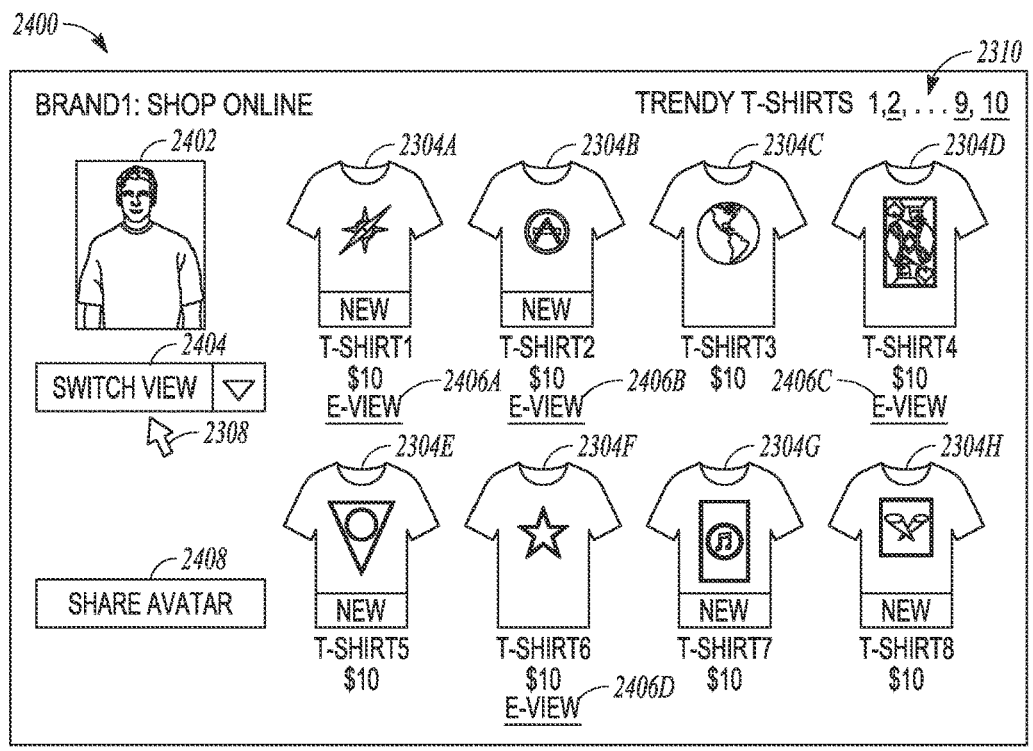

FIG. 24 illustrates an example user interface 2400 of a webpage or software application of an online marketplace to be rendered on a client device (e.g., client machine 110 of FIG. 1). The user interface 2400 may correspond to a user interface provided by the digital inventory system 500 in response to a user selection of the element 2306 of FIG. 23 and successful authentication. In particular, after the user successfully logs into the digital inventory system 500, the user interface 2400 displays elements 2402, 2404, 2406A-D, 2408. The element 2402 may correspond to a display element for displaying the user's digital avatar. In the illustrated embodiment of FIG. 24, the digital avatar is shown in a default configuration (e.g., blank shirt). The element 2404 may correspond to a selectable button or pull-down menu for changing the element 2402 to a different user. The elements 2406A-D may correspond to selectable control elements for configuring the digital avatar displayed in element 2402, as will be described in greater detail below in connection with FIG. 25. As shown, not all products of the online marketplace may support digital avatar views (e.g., the products of elements 2304E, G, H). The element 2408 may correspond to a selectable button for sharing the digital avatar displayed in element 2402 with another user or to post to a social network for commenting.

Figure 25:
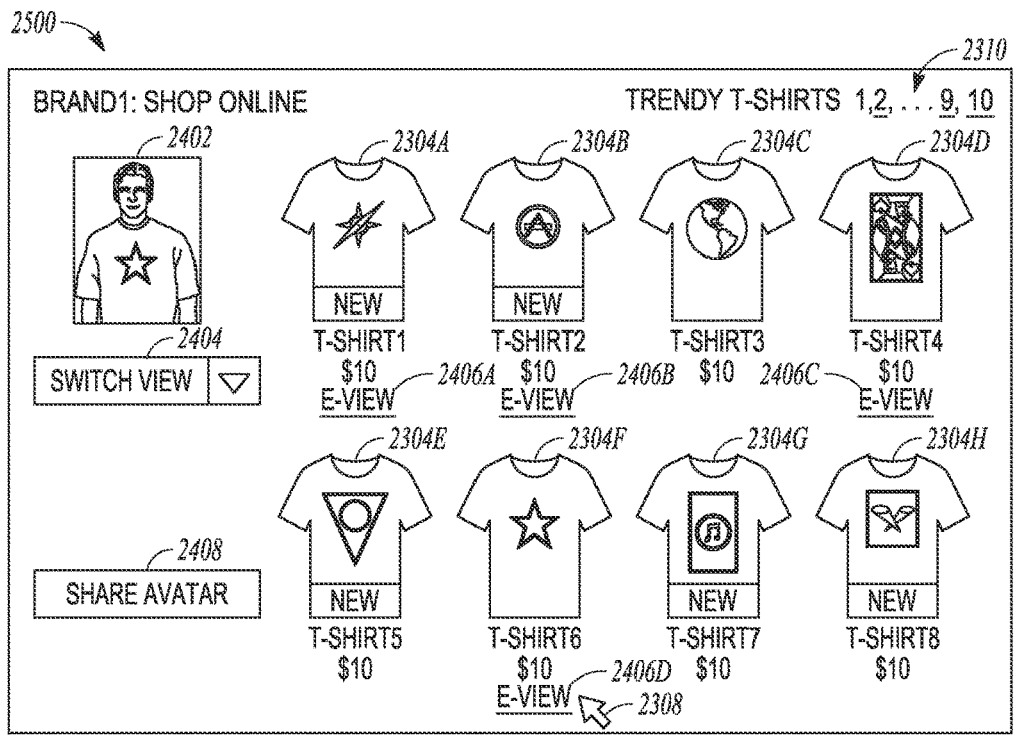

FIG. 25 illustrates an example user interface 2500 of a webpage or software application of an online marketplace to be rendered on a client device (e.g., client machine 110 of FIG. 1). The user interface 2500 may correspond to a user interface provided by the digital inventory system 500 in response to a user selection of the element 2406D of FIG. 24. In particular, in accordance with a user selection of the element 2406D, the element 2402 displays the digital avatar of the user as wearing the shirt corresponding to the element 2406D. The user may then select one of the elements 2304A-2304H to change the shirt of the digital avatar again.

Figure 26:
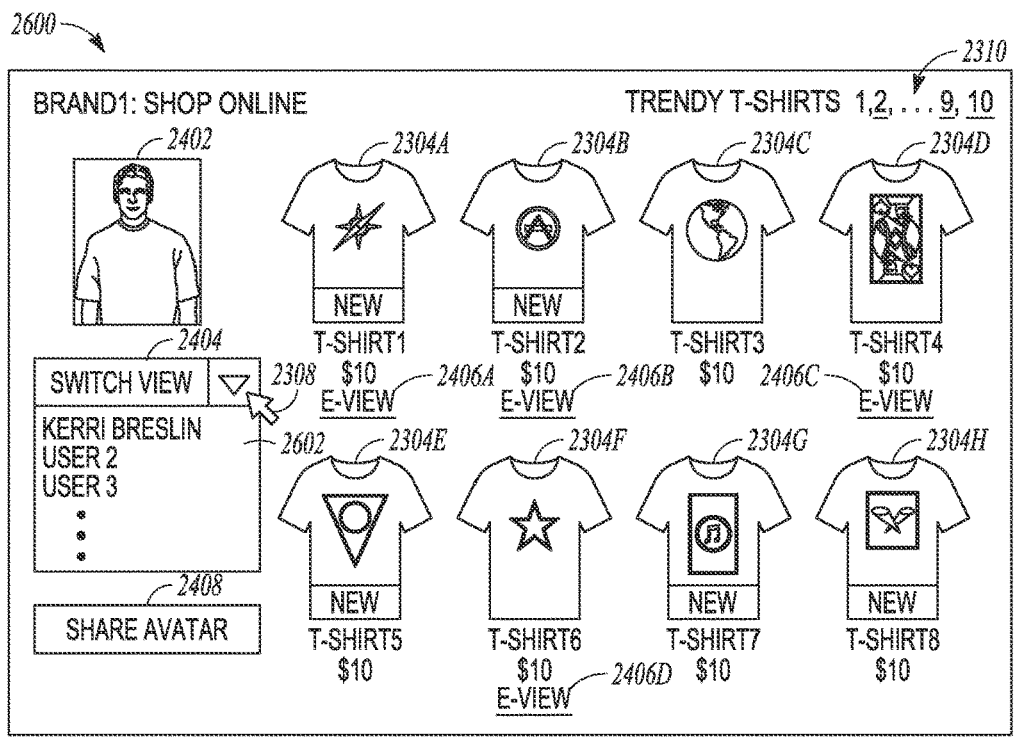

FIG. 26 illustrates an example user interface 2600 of a webpage or software application of an online marketplace to be rendered on a client device (e.g., client machine 110 of FIG. 1). The user interface 2600 may correspond to a user interface provided by the digital inventory system 500 in response to a user selection of the element 2404 of FIG. 24. In particular, in accordance with a user selection of the element 2404, the element 2404 displays a list of contacts who shared their digital avatars with the user. Accordingly the user may select a contact that is listed in element 2602 in order to use the selected contact's avatar, as shown below in connection with FIGS. 27 and 28.

Figure 27:
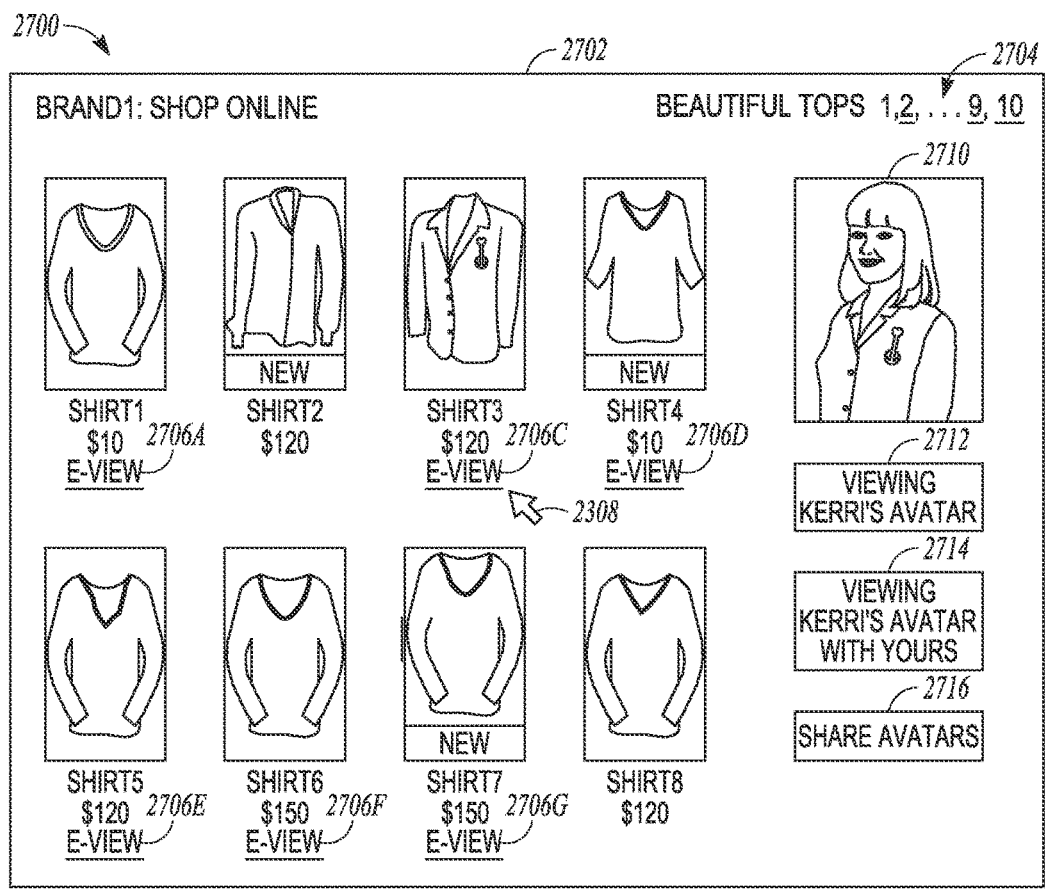

FIG. 27 illustrates an example user interface 2700 of a webpage or software application of an online marketplace to be rendered on a client device (e.g., client machine 110 of FIG. 1). The user interface 2700 may correspond to a user interface provided by the digital inventory system 500 in response to a user selection the contact "Kerri Breslin" from the element 2602 of FIG. 26. In particular, the user interface 2700 includes a frame 2702 comprising elements 2706A-G for configuring a digital avatar of the contact with the corresponding products. The frame 2702 may further include a group of elements 2704 for navigating to different product pages. An element 2710 of the frame 2702 may display the digital avatar of the contact in accordance with user selections of elements 2706A-G. For example, the digital avatar displayed in element 2710 is shown as wearing the product corresponding to the element 2706C selected by the pointer element 2308. An element 2712 of the frame 2702 may display the user name of the contact currently being displayed. An element 2714 of the frame 2702 may be selected for viewing the current user's avatar with the contact's avatar. An element 2716 of the frame 2702 may be selected for sharing the avatars being displayed.

Figure 28:
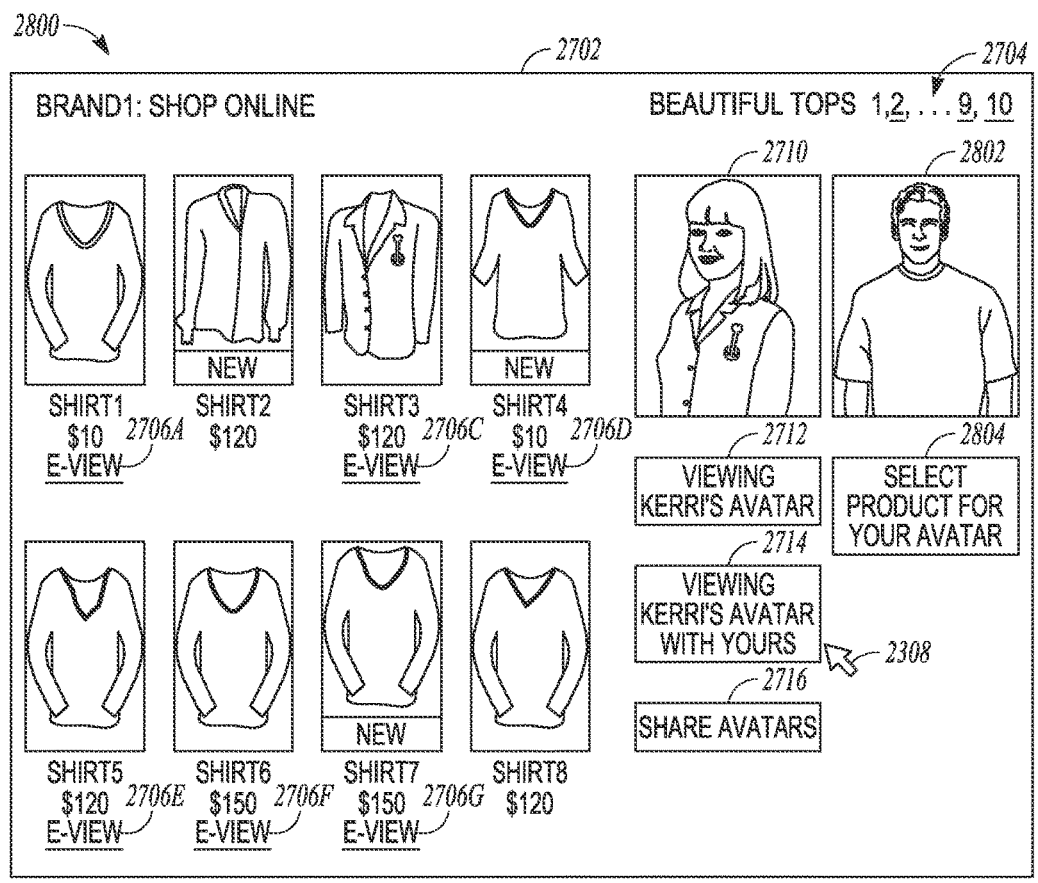

FIG. 28 illustrates an example user interface 2800 of a webpage or software application of an online marketplace to be rendered on a client device (e.g., client machine 110 of FIG. 1). The user interface 2800 may correspond to a user interface provided by the digital inventory system 500 in response to a user selecting the element 2714 of FIG. 27 for viewing the user's avatar and the contact's avatar together. In particular, the user interface 2800 includes the display element 2802 for displaying the digital avatar of the user. Furthermore, the user interface 2800 includes the element 2804, which may correspond to a selectable button for selecting to configure the user's avatar. For example, after selecting the element 2804, selecting an "e-view" element (e.g., elements 2706A-G) causes the display element 2802 to display the corresponding product on the user's avatar instead of the contact's avatar of display element 2710.

Figure 29:
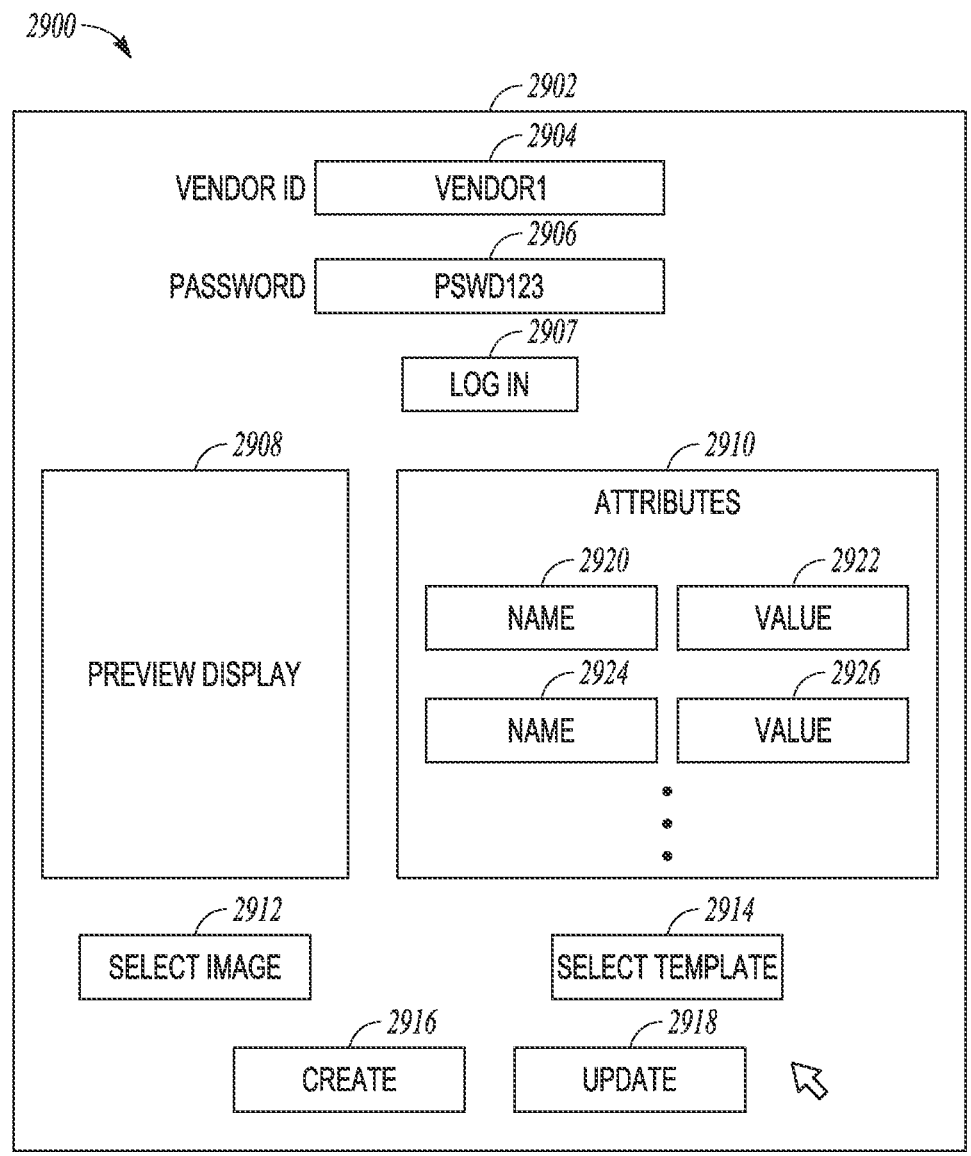
FIG. 29 is an interface diagram illustrating an example user interface with multiple display elements delivered to a client device for providing product records, according to example embodiments.

FIG. 29 is an interface diagram illustrating an example user interface 2900 with multiple display elements delivered to a client device for providing product records, according to example embodiments. For example, a user of an online marketplace server 118A-M of FIG. 3 may provide user input to create a product record of a vendor account stored by the digital avatar server 118N using the database 126N. The user interface 2900 may include a frame 2902 which has elements 2904-2918. The element 2910 may correspond to a table having one or more entries, such as a pair of elements 2920, 2922 forming one entry and a pair of element 2924, 2926 forming another entry.

In the illustrated embodiment, the elements 2904, 2906 may correspond to text boxes for receiving user input (e.g., username and password) for logging into the digital inventory system 500. The element 2907 may correspond to a button that is selectable for initiating an authentication process based on the user input received by the elements 2904, 2906. Upon a successful authentication, the user (e.g., a vendor) may access the elements 2908 through 2926 for creating a product record for the vendor account of the user.

The element 2908 may correspond to a display element for rendering a preview image of the avatar version of the product. The preview image may be rendered in response to a user selection of element 2912, which may correspond to a selectable button for browsing a file hierarchy to select an image file. Upon selection of the image file, the image of the image file is displayed in the preview display element 2908. The image may correspond to a view of the product in a specified size and worn by an avatar of a specified size. Furthermore, the image may correspond to a specified view, such as a front view, side view, waist-up view, waist-down view, or the like. For example, the vendor user may select a first image file of a front view of a size-15 avatar wearing a shirt in size medium.

As described previously in connection with FIG. 6, each product record may have more than one image. Accordingly, the vendor user may repeat the process of selecting and uploading images for variations of the digital avatar. For example, the vendor user may select and upload a second image of a different view (e.g., side view), a third image of a different size avatar (e.g., a size-15.5 avatar), a fourth image of a different size shirt (e.g., a large shirt), for the product record being created or edited. It will be appreciated that variations of the images are not limited to sizes of the product and avatar and the perspective of the view, but may include any suitable variation for modeling the product or a group of users. For example, variations of the images may include color of the product, skin color of the user, and the like.

The element 2910 may correspond to a frame including one or more elements for receiving and displaying user input that is indicative of one or more attributes of the product and or selected image. Each entry of element 2910 may correspond to an attribute-value pair. For example, the elements 2920, 2922 may receive and display user input associated with an attribute name and an attribute value pair. The respective attributes may have a value, such as a binary logic, a numerical value, or string value suitable for expressing the degree or nature of the attribute. For example, an attribute named "Sale" may have a value "30%" to indicate that the product of the product record is on sale for 30%. Other example attribute-value pairs may include (Color, Red), (Shirt, True), (ButtonFly, No), (OnlineOnly, Yes), and the like.

Moreover, the attribute-value pair may be indicative of the variation of the image. For example, an image corresponding to a front view of a size-15 avatar wearing a particular shirt in size medium may have entries in element 2910 corresponding to (ProductSize, M), (AvatarSize, 15), and (View, Front). In this way, in response to a user of the online marketplace selecting a specified product, size, and view, the digital inventory system 500 may select the corresponding image for display.

It will be appreciated that the attributes may be global attributes or image attributes. Global attributes are attributes that are applied to each image variation of the product. An example global attribute may be (Sale, 30%), which may be applied to each image of the product. Accordingly, global attributes may facilitate searching for products that satisfy one or more search conditions. An image attribute may be an attribute that is only applied to the selected image of the product. Examples of image attributes include (ProductSize, M), (AvatarSize, 15), and (View, Front). Accordingly, image attributes may facilitate selecting an image from a plurality of images of a product for display as part of a digital avatar.

To facilitate populating the element 2910 of attributes, the user interface 2900 may include the element 2914, which may correspond to selectable button for selecting a template on file. A template includes data for automatically generating one or more attribute-value pairs of element 2910.

It will be understood by a person of ordinary skill that other embodiments of the user interfaces of FIGS. 16-29 need not include each element shown in the figures and other embodiments may include more or less elements.

Example Digital Avatar Processes

Figure 30:
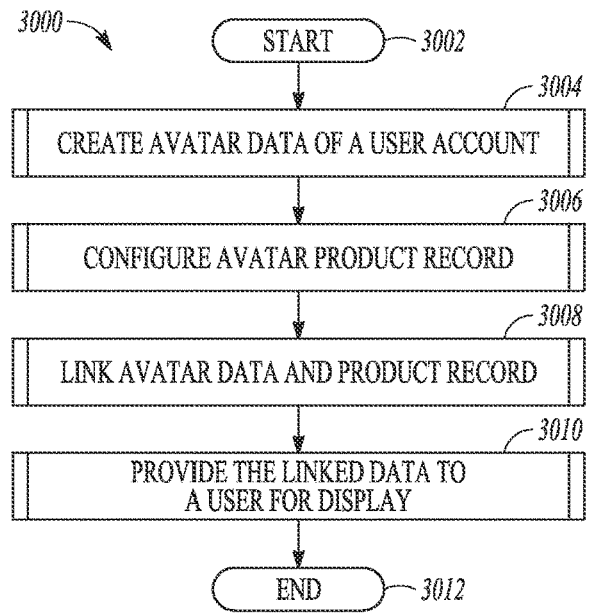
FIG. 30 is a flowchart illustrating an example method of generating avatar data for users, in accordance with an example embodiment.

FIG. 30 is a flowchart illustrating an example method 3000 of generating avatar data for users, in accordance with an example embodiment. In this example, the method 3000 may include operations such as creating avatar data of a user account (block 3004), configuring an avatar product record (block 3006), linking avatar data and a product record (block 3008), and providing the link data to a user for display (block 3010). The example method 3000 will be described below, by way of explanation, as being performed by certain modules. It will be appreciated, however, that the operations of the example method 3000 can be performed in any suitable order by any number of the modules shown in FIG. 5.

The method 3000 starts at block 3002 and proceeds to block 3004 for creating avatar data of a user account. For example, the digital inventory system 500 (e.g., via the web-front module(s) 512) may provide data for a user interface to be displayed on a user device. The user interface may correspond to the example user interfaces 1600-1900 described previously in connection with FIG. 16-19. Accordingly, the digital inventory system 500 may determine measurement data of the user based on one or more images provided by the user. Furthermore, the measurement data of the user may be based additionally on one or more user inputs, such as the height and/or weight of the user. The data related to the height and/or weight of the user may be inputted by the user manually via the elements 1628, 1630, 1634 of FIG. 16.

In an example embodiment, the graphics processing module(s) 506 may determine the measurement data based on the one or more images and, if provided, data related to the height and/or weight of the user. For example, the graphics processing module(s) 506 may utilize the height measurement of the user to scale the distances between the POIs of the images to physical measurements. It will be appreciated, however, that in alternative embodiments, measurement data may be obtained in alternative ways, such as body scan data and/or manual user input.

The measurement data may be stored in the sizing data field 622 of the data structure 602 of FIG. 6. The received image data may be stored in the image data field 624 of the data structure 602. An example embodiment of block 3004 will be described later in greater detail in connection with FIG. 31.

The method 3000 may include block 3006 for configuring an avatar product record. For example, a vendor user may create or modify a product record data structure 604 that is linked to the vendor account (e.g., data structure 606 of FIG. 6. In an example embodiment, the digital inventory system 500 (e.g., using the web-front module(s) 512) may provide data to display a user interface on a client device of the vendor user. The user interface may, for instance, correspond to the user interface 2900 described previously in connection with FIG. 29. Accordingly, the digital inventory system 500 may receive one or more images and one or more attributes of the product from the user vendor. In turn, the vendor database sub-module(s) 522 may store the received product data in the product record data structure 604. For example, the one or more images, as well as attributes of the images, may be stored in the image data array 636. Global attributes may be stored in the attributes array 634. An example embodiment of block 3006 will be described later in greater detail in connection with FIG. 32.

The method 3000 may include the block 3008 for linking avatar data and a product record. By linking the data, model data for a digital avatar wearing the selected product may be generated for display on a user device. In an example embodiment, the digital inventory system 500 may provide data for a user interface of an online market to allow the user to view digital avatars. The user interface may correspond to the interfaces described previously in connection with FIGS. 23-27. Linking avatar data of the user and a product record may be responsive to a user request to generate an avatar wearing a selected product. For example, the digital inventory system 500 may perform block 3008 in response to the user selecting, for example, the element 2406D of FIG. 25. The linking may include mapping the user's measurements to a product image of the corresponding product record. An example embodiment of block 3008 will be described later in greater detail in connection with FIG. 33.

After the linked data is generated at block 3008, the method 3000 may include block 3010 for providing the linked data to a user for display. In an example embodiment, the communication interface module(s) 508 may provide the linked data to a user device in accordance with the user request of block 3008. The user device may correspond to the requesting user or to another user (e.g., the requesting user sharing avatar data with a second user). An example embodiment of block 3010 will be described later in greater detail in connection with FIG. 35.

Figure 31:
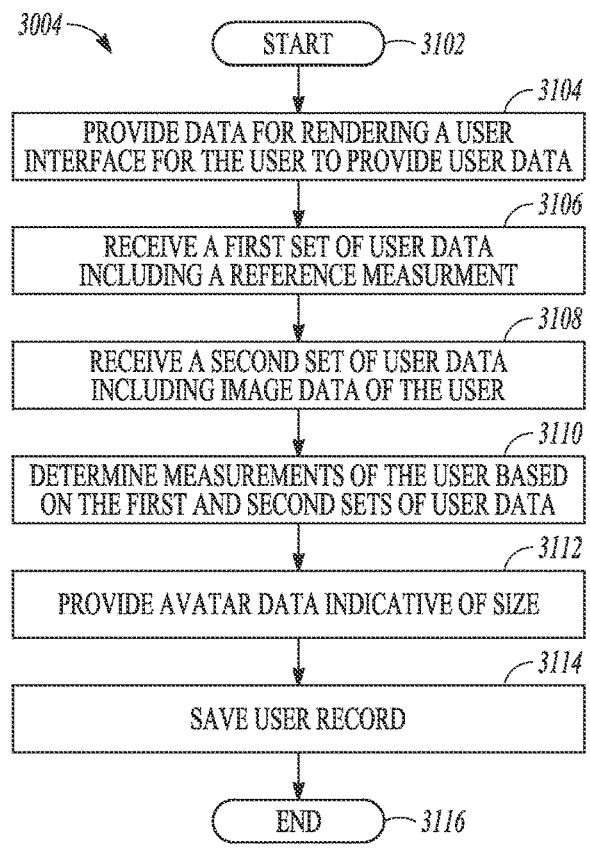
FIG. 31 is a flowchart illustrating an example method of creating avatar data, in accordance with an example embodiment.

FIG. 31 is a flowchart illustrating an example method of the block 3004 of FIG. 30 for creating avatar data, in accordance with an example embodiment. In this example, the block 3004 may include operations such as providing data for rendering a user interface (block 3104), receiving a first set of user data that includes a reference measurement (block 3106), receiving a second set of user data including image data (block 3108), determining dimensions of the user based on the first and second sets of user data (block 3110), providing avatar data indicative of size data (block 3112), and saving the avatar data to a user record (block 3114). The example method of the block 3004 will be described below, by way of explanation, as being performed by certain modules. It will be appreciated, however, that the operations of the example method of the block 3004 can be performed in any suitable order by any number of the modules shown in FIG. 5.

The example method of the block 3004 starts at block 3102 and proceeds to block 3104 for providing data for rendering the user interface. In an example embodiment, the web front module(s) 512 may provide data for a user interface to a user device via the user facing sub-module(s) 514. The user interface may correspond to the user interfaces 1600 and 1700 shown in FIGS. 16 and 17, for instance. In particular, the user interface may include elements 1612-1636 of FIG. 16 for creating a user account. The user may supply user input that is indicative of the user's height and weight via the elements 1628, 1630, 1634. Additionally or alternatively, the user interface may include elements for providing image data, such as sub-frames 1702, 1704, 1706.

The example method of the block 3004 may further include block 3106 for receiving a first set of user data including a reference measurement. In an example embodiment, the first of the data may correspond to data provided by the user via the elements 1628, 1630, 1634 for providing the user's height and weight. In one aspect, the user's height may be used as a reference measurement in order to determine a scale of images provided by the user, as will be described in greater detail below. Additionally or alternatively, data that is indicative of the user's height and weight may be stored in the data structure 602 of the user account (e.g., in the sizing data field 622).

The example method of the block 3004 may further include block 3108 for receiving a second set of user data that includes image data of the user. In an example embodiment, the second set of data may correspond to data provided by the user via the sub-frames 1702, 1704, 1706 of FIG. 17. Moreover, a plurality of POI elements (e.g., POI elements 1716-1726, 1738-1742, 1758-1764) may have been positioned within the respective images. In an example embodiment, the graphics processing module(s) 506 may determine the positioning of the POI elements automatically. Additionally or alternatively, the user interface may facilitate the user positioning the point of interest elements within the images. The distances between the POI elements and the reference measurement may be used to determine the physical measurements of the user, as will be described below in greater detail. The image data may be stored in the data structure 602 of the user account (e.g., in the image data field 624). For example, an image of the user's head and neck may be captured for superimposing onto a body model that is selected or sized based on the user's measurements.

The example method of the block 3004 may include block 3110 for determining measurements of the user based on the first and second sets of user data. In an example embodiment, the digital inventory system 500 may receive the first and second sets of data from the user device. The graphics processing module(s) 506 may determine the one or more distances between POI elements in terms of the image space. For example, the graphics processing module(s) 506 may determine the distance between the top-of-the-head POI element and the foot POI element, which may measure, for example, 1 inch or 1000 pixels in the image. The measurement in the image space may be related to the reference measurement (e.g., the user's height provided at block 3106) in order to determine the scale of the image relative to the real-world physical measurements. For example, in the case that the user has indicated a height of 6 feet, each inch or 1000 pixels in the image space would correspond to 6 feet. Accordingly, physical measurements of the user may be estimated by scaling the distances between the POI elements in accordance with the determined scale.

In an example embodiment, the block 3110 may further include matching the measurement data to sizing data (e.g., clothing sizes). For example, the graphics processing module(s) 506 may access a database of body measurements paired with clothing sizes. The pairings may be based on the average clothing sizes worn by people having such body measurements. Accordingly, the graphics processing module(s) 506 may determine the clothing sizes of the user by matching the determined measurements to the measurements of the database. The graphics processing module(s) 506 may select the clothing sizes that are paired with the stored measurements that most closely match the determined measurements of the user. Examples of the clothing sizes may include shirt sizes, pant sizes (waist, inseam, drop, etc.), shoe sizes (length, width, etc.), hat sizes (small, medium, large, diameter, etc.), glove sizes (S, M, L, etc.), and the like. It will be appreciated that clothing sizes may be in accordance with any designation or standard, such as United States standard clothing sizes, EN 13402 (European Union standard sizes), International Organization for Standardization ("ISO") 3635, ISO 4416, ISO 5971, ISO 8559, ISO/Technical Report ("TR") 10652, and the like.

Based on a determination of clothing sizes, the digital inventory system 500 may access a database of avatar body models to select a body model that closely matches the determined clothing sizes. In some embodiments, a vendor's sizing domain and avatar platform's sizing domain may be different. For example, a vendor may provide product avatar data for a set of sizes that is different from the set of sizes used by the digital inventory system 500. Accordingly, the digital inventory system 500 may include mapping data for mapping the sizes of the vendor domain to or from the sizing domain of the digital inventory system 500.

The example method of the block 3004 may include block 3112 for providing avatar data that is indicative of the size of the user. In one example embodiment the communication interface module(s) 508 may provide data that is indicative of the clothing sizes to the user device for display. Moreover, the communication interface module(s) 508 may provide data that is usable to generate a preview digital avatar of the user. For example, the data may correspond to model data that includes image data of the user's face and image data of a digital model of the user's body. The digital model may be selected from one or more candidate model based on at least one of the determined user measurements or the determined user clothing sizes.

The example method of the block 3004 may include block 3114 for saving the user record. For example, the user database sub-module(s) 520 of the database management module(s) 504 may store the determined measurement data and/or the clothing sizes in the sizing data field 622 of the data structure 602. The example method of the block 3004 may end at block 3116.

Figure 32:
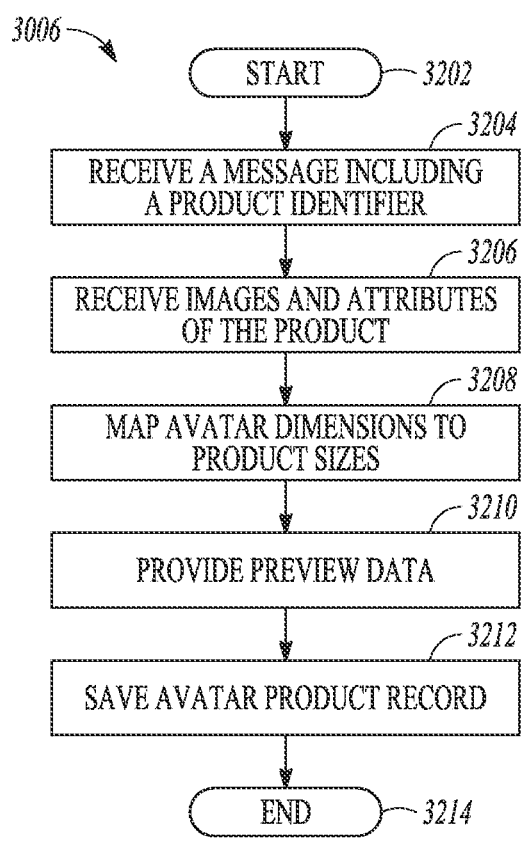
FIG. 32 is a flowchart illustrating an example method of configuring an avatar product record, in accordance with an example embodiment.

FIG. 32 is a flowchart illustrating an example method of the block 3006 of FIG. 30 for configuring an avatar product record, in accordance with an example embodiment. In this example, the example method of the block 3006 may include operations such as receiving a message that includes a product identifier (block 3204), receiving images and attributes of the product (block 3206), mapping avatar dimensions to product sizes (block 3208), providing preview data (block 3210), and saving the avatar product records (block 3212). The example method of the block 3006 will be described below, by way of explanation, as being performed by certain modules. It will be appreciated, however, that the operations of the example method of the block 3006 can be performed in any suitable order by any number of the modules shown in FIG. 5.

The example method of the block 3006 starts at block 3202 and proceeds to block 3204 for receiving a message that includes a product identifier. For example, after a successful authentication process, the vendor-facing sub-module(s) 516 of the application interface module(s) 502 may receive a request to create or edit a product record from a vendor. The request may include data that is capable of identifying a product record from one or more product records linked to the vendor account. In an example embodiment, the request may be provided by the vendor to the digital inventory system 500 in response to a selection of the element 2916 (of FIG. 29) for creating a product record or a selection of the element 2918 for updating the product record.

The example method of the block 3006 may include block 3206 for receiving images and attributes of the product. The images may correspond to models of the product worn by digital avatars. The model of the product may include the portion of an avatar related to or coinciding with the product. For example, a model for a shirt may be an image of the avatar from the waist up and the neck down. A model for a pair of pants may be an image of the avatar from the ankle up in the waist down. Each image may correspond to a particular variation of the users (e.g., sizes of the user, color, etc.), a particular variation of the product (e.g., sizes, color, etc.), in a particular variation of the few (e.g., front view, a side view, a back view, a waist-up view, a waist-down view, etc.). To account for the variations, a plurality of images may be provided to cover a range of variations. In operation, the database management module(s) 504 may select the image that most closely matches a requested variation in accordance with an avatar request message.

The received attributes may include metadata that describes the product and/or images. For example, each image that is received may be accompanied by attributes data that describes the corresponding image. The attributes may be indicative of the product view, product size, product color, avatar size, avatar color, and/or the like. As such, the attributes of the images may facilitate determining which image most closely matches a requested variation of an avatar request message.

Furthermore, received attributes may include global attributes or metadata that describes the product independent of the images. For example, the attributes may designate the product as being plus sized or subject to a sale or discount.

The global attributes may facilitate filtering search results. As stated, the attributes may be provided by the vendor via the elements 2920-2926 of the user interface 2900.

The example method of the block 3006 may include block 3208 for mapping avatar dimensions to product sizes. As stated, images may be received that correspond to a respective product size. Furthermore, the images may correspond to a particular sized avatar wearing the product of a particular size. Accordingly, dimensions of digital avatars are mapped to the received images. In one example embodiment, the database management module(s) 504 may perform the mapping of the product record using the product database sub-module(s) 526.

The example method of the block 3006 may include block 3210 for providing preview data. In an example embodiment, the graphics processing module(s) 506 of the digital inventory system 500 may provide a preview image to the vendor to provide visual feedback. The vendor may adjust the attributes of the product or the image in order to adjust the preview image.

The example method of the block 3006 may include block 3212 for saving the avatar product record. For example, in an example embodiment, the product database sub-module(s) 526 may save the attributes and image data and the corresponding attributes array 634 and/or image data array 636 of the data structure 604. The example method of the block 3006 may end at block 3214.

Figure 33:
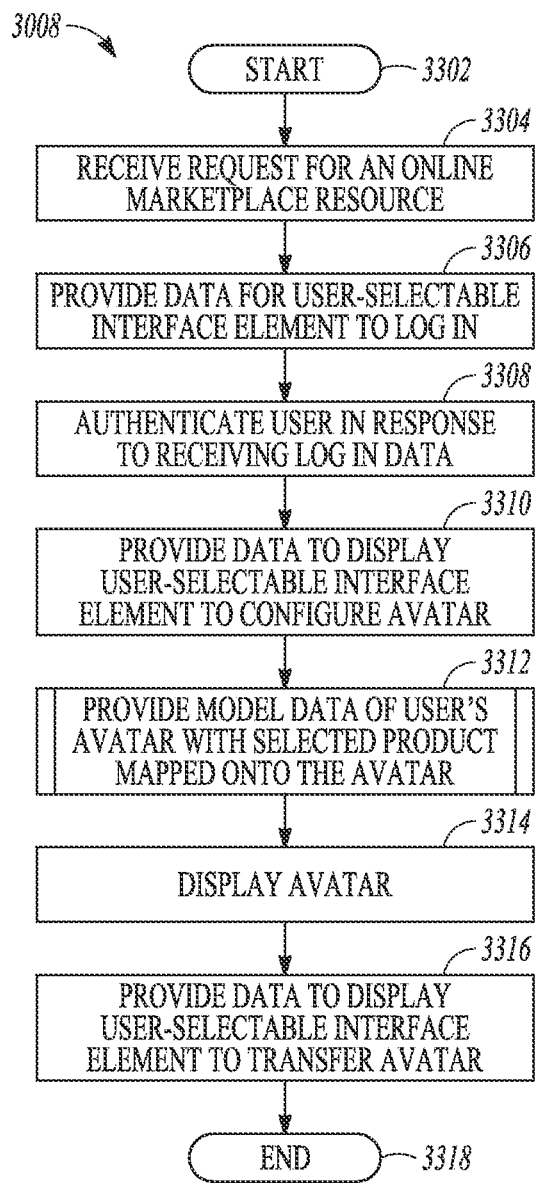
FIG. 33 is a flowchart illustrating an example method of linking avatar data, in accordance with an example embodiment.

FIG. 33 is a flowchart illustrating an example method of the block 3008 of FIG. 30 for linking avatar data, in accordance with an example embodiment. In this example, the method of the block 3008 may include operations such as receiving a request for an online marketplace resource (block 3304), providing data for user selectable interface elements for login (block 3306), authenticating the user (block 3308), providing data to display user selectable interface elements to configure the avatar display (block 3310), providing model data of the user's avatar (block 3312), displaying the avatar (block 3314), and providing data to display user selectable interface elements to transfer the avatar (block 3316). The example method of the block 3008 will be described below, by way of explanation, as being performed by certain modules. It will be appreciated, however, that the operations of the example method of the block 3008 can be performed in any suitable order by any number of the modules shown in FIG. 5.

The example method of the block 3008 starts at block 3302 and proceeds to block 3304 for receiving a request for an online marketplace resource. The request may be initiated by a user device requesting data for a webpage or application displaying a user interface of an online marketplace. In an example embodiment, a client machine 110 of FIG. 1 may transmit the request to the marketplace application 120. In response, the marketplace application 120 may transmit online marketplace resources to the client machine 110 for display.

At block 3306, the example method of the block 3008 may include providing data for user selectable interface element for logging into the digital inventory system 500. By logging in, digital avatar user interface elements may be exposed on the user interface so that the user may request digital avatar services. In an example embodiment, the user selectable interface elements may correspond to element 2306 (FIG. 23), which when selected may prompt the user to provide username and password information.

At block 3308, the example method of the block 3008 may include authenticating the user. In an example embodiment, the application interface module(s) 502 may receive login data from the user in connection with the user selectable interface element of block 3306. The login data may be passed to the authentication module(s) 510 for authenticating the user. The digital inventory system 500 may provide digital avatar services in response to a successful authentication.

At block 3310, the example method of the block 3008 may include providing data to display user selectable interface elements for configuring an avatar display. For instance, user selectable interface element may be provided for products that support the digital avatar system (e.g., the product has a corresponding avatar product record data structure 604). In an example embodiment, the user selectable interface elements may correspond to elements 2406A-D as shown in FIG. 24. As stated, the elements 2406A-D may facilitate configuring the user's avatar to display selected products.

At block 3312, the example method of the block 3008 may include providing model data of the user's avatar with a selected product mapped onto the avatar. For example, the providing of the model data may be in response to a user selection of one of the user selectable interface elements of block 3310. In an embodiment, the application interface module(s) 502 may receive an indication of the selection and access avatar data via the database management module(s) 504. The digital inventory system 500 may provide, to the user, the model data for display using the application interface module(s) 502 and the communication interface module(s) 508. Block 3312 will be described in greater detail later in connection with FIG. 34.

At block 3314, the example method of the block 3008 may include displaying the user's avatar configured with the selected product based on the model data provided at block 3312. At block 3316, the example method of the block 3008 may include providing data to display a user selectable interface element to transfer the avatar to a second user. In an example embodiment, the user selectable interface element may correspond to the element 2408 of FIG. 24. At block 3318, the example method of the block 3008 may end.

Figure 34:
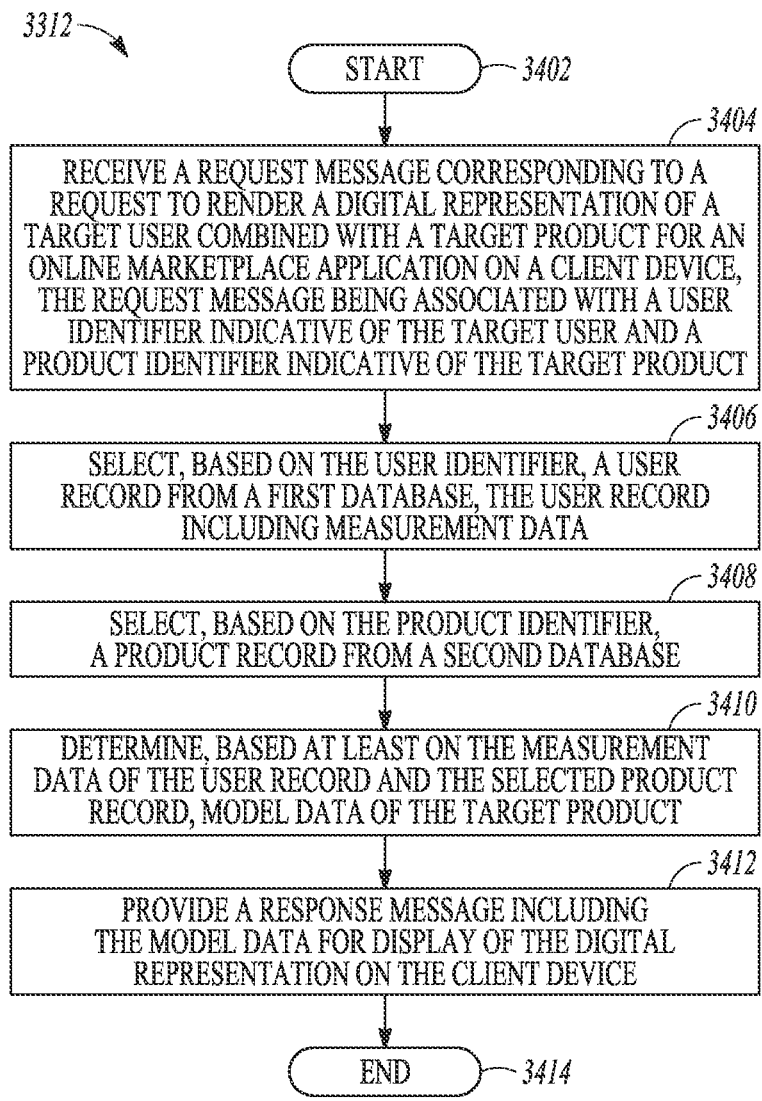
FIG. 34 is a flowchart illustrating an example method of proving model data of a user's avatar with a product, in accordance with an example embodiment.

FIG. 34 is a flowchart illustrating an example method of the block 3312 of FIG. 33 of providing model data of a user's avatar with a product, in accordance with an example embodiment. In this example, the method of the block 3312 may include operations such as receiving a request message (block 3404), selecting a user record that includes measurement data (block 3406), selecting a product record (block 3408), determining model data of the target product (block 3410), and providing a response message (block 3412). The example method of the block 3312 will be described below, by way of explanation, as being performed by certain modules. It will be appreciated, however, that the operations of the example method of the block 3312 can be performed in any suitable order by any number of the modules shown in FIG. 5.

The method of the block 3312 starts at block 3402 and proceeds to block 3404 for receiving a request message corresponding to a request to render a digital representation of a target user combined with a target product. The digital representation may correspond to a digital avatar of the target user wearing the target product, which may be an article of clothing, an accessory (shoes, hats, glasses, watches, scarves, belts, bags, etc.), wearable devices (headphones, wearable computing devices, etc.), or the like.

The user of the client device may provide the request message to configure the user's avatar or another user's avatar. Accordingly, the target user may be different from the user of the client device. An example of a user interface for configuring the user's avatar is shown in FIG. 25. An example of a user interface for configuring another user's avatar is shown in FIG. 27.

In an example embodiment, the application interface module(s) 502 may receive the request message from a user device or from an online marketplace application. The request message may be associated with a user identifier that is indicative of the target user. The first request message may also be associated with a product identifier that is indicative of the target product. For example, the request message may include the user identifier and the product identifier as a data packet. Alternatively, the user identifier and the product identifier may be transmitted to the digital inventory system 500 separately from the request message.

At blocks 3406, 3408, the method of the block 3312 may include selecting a user account (or also referred to as a "record") and a product record from databases. The selection of the user account may be based on the user identifier associated with the request message. For example, the database management module(s) 504 may compare the user identifier associated with the request message to a user identifier of a user account. In accordance with a determination of a match, the database management module(s) 504 may select the user account. In an example embodiment, the user account may correspond to the data structure 602 of FIG. 6. As such, the user account may include the measurement data in the sizing data field 622.

The selection of the product record may be based on the product identifier associated with the request message received at block 3404. For example, the database management module(s) 504 may compare the product identifier associated with the request message to a product identifier of a product record. In accordance with a determination of a match, the database management module(s) 504 may select the product record. In an example embodiment, the product record may correspond to the data structure 604 of FIG. 6. As such, the product record may include the one or more images in the image data array 636.

At block 3410, the method of the block 3312 may include determining model data of the target product. Model data may correspond to image data for generating a digital avatar that is configured with the target product. The model data may include user model data and product model data that may be combined to generate the configured avatar. The user model data may correspond to an image of the user's face, which may be superimposed on an avatar body. The product model data may be representative of an image of a portion of model avatar that coincides with the product. For example, if the target product is a shirt, the product model data may correspond to an image of a torso region of a model avatar wearing the target shirt.

As such, the product model data may be determined based on attributes of the target product and the target user. In particular, the determining of the product model data may be based at least on the measurement data of the user record and the selected product record. In operation, in an example embodiment, the database management module(s) 504 may select an element 638 of the image data array 636 in accordance with attributes of the target user and the target product. For example, each element 638 of the image data array 636 may correspond to a specified user measurement and a product size. Accordingly, the database management module(s) 504 may select the element 638 of the image data array 636 that provides the closest match to the target user's measurements and the target product's size. It will be appreciated that the element 638 of the image data array 636 may be selected based on more or fewer attributes. For example, the element 638 may be selected based on the skin color or palette of the target user, the color of the target product, and/or the like variations of the target user or target product.

Furthermore, the element 638 may include one or more views of the selected variation of the product. Accordingly, the request message may include data that is indicative of a selected view, and the database management module(s) 504 may select an image of the view data fields 642-646 based on the view indicated by the request message. As a result, the selected image may serve as the product model data.

At block 3412, the method of the block 3312 may include providing a response message that includes the model data for display on the client device. In an example embodiment, the application interface module(s) 502 may transmit the model data to a user device using the communication interface module(s) 508. At block 3414, the method of the block 3312 may end.

Figure 35:
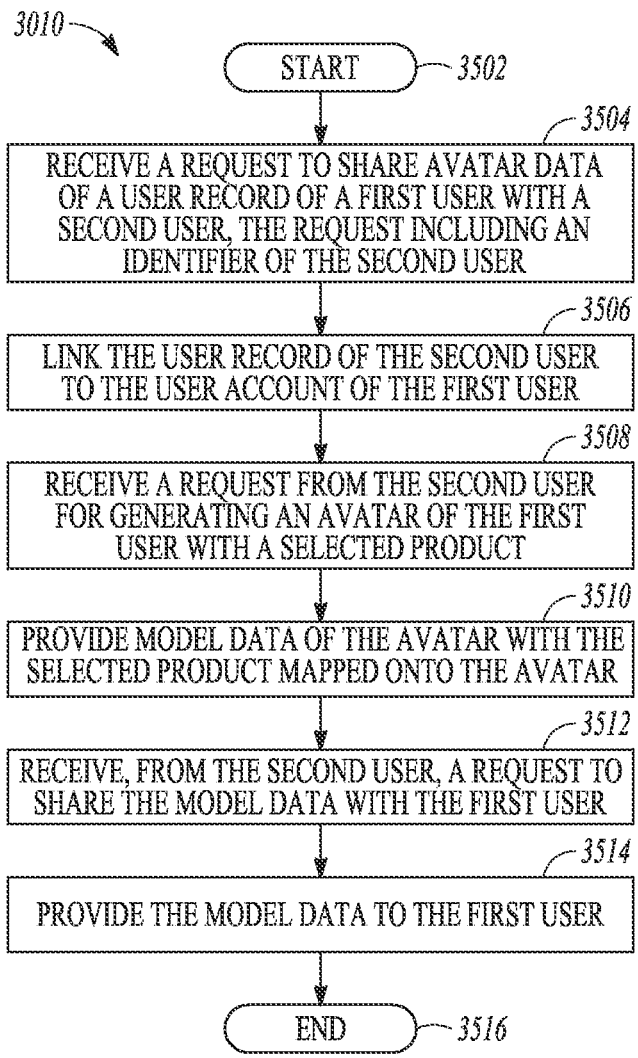
FIG. 35 is a flowchart illustrating an example method of providing avatar data to users, in accordance with an example embodiment.

FIG. 35 is a flowchart illustrating an example method of the block 3010 of FIG. 30 for sharing avatar data, in accordance with an example embodiment. In this example, the example method of the block 3010 may include operations such as receiving a request to share avatar data (block 3504), linking a user record to the avatar data (block 3506), receiving a request for generating an avatar (block 3508), providing model data of the avatar (block 3510), receiving a request to share the model data (block 3512), and providing the model data (block 3514). The example method of the block 3010 will be described below, by way of explanation, as being performed by certain modules. It will be appreciated, however, that the operations of the example method of the block 3010 can be performed in any suitable order by any number of the modules shown in FIG. 5.

The example method of the block 3010 starts at block 3502 and proceeds to block 3504 for receiving a request to share avatar data of a user record. For example, the application interface module(s) 502 may receive the request from a first user for sharing avatar data of the first user with a second user. To this end, the request may be associated with an identifier of a second user. In an example embodiment, the request may correspond to a data packet that includes the identifier of the second user.

At block 3506, the example method of the block 3010 may include linking the user record of the second user to the user account of the first user. In an example embodiment, the database management module(s) 504 may provide linking data to the second user record. The linking data may facilitate providing the second user access to the avatar data of the first user record. For example, the linking data may be indicative of a location of the user record for accessing the avatar data. Additionally or alternatively, the database management module(s) 504 may write data to the user record of the first user that is indicative of access privileges for the second user.

At block 3508, the example method of the block 3010 may include receiving a request from the second user for generating avatar of the first user with a selected product.

At block 3510, the method of the block 3010 may include providing model data of the avatar with the selected product mapped onto the avatar. In an example embodiment, the application interface module(s) 502 may provide the model data to the second user by using the communication interface module(s) 508.

At block 3512, the example method of the block 3010 may include receiving, from the second user, a request to share the model data with the first user. For example, the second user may provide the request to share the avatar generated using the model data provided at block 3510. As such, the user may select the element 2408 of the user interface 2400 of FIG. 24. The application interface module(s) 502 of the digital inventory system 500 may receive an indication of the user's selection.

At block 3514, the example method of the block 3010 may include providing the model data to the first user. The providing of the model data may be responsive to receiving an indication of a request to share an avatar. In an example embodiment, the digital inventory system 500 may provide the first user the model data that was provided to the second user at block 3510.

In an example embodiment, products displayed on a digital avatar may be selectable for navigating a user interface to a product page of the selected product. For example, the second user may dress the avatar of the first user with a shirt and may send the avatar to the first user. In turn, the first user may select the shirt on the avatar display to bring up a webpage of the shirt. On this webpage, the user may purchase the shirt. Moreover, the model data may include data for tracking purchases made by the first user. Accordingly, in response to the first user purchasing a product included with the avatar, the second user may receive a reward, such as points, discount, free merchandise, or the like. At block 3516, the example method of the block 3010 may end.

The example methods/blocks 3000, 3004, 3006, 3008, 3312, 3010 were described above, by way of explanation, as utilizing certain data structures. It will be appreciated, however, that the data accessed or stored by the example methods can be stored in any suitable data structure, including, but not limited to, the data structures shown in FIG. 6.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 36:
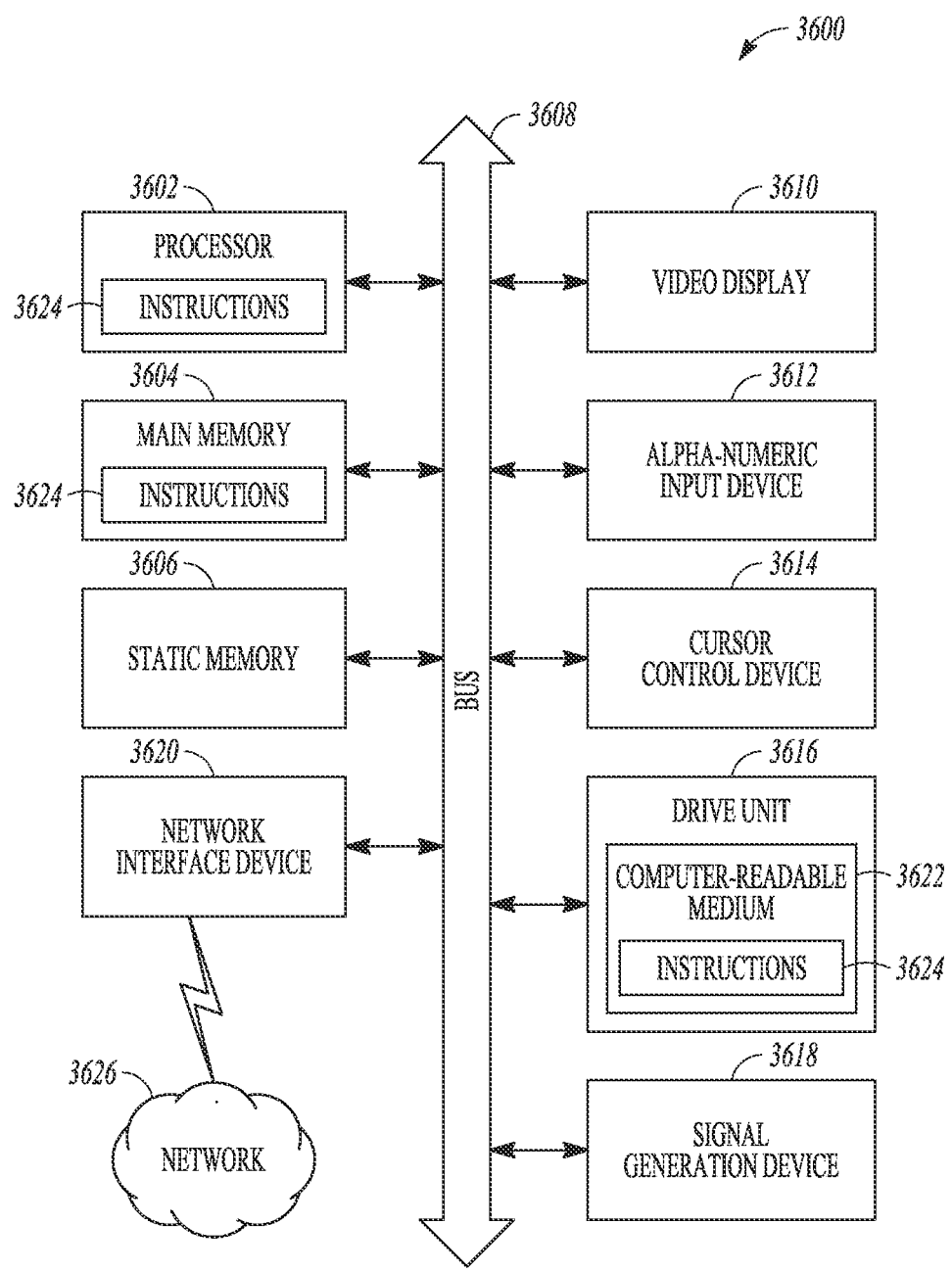
FIG. 36 is a block diagram of a machine in the example form of a computer system within which instructions may be executed for causing the machine to perform any one or more of the methodologies discussed herein.

FIG. 36 is a block diagram of a machine in the example form of a computer system 3600 within which instructions 3624 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 3600 includes a processor 3602 (e.g., a central processing unit (CPU), a graphics processing unit (GPU) or both), a main memory 3604 and a static memory 3606, which communicate with each other via a bus 3608. The computer system 3600 may further include a video display unit 3610 (e.g., a liquid crystal display (LCD) or a cathode ray tube (CRT)). The computer system 3600 also includes an alphanumeric input device 3612 (e.g., a keyboard or a touch-sensitive display screen), a user interface (UI) navigation (or cursor control) device 3614 (e.g., a mouse), a disk drive unit 3616, a signal generation device 3618 (e.g., a speaker) and a network interface device 3620.

Machine-Readable Medium

The disk drive unit 3616 includes a computer-readable medium 3622 on which is stored one or more sets of data structures and instructions 3624 (e.g., software) embodying or utilized by any one or more of the methodologies or functions described herein. The instructions 3624 may also reside, completely or at least partially, within the main memory 3604 and/or within the processor 3602 during execution thereof by the computer system 3600, the main memory 3604 and the processor 3602 also constituting machine-readable media.

While the computer-readable medium 3622 is shown in an example embodiment to be a single medium, the term "computer-readable medium" may include a single medium or multiple media (e.g., a centralized or distributed database, and/or associated caches and servers) that store the one or more instructions 3624 or data structures. The term "computer-readable medium" shall also be taken to include any non-transitory, tangible medium that is capable of storing, encoding or carrying instructions 3624 for execution by the machine and that cause the machine to perform any one or more of the methodologies of the present inventive subject matter, or that is capable of storing, encoding or carrying data structures utilized by or associated with such instructions. The term "computer-readable medium" shall accordingly be taken to include, but not be limited to, solid-state memories, and optical and magnetic media. Specific examples of computer-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 3624 may further be transmitted or received over a communications network 3626 using a transmission medium. The instructions 3624 may be transmitted using the network interface device 3620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions (e.g., instructions 3624) for execution by the machine, and includes digital or analog communications signals or other intangible media to facilitate communication of such software.

Although the inventive subject matter has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A system comprising:
   one or more hardware processors; and
   a machine-readable medium for storing instructions that, when executed by the one or more hardware processors, cause the one or more hardware processors to perform operations comprising:
   receiving, from a user device at a physical store location, a request message to determine availability of a target item at the physical store location, the user device being associated with a user, the physical store location being linked to an online marketplace;
   accessing, in response to the receiving of the request message, inventory data of the online marketplace at a record of a database;
   determining, based on the accessed inventory data, that the target item is not available at the physical store location;
   causing display of a user interface on the user device associated with the user, the user interface indicating that the target item is not available at the physical store location;
   generating, based on a determination that the target item is not available at the physical store location and based on a determination that the target item is available on the online marketplace, a digital representation of the user and of the target item using measurement data stored in a data structure associated with a user account of the user;
   in response to the user interface indicating that the target item is not available at the physical store location, receiving one or more requests from the user device to present the digital representation of the user and of the target item in a digital fitting room associated with the user, and to share access to the digital representation of the user and of the target item in the digital fitting room with a third-party device;
   based on the one or more requests received from the user device, performing a write operation to write, to a linking data field of the data structure associated with the user account of the user, data indicative of the third-party device allowed to access the data structure associated with the user account of the user, the performing of the write operation transforming access privileges of the user account; and
   based on the performing of the write operation, enhancing the user interface, the enhancing of the user interface including:
   causing display, in the user interface on the user device and in a further user interface on the third-party device, of the digital representation of the user and of the target item in the digital fitting room associated with the user, and
   causing display of one or more user interface elements in the user interface on the user device and in the further user interface on the third-party device for providing, receiving, or displaying data associated with the digital representation of the user and of the target item in the digital fitting room associated with the user.

2. The system of claim 1, wherein the request message includes image data of an identifier of a physical item corresponding to the target item, and
   wherein the operations further comprise:
   processing the image data to determine the identifier; and
   wherein the determining that the target item is not available at the physical store location includes searching the inventory data for an item record matching the identifier.

3. The system of claim 1, wherein the operations further comprise:
   providing a graphical indicator for display on a client device linked to the online marketplace and linked to the physical store location, the graphical indicator indicating that the user associated with the user device provided the request message.

4. The system of claim 1, wherein the operations further comprise:
   identifying the physical store location based on a location of the user device.

5. The system of claim 1, wherein the operations further comprise:
   receiving device localization data;
   determining a location of the user device based on the device localization data; and
   identifying the physical store location based on the location of the user device.

6. The system of claim 1, wherein the operations further comprise:
   receiving coordinate data pertaining to the user device; and
   identifying the physical store location based on the coordinate pertaining to the user device.

7. The system of claim 1, wherein the request message includes an identifier of a second item and variation data, and
   wherein the operations further comprise:
   determining the target item based on the request message by determining an item corresponding to the second item modified by the variation data.

8. The system of claim 7, wherein the variation data are indicative of modifying at least one of a size or a color of the second item.

9. The system of claim 1, wherein the digital representation corresponds to a digital avatar of the user, the digital avatar being based on measurement data stored in the user account of the user.

10. The system of claim 9, wherein the digital avatar includes selected personal items of a digital closet linked to the user account of the user.

11. The system of claim 1, wherein the digital representation corresponds to the target item superimposed onto a video image of the user.

12. The system of claim 1, wherein the digital representation corresponds to the target item superimposed onto a video image of the user, the video image being captured by the user device in substantially real time.

13. A computer-implemented method comprising:
receiving, from a user device at a physical store location, a request message to determine availability of a target item at the physical store location, the user device being associated with a user, the physical store location being linked to an online marketplace;
accessing, in response to the receiving of the request message, inventory data of the online marketplace at a record of a database;
determining, based on the accessed inventory data, that the target item is not available at the physical store location;
causing display of a user interface on the user device associated with the user, the user interface indicating that the target item is not available at the physical store location;
generating, using one or more hardware processors, based on a determination that the target item is not available at the physical store location and based on a determination that the target item is available on the online marketplace, a digital representation of the user and of the target item using measurement data stored in a data structure associated with a user account of the user;
in response to the user interface indicating that the target item is not available at the physical store location, receiving one or more requests from the user device to present the digital representation of the user and of the target item in a digital fitting room associated with the user, and to share access to the digital representation of the user and of the target item in the digital fitting room with a third-party device;
based on the one or more requests received from the user device, performing a write operation to write, to a linking data field of the data structure associated with the user account of the user, data indicative of the third-party device allowed to access the data structure associated with the user account of the user, the performing of the write operation transforming access privileges of the user account; and
based on the performing of the write operation, enhancing the user interface, the enhancing of the user interface including:
causing display, in the user interface on the user device and in a further user interface on the third-party device, of the digital representation of the user and of the target item in the digital fitting room associated with the user, and
causing display of one or more user interface elements in the user interface on the user device and in the further user interface on the third-party device for providing, receiving, or displaying data associated with the digital representation of the user and of the target item in the digital fitting room associated with the user.

14. The computer-implemented method of claim 13, further comprising:
processing image data of an identifier of a physical item corresponding to the target item, the image data being included with the request message,
wherein the determining that the target item is not available at the physical store location includes searching the inventory data for an item record matching the identifier.

15. The computer-implemented method of claim 13, further comprising:
providing a graphical indicator for display on a client device linked to the online marketplace and linked to the physical store location, the graphical indicator indicating that the user associated with the user device provided the request message.

16. The computer-implemented method of claim 13, wherein the identifying of the physical store location is based on a location of the user device.

17. The computer-implemented method of claim 13, further comprising:
receiving device localization data;
determining a location of the user device based on the device localization data; and
identifying the physical store location based on location of the user device.

18. A non-transitory machine-readable storage medium storing instructions that, when executed by one or more hardware processors of a machine, cause the one or more hardware processors to perform operations comprising:
receiving, from a user device at a physical store location, a request message to determine availability of a target item at the physical store location, the user device being associated with a user, the physical store location being linked to an online marketplace;
accessing, in response to the receiving of the request message, inventory data of the online marketplace at a record of a database;
determining, based on the accessed inventory data, that the target item is not available at the physical store location;
causing display of a user interface on the user device associated with the user, the user interface indicating that the target item is not available at the physical store location;
generating, based on a determination that the target item is not available at the physical store location and based on a determination that the target item is available on the online marketplace, a digital representation of the user and of the target item using measurement data stored in a data structure associated with a user account of the user;
in response to the user interface indicating that the target item is not available at the physical store location, receiving one or more requests from the user device to present the digital representation of the user and of the target item in a digital fitting room associated with the user, and to share access to the digital representation of the user and of the target item in the digital fitting room with a third-party device;
based on the one or more requests received from the user device, performing a write operation to write, to a linking data field of the data structure associated with the user account of the user, data indicative of the third-party device allowed to access the data structure associated with the user account of the user, the performing of the write operation transforming access privileges of the user account; and based on the performing of the write operation, enhancing the user interface, the enhancing of the user interface including:
- causing display, in the user interface on the user device and in a further user interface on the third-party device, of the digital representation of the user and of the target item in the digital fitting room associated with the user, and
- causing display of one or more user interface elements in the user interface on the user device and in the further user interface on the third-party device for providing, receiving, or displaying data associated with the digital representation of the user and of the target item in the digital fitting room associated with the user.

19. The non-transitory machine-readable storage medium of claim 18, wherein the operations further comprise:

processing image data of an identifier of a physical item corresponding to the target item, the image data being included with the request message, wherein the determining that the target item is not available at the physical store location includes searching the inventory data for an item record matching the identifier.

20. The non-transitory machine-readable storage medium of claim 18, wherein the operations further comprise:

providing a graphical indicator for display on a client device linked to the online marketplace and linked to the physical store location, the graphical indicator indicating that the user associated with the user device provided the request message.

* * * * *